(12) United States Patent
Koyama

(10) Patent No.: US 7,721,452 B2
(45) Date of Patent: May 25, 2010

(54) SHAPE MEASURING APPARATUS FOR EYEGLASSES

(75) Inventor: Toshihiro Koyama, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 12/382,960

(22) Filed: Mar. 27, 2009

(65) Prior Publication Data

US 2009/0241356 A1      Oct. 1, 2009

(30) Foreign Application Priority Data

Mar. 28, 2008 (JP) .............................. 2008-088203

(51) Int. Cl.
*G01B 5/20* (2006.01)
(52) U.S. Cl. ................. 33/200; 33/28; 33/507
(58) Field of Classification Search .................... 33/200, 33/28, 507, 549
See application file for complete search history.

(56) References Cited

U.S. PATENT DOCUMENTS

| | | | |
|---|---|---|---|
| 5,097,600 A | | 3/1992 | Brule et al. |
| 5,594,992 A | | 1/1997 | Suzuki et al. |
| 5,615,486 A | * | 4/1997 | Igarashi et al. ................ 33/200 |
| 6,032,377 A | * | 3/2000 | Ichikawa et al. ............... 33/554 |
| 6,163,967 A | * | 12/2000 | Suzuki et al. ................ 33/200 |
| 6,170,321 B1 | * | 1/2001 | Suzuki et al. ................ 33/507 |
| 6,427,350 B1 | * | 8/2002 | Asaoka et al. ................ 33/507 |

(Continued)

FOREIGN PATENT DOCUMENTS

| | | |
|---|---|---|
| EP | 0 190 450 | 8/1986 |
| EP | 0 689 900 | 1/1996 |
| JP | 07-285057 | 10/1995 |
| JP | 07-290348 | 11/1995 |
| JP | 08-294855 | 11/1996 |
| JP | 10-328992 | 12/1998 |
| WO | WO 2008/097564 | 8/2008 |

OTHER PUBLICATIONS

European Search Report issued Jun. 6, 2009 in connection with EP 09 15 6338 corresponding to the present U.S. application.

*Primary Examiner*—Yaritza Guadalupe-McCall
(74) *Attorney, Agent, or Firm*—Wenderoth, Lind & Ponack, L.L.P.

(57) ABSTRACT

A shape measuring apparatus for eyeglasses which measures a contour shape of an eyeglass element includes: a holder which holds the eyeglass element; a holder swing mechanism which swings the holder around a virtual rotational axis which is set outside of the shape measuring apparatus for eyeglasses; a measuring element which traces a surface of the eyeglass element; a driver which drives the measuring element; a position detector which detects a position of the measuring element; and a controlling-calculating section which controls the driver and obtains and processes position information of the measuring element by the position detector, wherein, in a state of holding the eyeglass element by the holder, the controlling-calculating section controls the driver to slide the measuring element on the surface of the eyeglass element, so that the measuring element traces a three-dimensional shape of the eyeglass element and the three-dimensional shape of eyeglass element is obtained based on information of a driving state of the driver and the position information of the measuring element by the position detector.

14 Claims, 37 Drawing Sheets

U.S. PATENT DOCUMENTS

| | | | |
|---|---|---|---|
| 6,530,156 B1 * | 3/2003 | Matsuyama | 33/507 |
| 6,728,656 B2 * | 4/2004 | Suzuki | 33/200 |
| 6,742,272 B2 * | 6/2004 | Eto et al. | 33/507 |
| 6,845,678 B2 * | 1/2005 | Igarashi et al. | 33/200 |
| 2002/0166247 A1 * | 11/2002 | Andrews et al. | 33/200 |
| 2003/0105612 A1 * | 6/2003 | Suzuki et al. | 702/157 |
| 2008/0186451 A1 | 8/2008 | Andrews et al. | |
| 2009/0011687 A1 * | 1/2009 | Shibata et al. | 451/240 |
| 2009/0064512 A1 * | 3/2009 | Matsuyama | 33/28 |
| 2009/0244525 A1 * | 10/2009 | Kanno et al. | 356/124 |
| 2009/0268199 A1 * | 10/2009 | Inoguchi | 356/124 |
| 2009/0282688 A1 * | 11/2009 | Watanabe | 33/200 |

* cited by examiner

RELATIONSHIP OF DIFFERENCE IN Z DIRECTION ΔL AND CURVE VALUE Cv $y = 3.3695 \Delta L + 0.0809$

SHAPE MEASURING APPARATUS FOR EYEGLASSES

CROSS-REFERENCE TO RELATED APPLICATIONS

The present application is based on and claims priority from Japanese patent application number 2008-088203 filed Mar. 28, 2008, the disclosure of which is hereby incorporated by reference herein in its entirety.

BACKGROUND

This invention relates to a shape measuring apparatus for eyeglasses which measures a lens shape of a lens for eyeglasses or an inner circumferential contour shape of a lens frame of eyeglasses.

A shape measuring apparatus for eyeglasses for measuring a contour shape of a pair of lens frames comprising an eyeglass frame, for example, is disclosed in Japanese patent publication number H07-290348 or H07-285057.

The shape measuring apparatus for eyeglasses has a holder which holds an eyeglass frame, a turning section which turns the holder around a rotating shaft provided in the shape measuring apparatus for eyeglasses, a measuring element which traces a groove portion formed inside of the pair of lens frames of the eyeglass frame, a driver which drives the measuring element, a position detector which detects a position of the measuring element, and a controlling-calculating section which controls the driver and obtains and processes position information of the measuring element by the position detector.

In the shape measuring apparatus for eyeglasses, in a state where the eyeglass frame is held by the holder, the controlling-calculating section controls the turning section such that a lens frame which is measured is in approximately a horizontal state when measuring, and controls the driver such that the measuring element slides on the groove portion of the lens frame, and thereby a three-dimensional shape of the lens frame is traced by the measuring element and the three-dimensional shape of the lens frame is obtained based on information of a driving state of the driver and position information of the measuring element by the position detector.

However, in the above shape measuring apparatuses for eyeglasses, a turning angle by the turning section is approximately 20 degrees at most. Therefore, it is difficult to measure the shape of an eyeglass frame which is highly-curved such as wraparound eyeglasses worn by athletes, for example.

Moreover, it is difficult for the shape measuring apparatus for eyeglasses to accurately measure a contour shape of the eyeglass frame which exceeds a base curve of 8, therefore a distance between geometric centers of each lens frame of the eyeglass frame is not obtained.

In addition, an eyeglass frame generally has a first lens frame and a second lens frame at the right and left, and a bridge which connects the first and the second lens frames. The eyeglass frame is manufactured symmetrically centering on the center of the bridge.

However, actual shapes and sizes of a first lens and a second lens which respectively fit in the first lens frame and the second lens frame are often slightly different from each other. If shape measuring data of one lens (for example, the first lens) is used for a fabrication of the other lens (for example, the second lens), these lenses do not often smoothly fit in the lens frames.

In a case as described above, an adjustment by hand is needed afterward, that is, an additional fabrication is needed. In some cases where the adjustment does not work properly and so on, there is a possibility that a new fabrication is needed.

SUMMARY

An object of the present invention is to provide a shape measuring apparatus for eyeglasses which easily and accurately measures a shape of an eyeglass frame which exceeds a base curve of 8.

In order to achieve the above object, the present invention provides a shape measuring apparatus for eyeglasses which measures a contour shape of an eyeglass element comprising: a holder which holds the eyeglass element; a holder swing mechanism which swings the holder around a virtual rotational axis which is set outside of the shape measuring apparatus for eyeglasses; a measuring element which traces a surface of the eyeglass element; a driver which drives the measuring element; a position detector which detects a position of the measuring element; and a controlling-calculating section which controls the driver and obtains and processes position information of the measuring element by the position detector, wherein, in a state of holding the eyeglass element by the holder, the controlling-calculating section controls the driver to slide the measuring element on the surface of the eyeglass element, so that the measuring element traces a three-dimensional shape of the eyeglass element and the three-dimensional shape of eyeglass element is obtained based on information of a driving state of the driver and the position information of the measuring element by the position detector.

Preferably, the eyeglass element is a pair of lens frames comprising an eyeglass frame, and the measuring element traces respectively each groove portion which is formed inside of each lens frame, so that an inner circumferential contour shape of each lens frame is measured.

Preferably, the eyeglass frame is highly-curved, and in a state where the eyeglass frame is held by the holder, a curvature center of a curve of the eyeglass frame is set to be a position which is close to the virtual rotational axis.

Preferably, the holder swing mechanism includes: a rail member which is fixed to the holder and is an arc-shape centering on the virtual rotational axis; and at least a pair of rollers which is arranged to sandwich the rail member from above and below, is capable of swinging the holder centering on the virtual rotational axis.

Preferably, the controlling-calculating section, in a state where the holder is swung such that one lens frame of the pair of lens frames is in approximately a horizontal state, rotates the measuring element around an axis set in the apparatus which extends in a vertical direction and a groove portion of the one lens frame is traced by the measuring element.

Preferably, in a case where a curved amount of the one lens frame of the pair of lens frames measured by the measuring element does not exceed a certain amount, after measuring an inner circumferential contour shape of the one lens frame, while maintaining the holder in a horizontal state, the controlling-calculating section measures a shape of another lens frame of the pair of lens frames, and in a case where the curved amount of one lens frame measured by the measuring element exceeds the certain amount, the controlling-calculating section sets to be a frame holding angle which is an angle capable of negating the curved amount of the one lens frame, and measures the shape of the one lens frame after swinging the holder at only the frame holding angle.

Preferably, in the case where the curved amount of the one lens frame measured by the measuring element exceeds the certain amount after measuring the shape of the one lens frame, the controlling-calculating section measures a shape of the other lens frame of the pair of lens frames, in a state where the holder is swung at the same angle as the frame holding angle in an opposite direction.

Preferably, the eyeglass element is a lens for eyeglasses.

Preferably, the measuring element traces a circumference of the lens for eyeglasses held by the holder, so that a two-dimensional contour shape of the circumference of the lens for eyeglasses is measured.

Preferably, the measuring element measures positions of at least two points on a surface of the lens for eyeglasses held by the holder, so that a curvature radius of the lens for eyeglasses is calculated.

Preferably, a three-dimensional contour shape of the lens for eyeglasses is calculated by information of the measured curvature radius of the lens for eyeglasses and information of the two-dimensional contour shape of the circumference measured by tracing the circumference of the lens for eyeglasses by the measuring element.

Preferably, a length of the circumference of the lens for eyeglasses is calculated by information of the calculated three-dimensional contour shape of the lens for eyeglasses.

Preferably, a curve value of the lens for eyeglasses is calculated by measuring positions of at least two points on a surface of the lens for eyeglasses held by the holder by the measuring element.

Preferably, a position of a mounting hole for the eyeglass element is measured by tracing a surface of the lens for eyeglasses held by the holder by the measuring element.

DETAILED DESCRIPTION OF THE PREFERRED EMBODIMENTS

Hereinafter, an embodiment of the present invention will be explained based on the drawings.

Embodiment (Structure)

Figure 1:
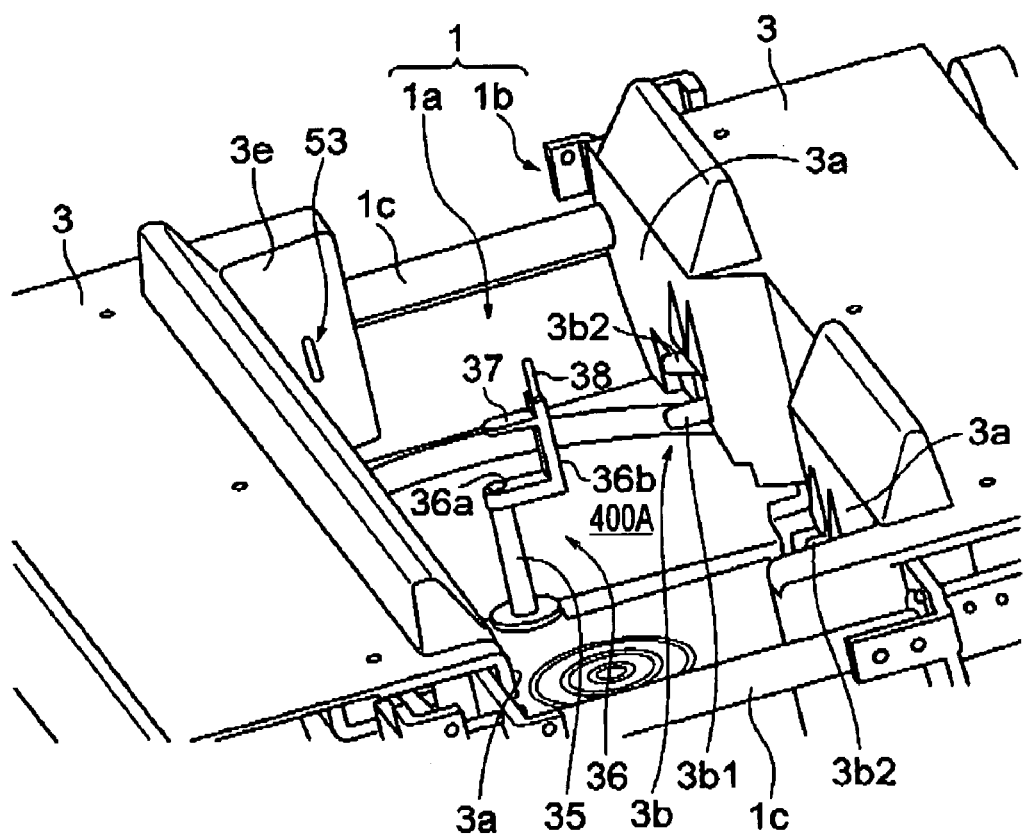
FIG. 1 is a partial schematic perspective view of a shape measuring apparatus for eyeglasses according to an embodiment of the present invention.

FIG. 1 illustrates a structure of a chief part of a shape measuring apparatus for eyeglasses according to the embodiment of the present invention.

The shape measuring apparatus for eyeglasses has a main body 1 of the measuring apparatus.

Figure 2:
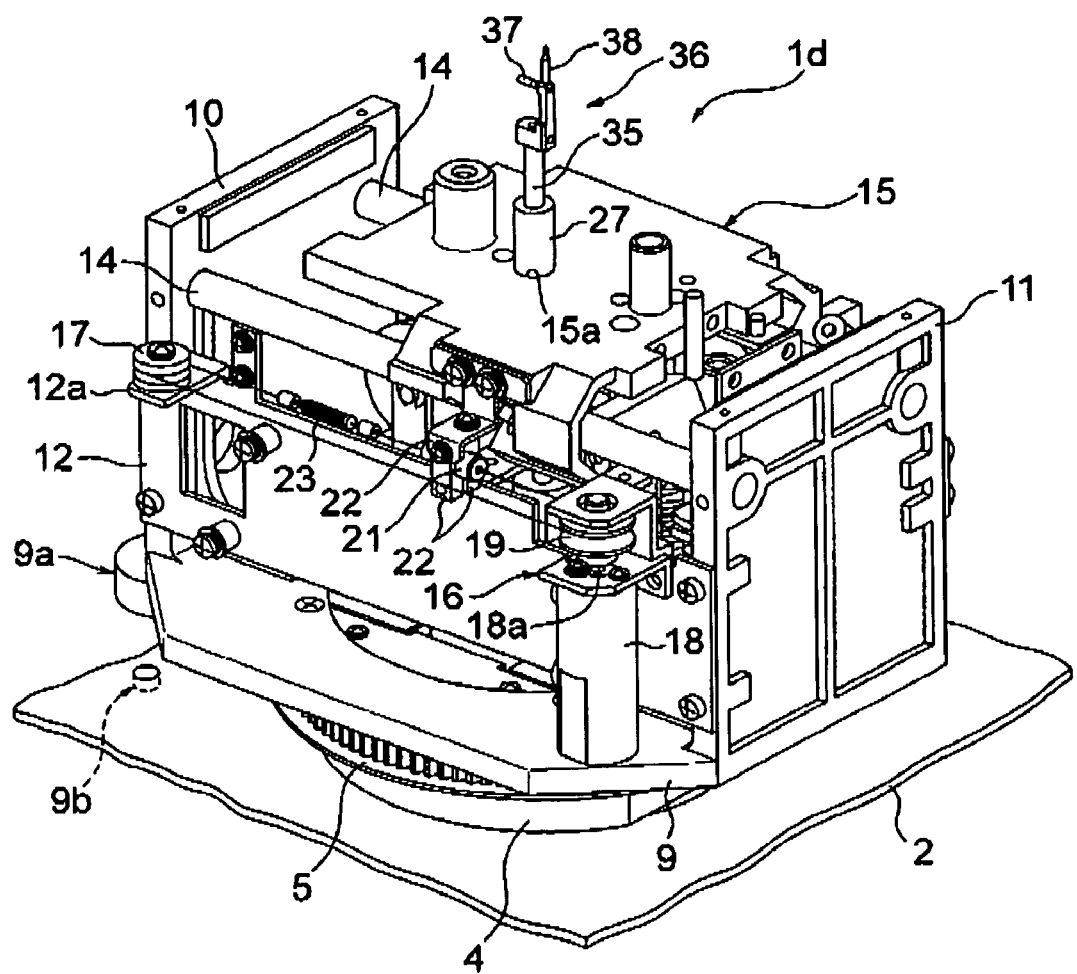
FIG. 2 is a perspective view of a measuring mechanism of the shape measuring apparatus for eyeglasses of FIG. 1.

The main body 1 of the measuring apparatus has a case portion 1a for storing a measuring mechanism provided in a lower part, and a lens frame holding mechanism 1b provided in an upper part of the case portion 1a. At a bottom part in the case portion 1a of FIG. 1, a base 2 illustrated in FIG. 2 is provided.

As described in FIG. 1, the lens holding mechanism 1b has a pair of parallel guide rods 1c, 1c which are fixed to the case portion 1a.

In the guide rods 1c, 1c, slide frames 3, 3 are provided slidably in a state of facing each other and are held to be capable or relatively moving close to and away from each other.

The slide frames 3, 3 are urged by a coil spring or the like (not illustrated) in a direction of moving close to each other. The slide frames 3, 3 have vertical plates 3a, 3a which sandwich an eyeglass frame (not illustrated) from both sides, and have a lens frame holder 3b which holds the eyeglass frame on the vertical plates 3a, 3a.

In the lens frame holder 3b, two pairs of four pairs of holding bars 3b1, 3b2 are respectively provided on the vertical plates 3a, 3a, and are arranged corresponding to right and left lens frames of the eyeglass frame (not illustrated).

Each holding bar 3b1, 3b2 projects from the vertical plates 3a, 3a, and each holding bar 3b2 is slidable from an upper side to each holding bar 3b1 fixed on the vertical plates 3a, 3a, and the eyeglass frame is sandwiched by each holding bar 3b1, 3b2.

A structure which Japanese patent publication number H10-328992 discloses, for example, or well-known techniques and so on are adoptable as the lens frame holding mechanism 1b as described above. Therefore, the lens frame holding mechanism 1b will not be explained in detail.

Figure 1A:
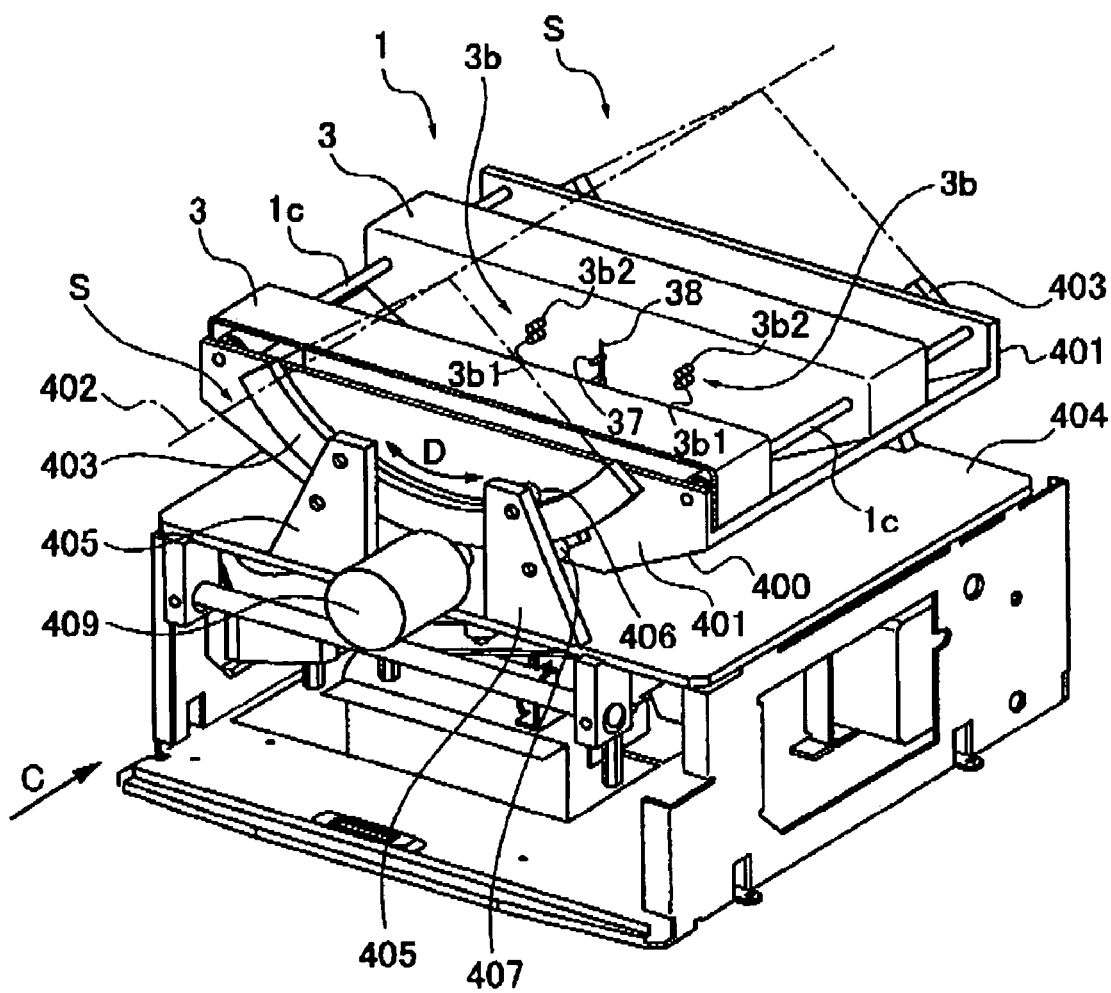
FIG. 1A is a perspective view of the shape measuring apparatus for eyeglasses according to the embodiment of the present invention.
Figure 1B:
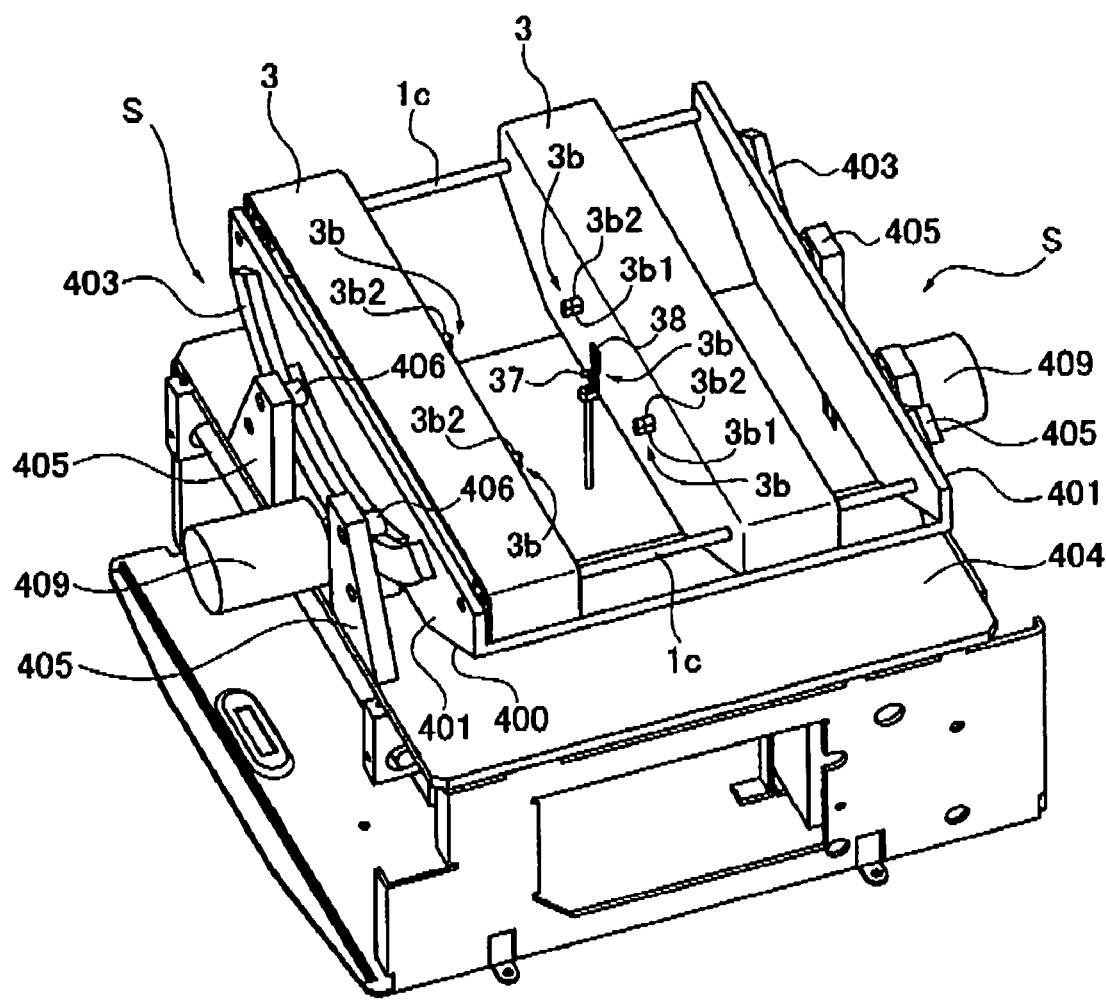
FIG. 1B is a perspective view of the shape measuring apparatus for eyeglasses of FIG. 1A viewed from a different view-point.

FIG. 1A is a perspective view of the shape measuring apparatus for eyeglasses according to the embodiment of the present invention. FIG. 1B is a perspective view of the shape measuring apparatus for eyeglasses of FIG. 1A viewed from a different view point.

Figure 1C:
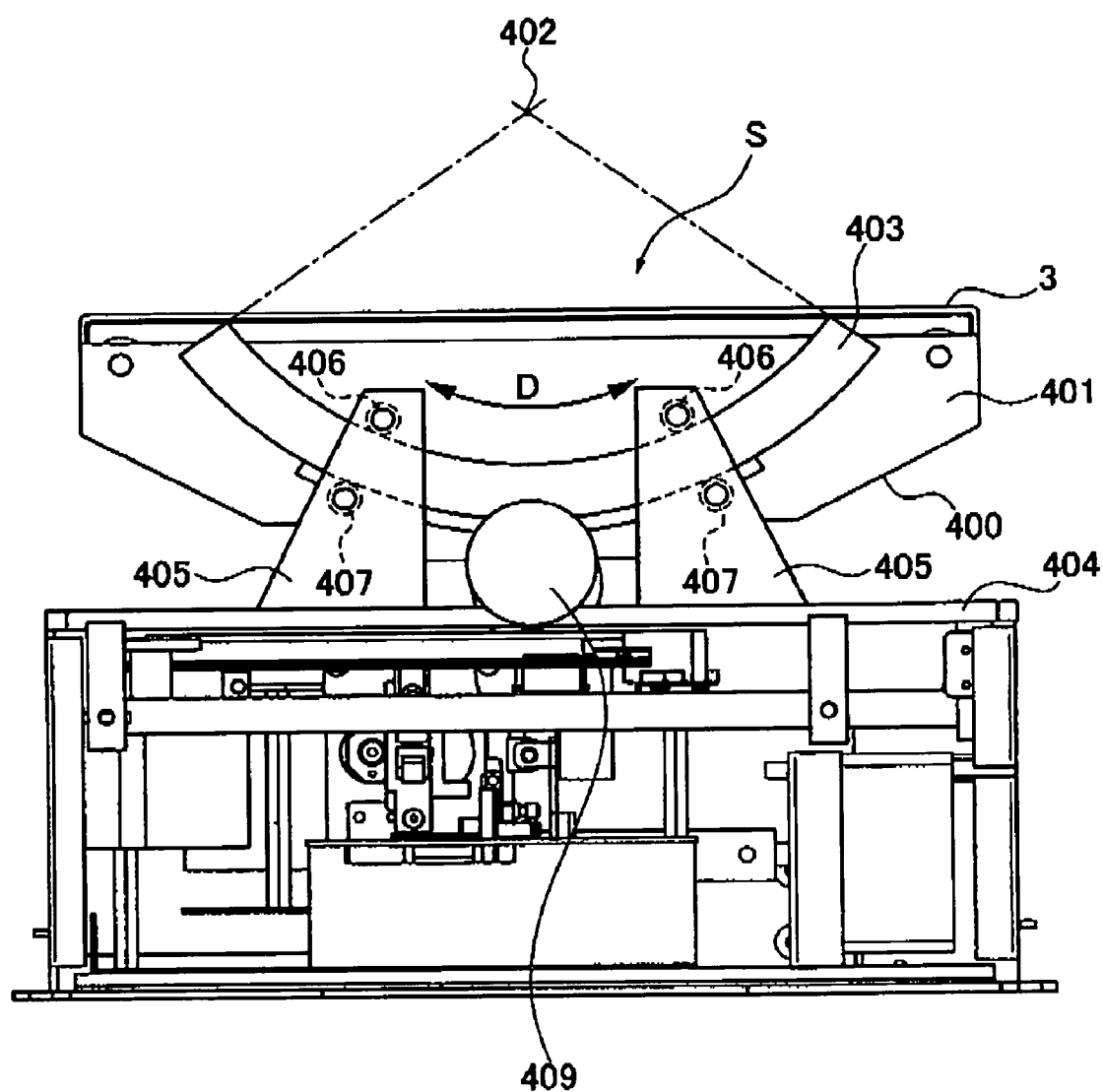
FIG. 1C is a side view of the shape measuring apparatus for eyeglasses of FIG. 1A viewed from a direction of an arrow C.
Figure 1D:
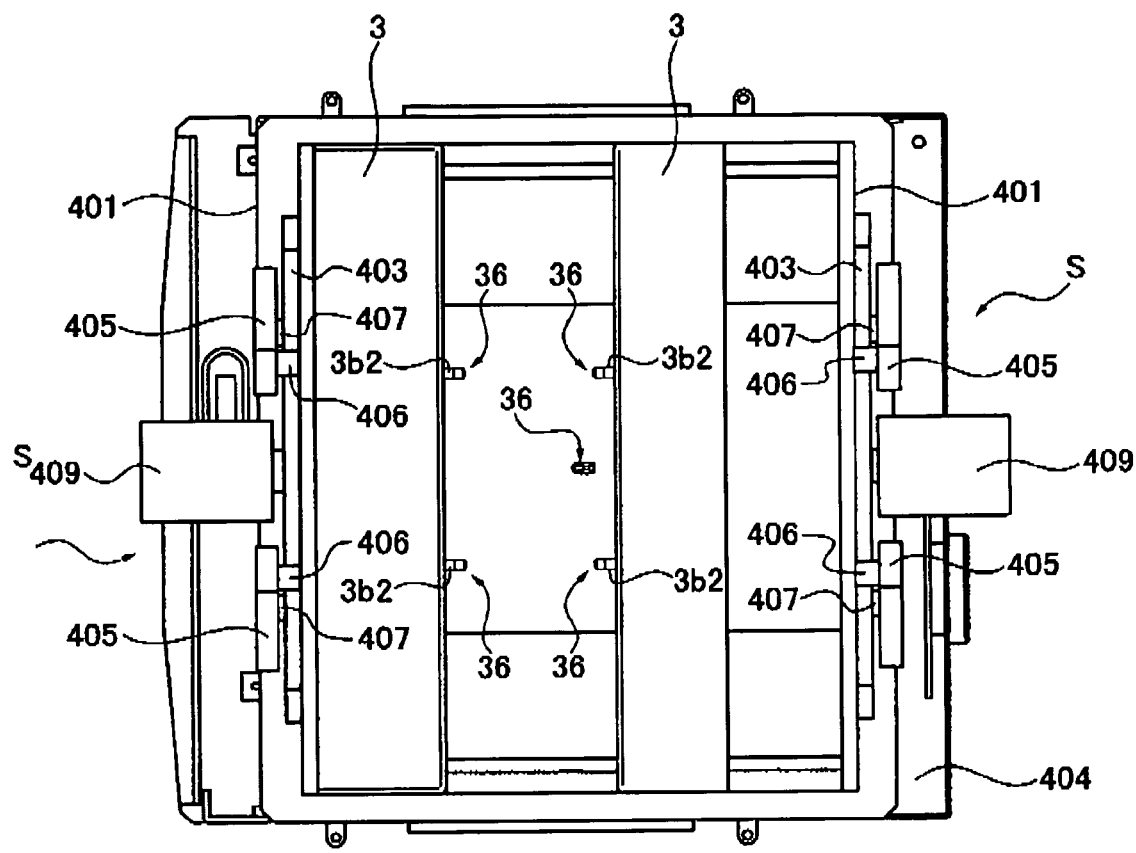
FIG. 1D is a top view of the shape measuring apparatus for eyeglasses of FIG. 1A.

FIG. 1C is a side view of the shape measuring apparatus for eyeglasses viewed from a direction of an arrow C, and FIG. 1D is a top view of the shape measuring apparatus for eyeglasses.

The slide frames 3, 3, as described in FIGS. 1A to 1C, have a bottom surface 400 which is a downwardly convex-shape, and in which a shape of a lower surface is polygonal.

In the bottom surface 400, an opening 400A is formed in the center.

A measuring element 36 is inserted upwardly in the opening 400A from a lower side toward an upper side.

The measuring element 36 will be explained later.

The bottom surface 400 may be a cylindrical surface which is a downwardly rounded-convex-shape.

On both end surfaces 401, 401 outside of the slide frames 3, 3 of the case portion 1a, guide rails 403, 403, which are arc-shape centering on a virtual rotational axis 402, are mounted.

On the other hand, in the main body 1 of the measuring apparatus, a cover 404 for a lower case is provided, at both sides of an upper part of the cover 404, brackets 405, 405 are provided upward.

At each bracket 405, supporting rollers 406 are respectively provided at an upper part of each bracket 405, and supporting rollers 407 are respectively provided below the supporting rollers 406. Each supporting roller 406, 407 is provided rotatably.

Each supporting roller 406, 407 at each bracket 405 is arranged to sandwich the guide rail 403 of the slide frame 3 between the supporting rollers 406, 407 from an upper side and a lower side of the guide rail 403.

That is, both slide frames 3, 3 are supported on the cover 404 of the main body 1 of the measuring apparatus.

Therefore, both slide frames 3, 3 are capable of swinging centering on the virtual rotational axis 402 in a direction of an arrow D.

Figure 1E:
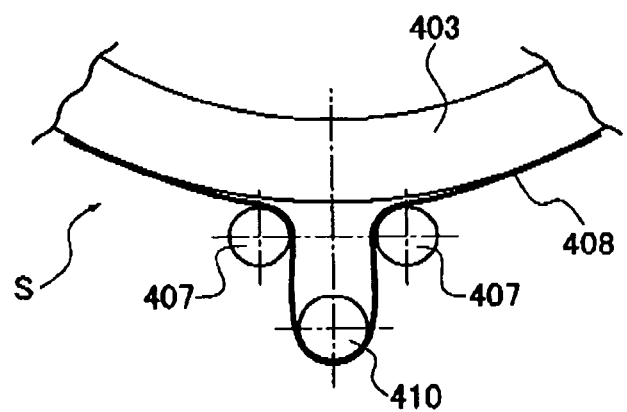
FIG. 1E illustrates a mechanism which swings a frame holder.

As described in FIG. 1E, a belt 408 is abutted on a lower end surface of the guide rail 403.

Both end portions of the belt 408 are fixed to both end portions of the guide rail 403, and the remaining portion of the belt 408 (a portion except the both end portions of the belt 408) is not fixed to the guide rail 403.

That is, the rest portion of the belt 408 is capable of being spaced from the lower end surface of the guide rail 403.

At the brackets 405, 405 of both sides, the supporting rollers 407, 407 are respectively mounted, and on the cover 404 for a lower case, a motor 409 (see FIGS. 1A to 1D) is provided as a driver.

A driving roller 410 is mounted at a rotating shaft of the motor 409.

The driving roller 410 is placed in approximately a middle of the supporting rollers 407, 407 and placed in a lower position than in positions of the supporting rollers 407, 407.

The belt 408 fixed to the both end portions of the guide rail 403 is wound on the driving roller 410 via the supporting rollers 407, 407.

An upper surface (a surface in contact with the lower end surface of the guide rail 403) of the belt 408 is gear-like, and an outer circumferential surface of the driving roller 410 is also gear-like. Therefore, a friction coefficient between the upper surface of the belt 408 and the outer circumferential surface of the driving roller 410 is large.

Therefore the belt 408 does not slip on the driving roller 410, and rotating the driving roller 410 makes it possible to move the guide rail 403 in a right direction or in a left direction in FIG. 1E. As a result, the slide frame 3 of the lens frame holding mechanism 1b is capable of swinging centering on the virtual rotational axis 402 in the direction of the arrow D (see FIGS. 1A and 1C).

In the main body 1 of the measuring apparatus, a swing angle detector which detects an angle (a swing angle) when the slide frame 3 swings is provided, which is not illustrated.

A holder swing mechanism S comprises these guide rails 403, the supporting rollers 406, 407, the belt 408, the motor 409, and the driving roller 410.

A measuring mechanism 1d as described in FIGS. 2 to 5 is provided on the base 2.

The measuring mechanism 1d has a base supporting member 4 which is fixed on the base 2.

A gear 5 having a large diameter is mounted rotatably around a rotating shaft C (a shaft extending in a vertical direction) which extends in a vertical direction of the gear 5 in the base supporting member 4.

Figure 5:
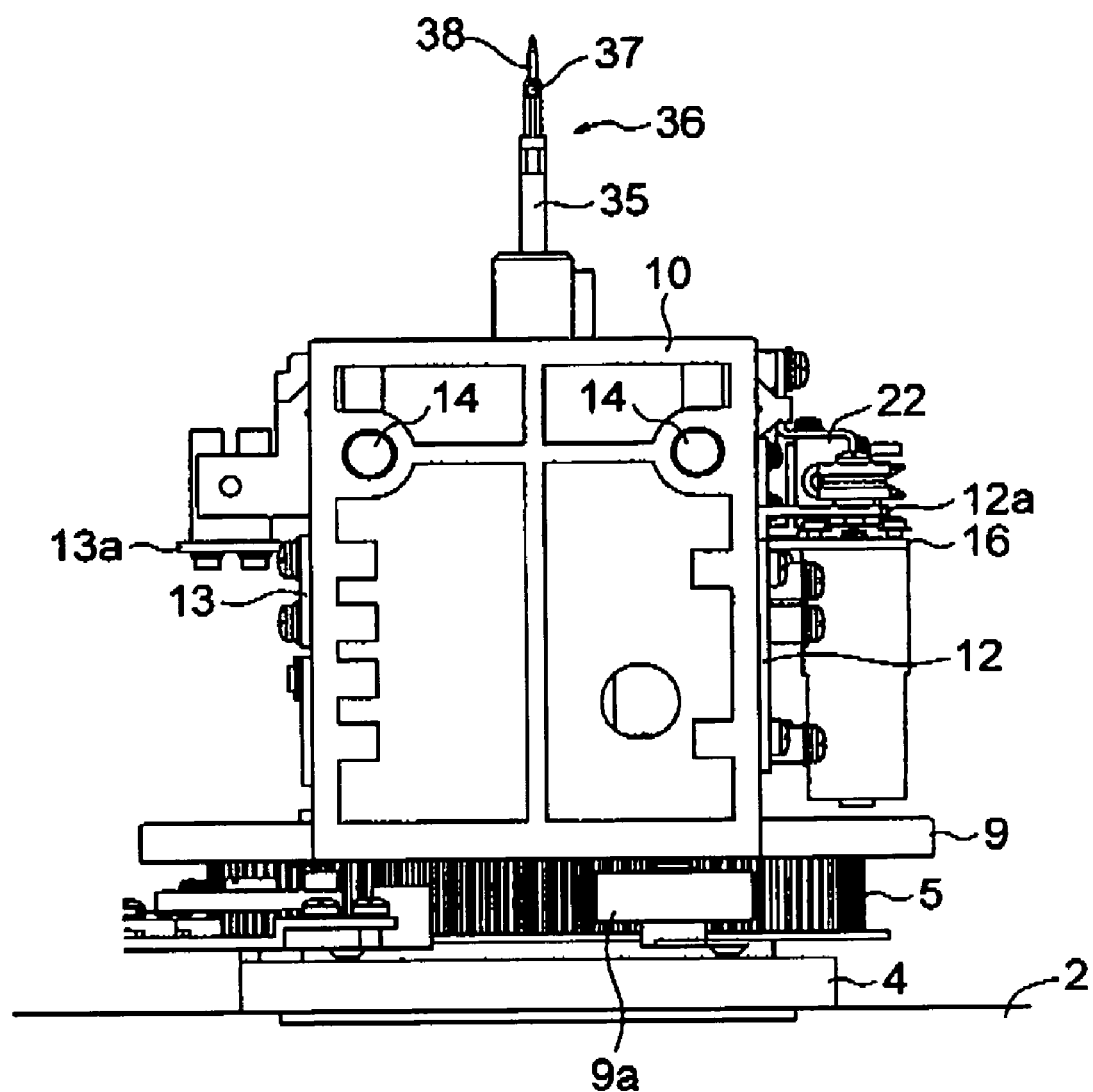
FIG. 5 is a right side view of the measuring mechanism of FIG. 4.
Figure 5A:
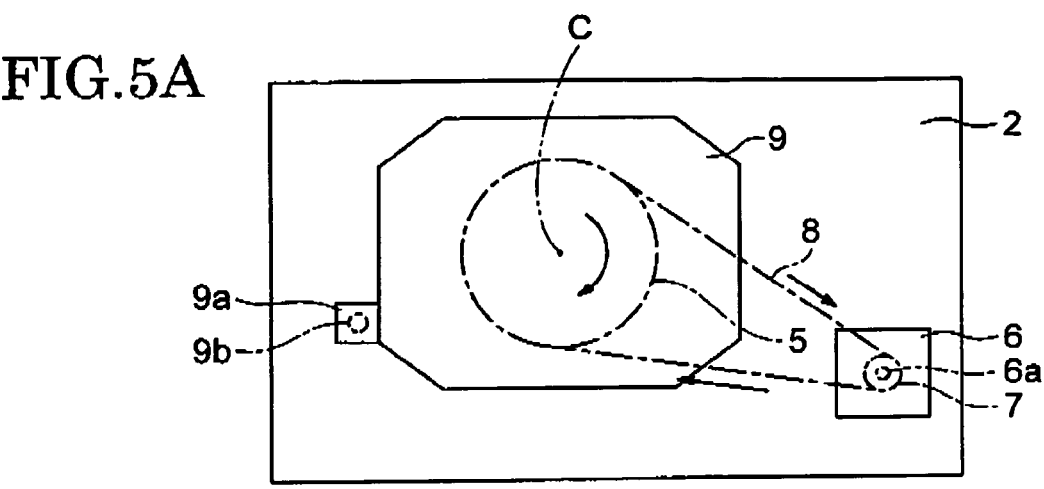
FIG. 5A is a schematic diagram illustrating a driver of a rotating base of the measuring mechanism of FIG. 2.

As schematically illustrated in FIG. 5A, a motor 6 is mounted adjacent to the gear 5 on the base 2.

A pinion 7 is fixed to a rotating shaft 6a of the motor 6, and a belt 8 is wound on the pinion 7 and the gear 5.

When the motor 6 works, a rotation of the rotating shaft 6a of the motor 6 is transmitted to the gear 5 via the pinion 7 and the belt 8, and thereby the gear 5 rotates.

A two-phase stepping motor is used as the motor 6.

As illustrated in FIGS. 2 to 5, a rotating base 9 is integrally fixed in an upper part of the gear 5.

In the shape measuring apparatus for eyeglasses of the embodiment of the present invention, a rotation reference position detector which detects a reference position regarding a rotation of the rotating base 9 to the base 2 is provided.

The rotation reference position detector comprises a light-emitting marker 9b and a photo sensor section 9a for indicating a reference position, and the light-emitting marker 9b is provided on the base 2 and the photo sensor section 9a is provided on the rotating base 9.

The light-emitting marker 9b emits light upward through a slit or a circular hole provided on the base 2, and this light is detected by the photo sensor section 9a fixed on the rotating base 9, and thereby the reference position of the rotation of the rotating base 9 is detected.

In addition, well-known techniques such as a transparent type photo sensor, or a reflection type photo sensor, or a proximity sensor or the like is adoptable as the rotation reference position detector.

Figure 3:
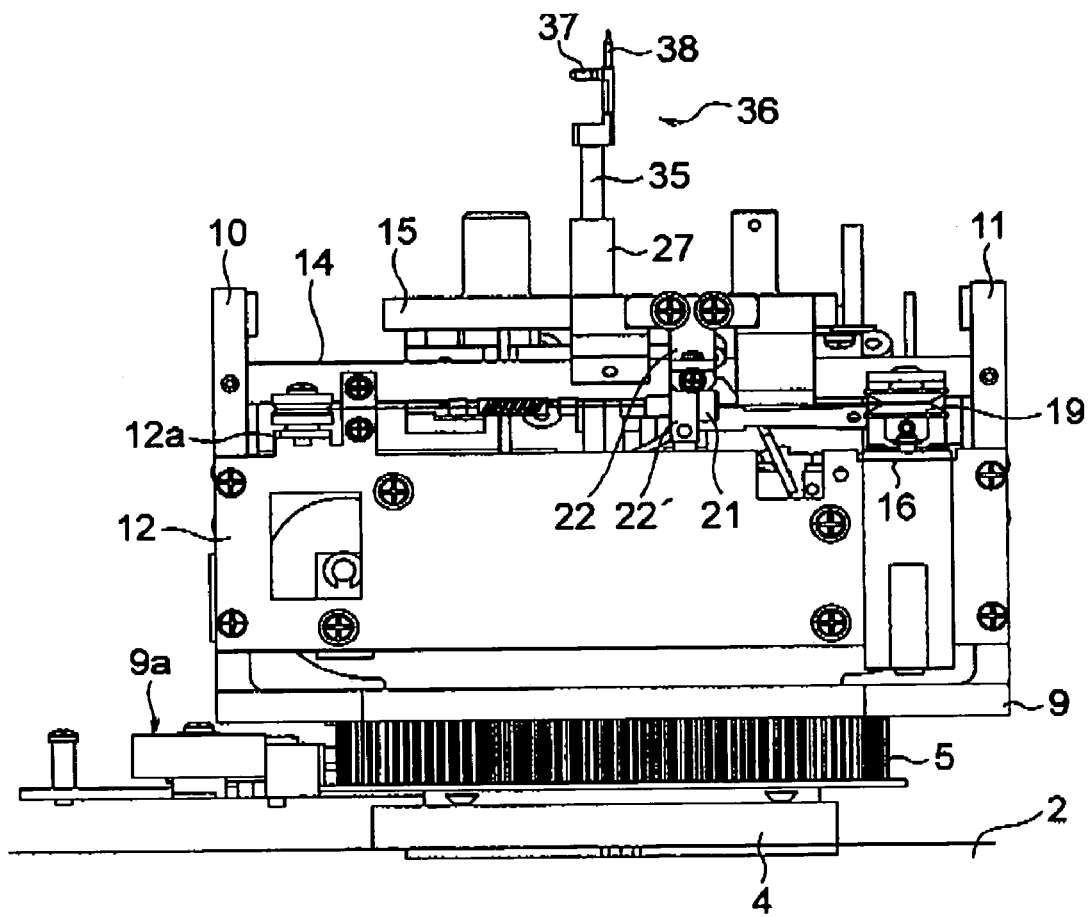
FIG. 3 is a front view of the measuring mechanism of FIG. 2.
Figure 4:
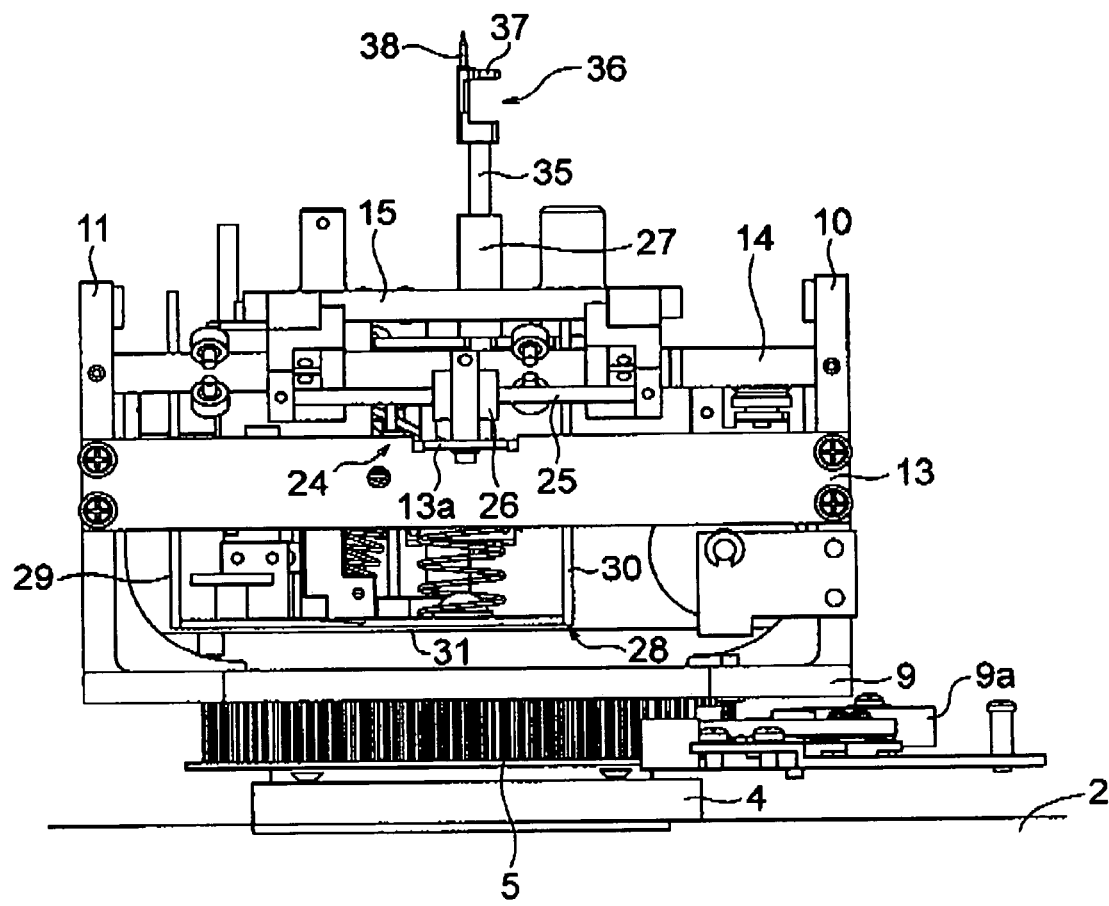
FIG. 4 is a back view of the measuring mechanism of FIG. 2.

Moreover, as illustrated in FIGS. 2 to 4, at both end portions of the rotating base 9, rail mounting plates 10, 11 which extend upward from each of these end portions are respectively formed integrally, and these rail mounting plates 10 are facing each other and are parallel to each other.

As illustrated in FIG. 3, both end portions in a longitudinal direction of a side plate 12 are respectively fixed to one side portion of the rail mounting plate 10 and one side portion of the rail mounting plate 11, and as illustrated in FIG. 4, both end portions in the longitudinal direction of a side plate 13 are respectively fixed to the other side portion of the rail mounting plate 10 and the other side portion of the rail mounting plate 11.

As illustrated in FIGS. 2 to 4, a pair of bar-shape guide rails 14, 14 extends between each upper part of the rail mounting plates 10, 11 horizontally and parallel to each other, and each of both end portions of the guide rails 14, 14 are fixed to the rail mounting plates 10, 11.

A slider 15 is held to be slidable in a longitudinal direction on the guide rails 14, 14.

Additionally, as illustrated in FIGS. 2 and 3, a pulley supporting plate part, 12a is integrally formed at an end portion of a side of the rail mounting plate 10 of the side plate 12, and a bracket 16 for mounting a motor is integrally formed at an end portion of a side of the rail mounting plate 11 of the side plate 12.

Figure 5B:
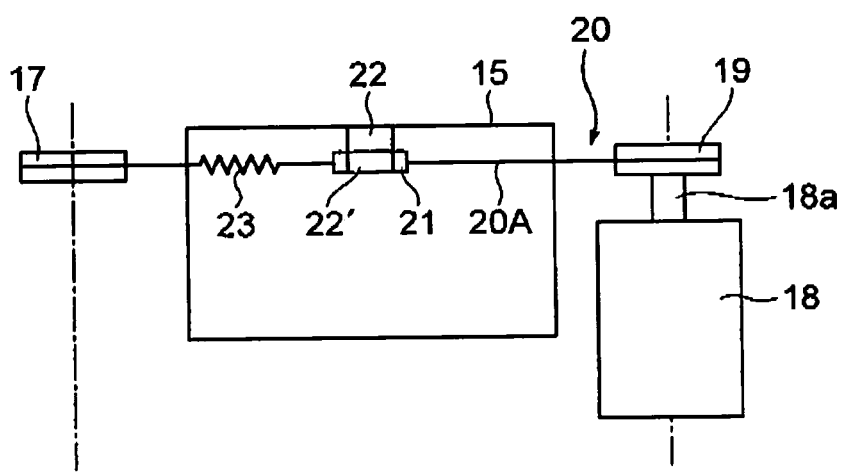
FIG. 5B is a schematic diagram explaining a slider drive mechanism of FIG. 2.
Figure 5C:
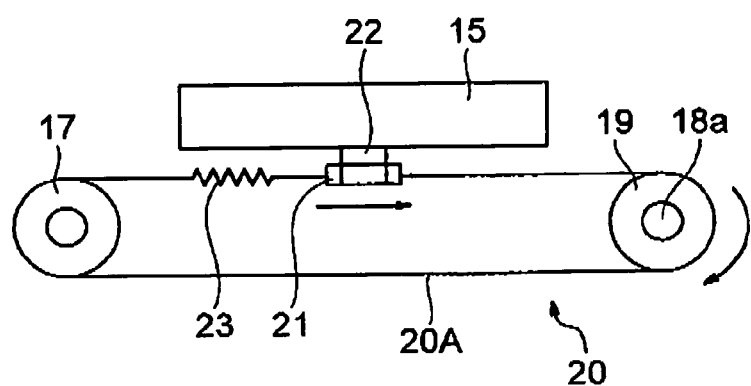
FIG. 5C is a top view of FIG. 5B.

A pulley 17 is mounted rotatably in a rotating shaft which extends in a vertical direction in the pulley supporting plate part 12a, and an upper end portion of a motor 18 for a movement of the slider is fixed under the bracket 16. A rotating shaft 18a of this motor 18 extends upward, a pulley 19 is mounted at the rotating shaft 18a as illustrated in FIGS. 5B and 5C. A DC motor is used as the motor 18.

As illustrated in FIGS. 2, 5B, and 5C, a wire belt 20 is wound on these pulleys 17, 19. The wire belt 20 comprises a wire 20A, a coil spring 23 to strain this wire, and a cylindrical-shape wire holding member 21 to hold the wire 20A by brackets 22, 22' fixed to a slider 15.

The wire holding member 21, in a state where the wire is inserted into an opening portion of the wire holding member 21, is fixed to the wire 20A, and both end portions of the wire 20A are connected by the coil spring 23, so that the wire belt 20 is annular.

The wire holding member 21 is sandwiched by the brackets 22, 22' of the slider 15, so that the wire belt 20 is fixed to the slider 15.

Therefore, if the motor 18 is rotated normally or reversely, the rotating shaft 18a and the pulley 19 are rotated normally or reversely, the slider 15 moves in a left or a right direction as illustrated in FIG. 3.

Figure 5D:
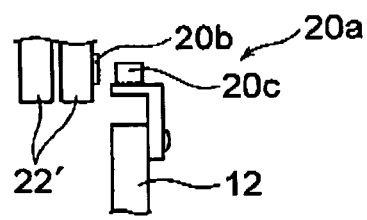
FIG. 5D is a schematic explanatory view of a slide reference position detector of a slider of FIG. 2.

As illustrated in FIG. 5D, in the shape measuring apparatus for eyeglasses of the embodiment of the present invention, a slide reference position detector 20a to detect a reference position of a movement position of the slider 15 to the rotating base 9 is provided.

The slide reference position detector 20a comprises a reflection plate 20b provided with a reflection surface which extends vertically (not illustrated) and a reflection type photo sensor 20c provided integrally with a light-emitting element and a light-receiving element. The reflection plate 20b is provided in the bracket 22' and the reflection type photo sensor 20c is provided in the side plate 12.

Well-known techniques such as a transparent type photo sensor, a proximity sensor and the like are adoptable as the slide reference position detector 20a.

As illustrated in FIG. 4, between the side plate 13 and the slider 15, a linear scale 24 (position detector) to detect a radial coordinate (a distance in a radial direction) is interposed. The linear scale 24 has a lengthy main scale 25, and a detection head for position information 26 which moves along the main scale 25 and reads position information stored in the main scale 25. The main scale 25 is fixed parallel to the guide rail 14 on the slider 15, and the detection head for position information 26 is fixed on the supporting plate part 13a which is integrally formed on the side plate 13.

The detection head for position information 26 detects movement information in the horizontal direction of the slider 15 from the position information stored in the main scale 25. Well-known magnetic types and optical types of linear scales, for example, are used for this linear scale 24.

For example, in a magnetic type linear scale 24, a magnetic pattern where magnetic poles are repeated S, N repeats alternately along its longitudinal direction at small intervals is formed in the main scale 25, and the magnetic pattern is detected by the detection head for position information 26, so that a movement position of the slider 15 is detected from a signal as information for a position detection of a radial coordinate outputted from the detection head for position information 26.

And in an optical type linear scale 24, a number of slits are provided in a plate-shape main scale 25 along its longitudinal direction at small intervals, and in a detection head for position information 26, a light-emitting element and a light-receiving element are provided to sandwich the main scale 25 from both sides. And light emitted from the light-emitting element is detected by the light-receiving element via the slits of the main scale 25, and the number of slits are counted so that the movement position of the slider 15 is detected.

In approximately a center portion of the slider 15, a through-hole 15a as illustrated in FIG. 2 is formed.

A guide cylinder 27 which extends vertically is inserted into the through-hole 15a.

Below the slider 15, as illustrated in FIG. 4, a supporting frame 28 is arranged.

The supporting frame 28 has a horizontal plate 31, and vertical frames 29, 30 which extend upward and parallel from both end portions of the horizontal plate 31, and upper end portions of the vertical frames 29, 30 are held by the slider 15.

Figure 6:
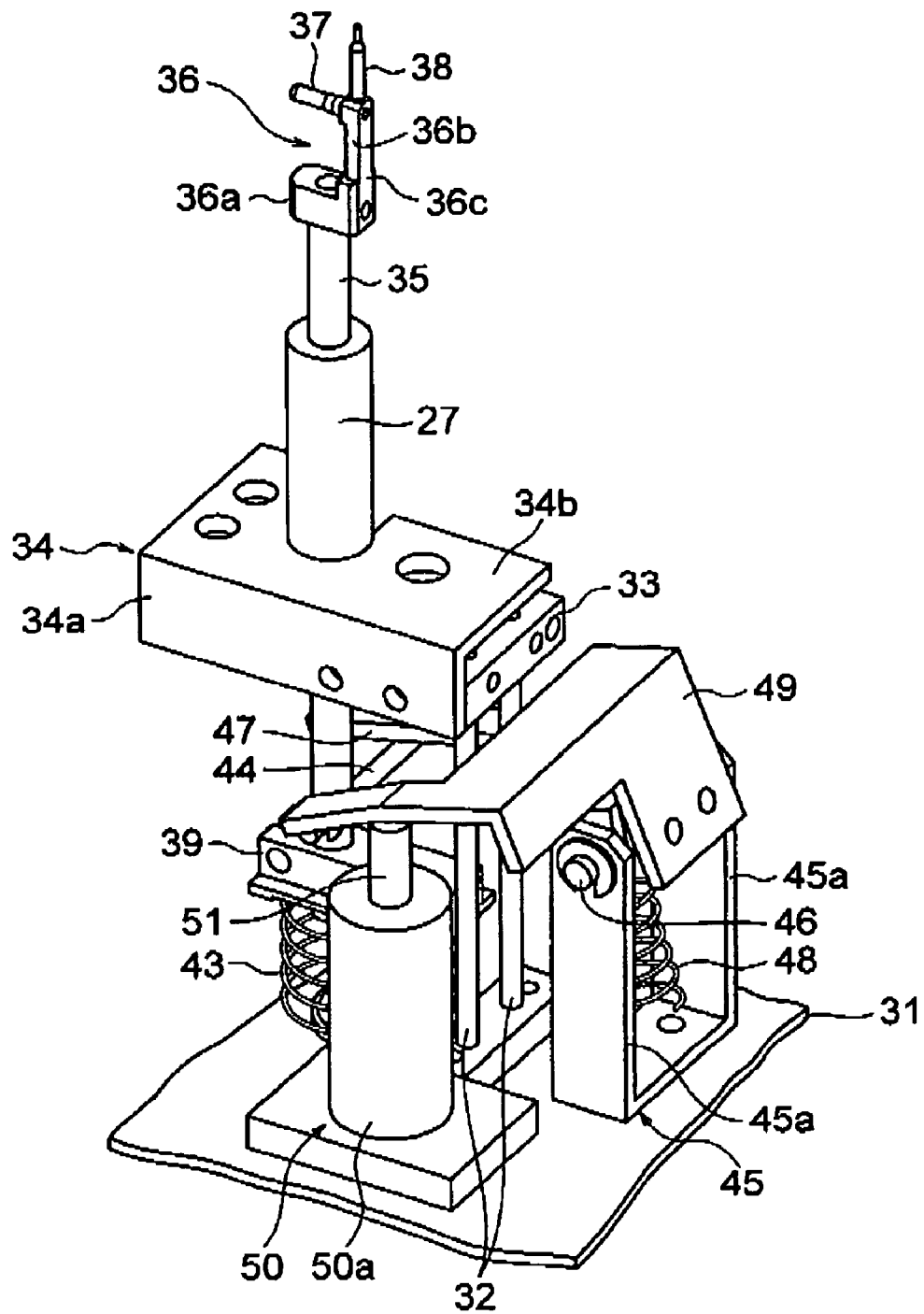
FIG. 6 is a perspective view of a moving-up-and-down mechanism of a measuring element of FIG. 2.

As illustrated in FIG. 6, a pair of cylindrical-shape supporting members 32, 32 which extend upward and are provided parallel to each other are fixed on the horizontal plate 31.

On upper end portions of the supporting members 32, 32, a connecting member 33 is fixed.

A vertical plate 34a in which a side surface is L-shape of a guide supporting member 34 is fixed on the connecting member 33.

A lower end portion of the guide cylinder 27 is fixed on a horizontal plate 34b.

Inside the guide cylinder 27, a measuring element shaft 35 which extends vertically (long) is inserted and is fitted and held and capable of up-and-down motion freely, and a measuring element 36 is integrally provided on an upper end portion of the measuring element shaft 35.

Figure 10:
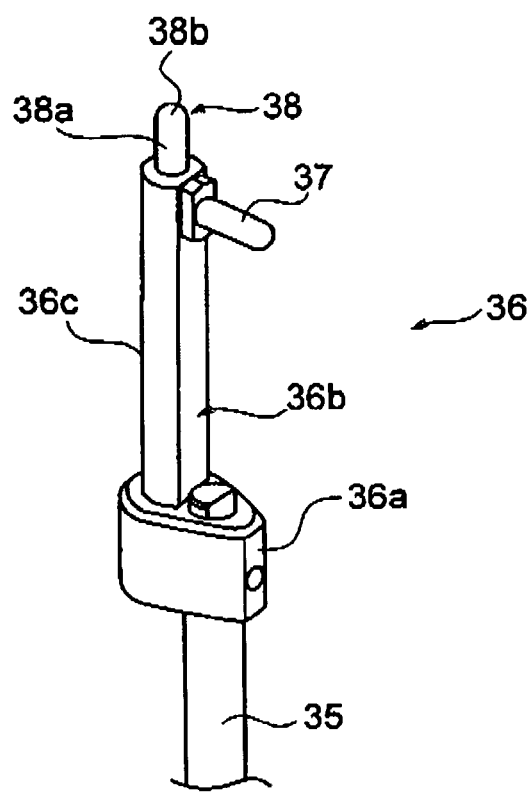
FIG. 10 is a side view of FIG. 9.

As illustrated in FIG. 10, this measuring element 36 has an upright part 36b which extends vertically (long), a measuring element for a lens frame 37 which is fixed on the upper end portion of the vertical part 36b and extends in a horizontal direction, and a measuring element for a lens 38 which is fixed on the upper end portion of the upright part 36b and extends upward further from the upright part 36b.

A lower end portion of the measuring element 36 and an upper end portion of the measuring element shaft 35 are connected by the connecting member 36a.

The measuring element shaft 35, the connecting member 36a, and the measuring element 36 connected by the connecting member 36a are entirely formed in a crank-shape.

The measuring element for the lens frame 37 faces to the same side as the measuring element shaft 35 of the upright part 36b, and in a part of an opposite side to the measuring element shaft 35 of the upright part 36b, a back surface 36c which is curved with a certain curvature radius is formed. A part of this back surface 36c is abutted on a circumference of the lens to be slid on the circumference of the lens, in a case of measuring a contour shape of the lens.

An upper portion of the measuring element for the lens 38 is formed in a hemisphere-shape.

If the upper portion is a hemisphere 38b, it is preferable that the curvature radius of the hemisphere 38b (that is, a radius of a shaft part 38a) be larger than a radius of a general mounting hole (a diameter is 2.2$\phi$) in order to correspond to various mounting holes.

It is not necessary for the measuring element for the lens 38 to be provided integrally with the measuring element 36 as described above.

Figure 9:
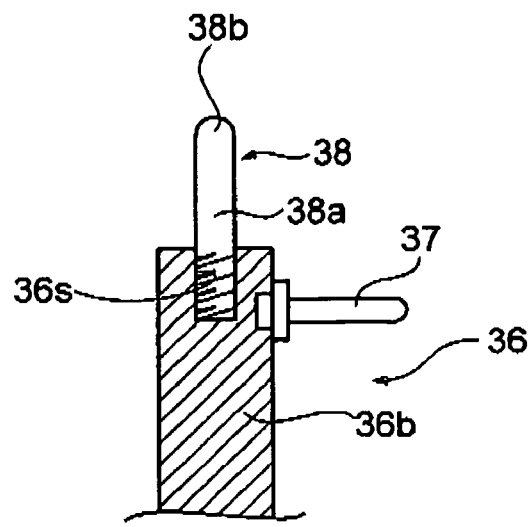
FIG. 9 is a partially enlarged perspective view of a measuring element illustrated in FIG. 1.

For example, as illustrated in FIG. 9, a screw hole is provided in an upper end portion of the upright part 36b, a screw part 36s is provided in a lower end portion of the measuring element for the lens 38, and the screw part 36s is screwed into the upper end portion of the upright part 36b, so that the measuring element for the lens 38 may be detachable from the upper end portion of the upright part 36b.

Figure 7:
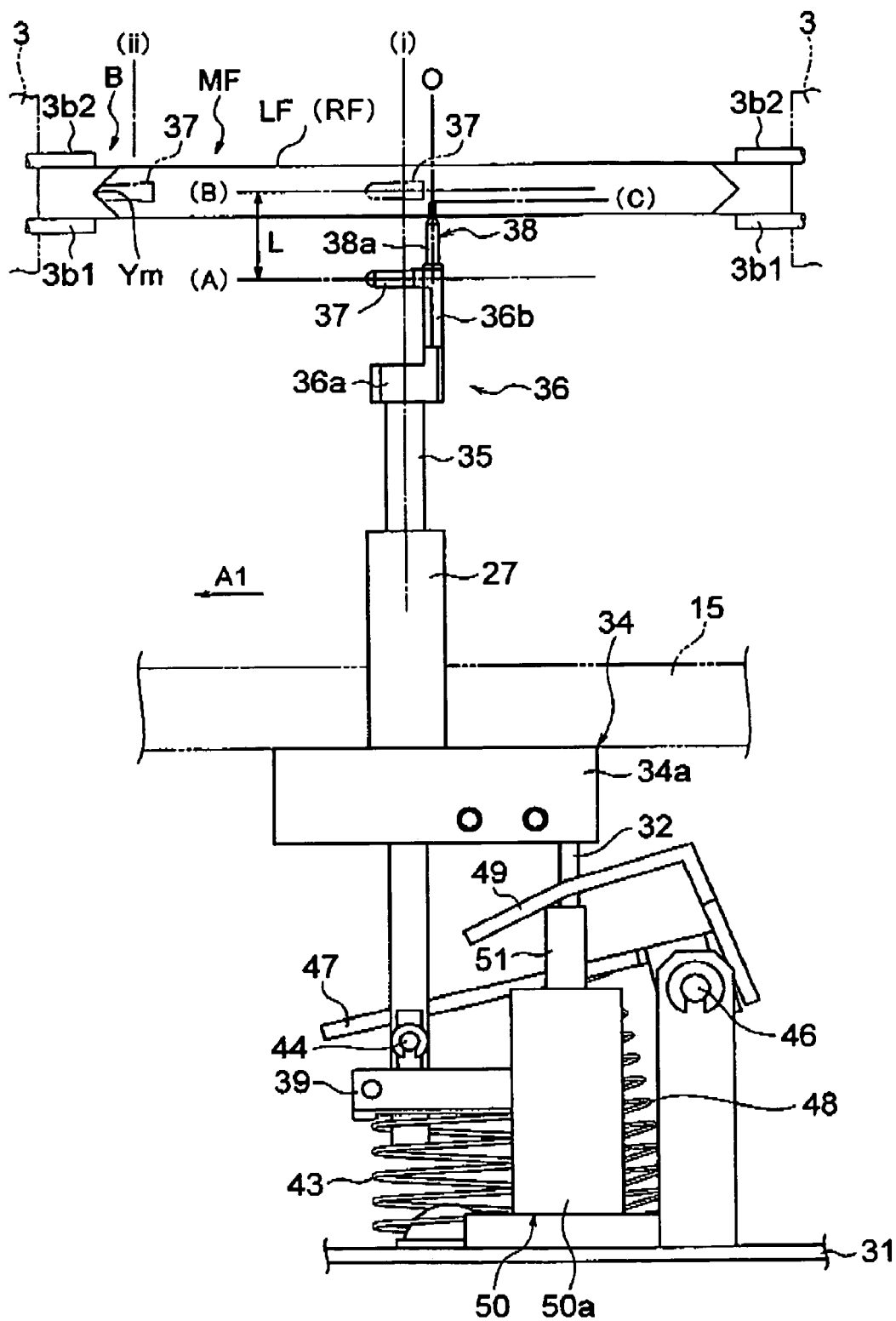
FIG. 7 is an explanatory view of a measurement of a lens frame by the moving-up-and-down mechanism of FIG. 6.
Figure 8:
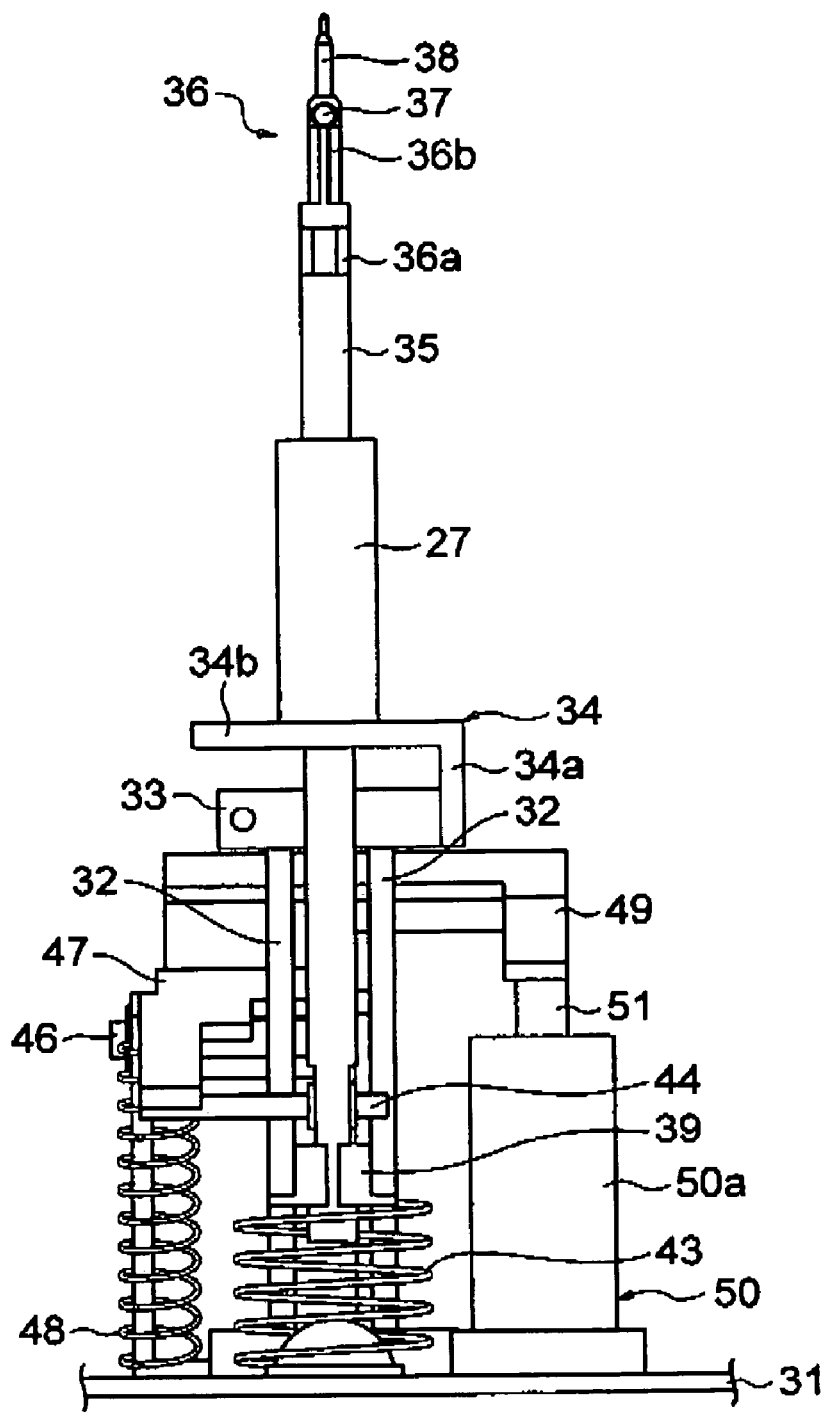
FIG. 8 is a left side view of FIG. 7.
Figure 13:
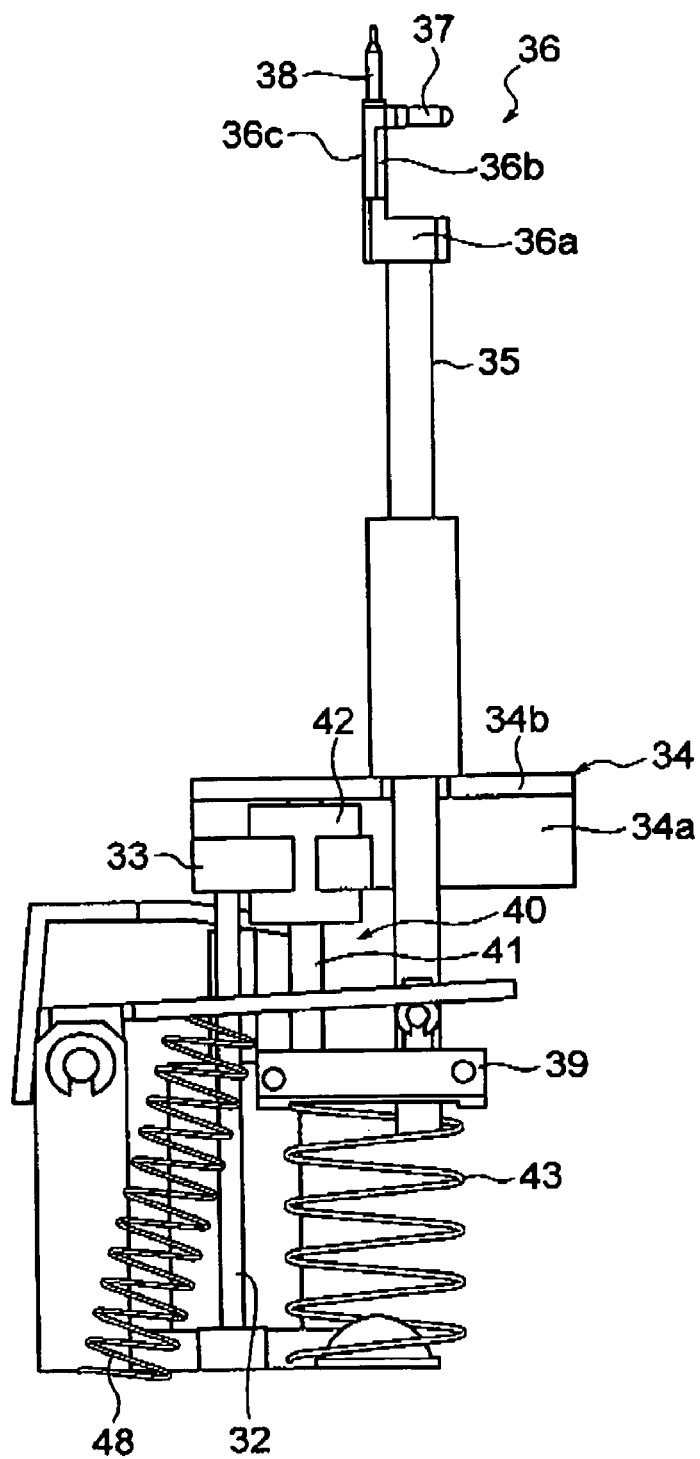
FIG. 13 is an explanatory view of a linear scale of the moving-up-and-down mechanism of FIG. 11.
Figure 14:
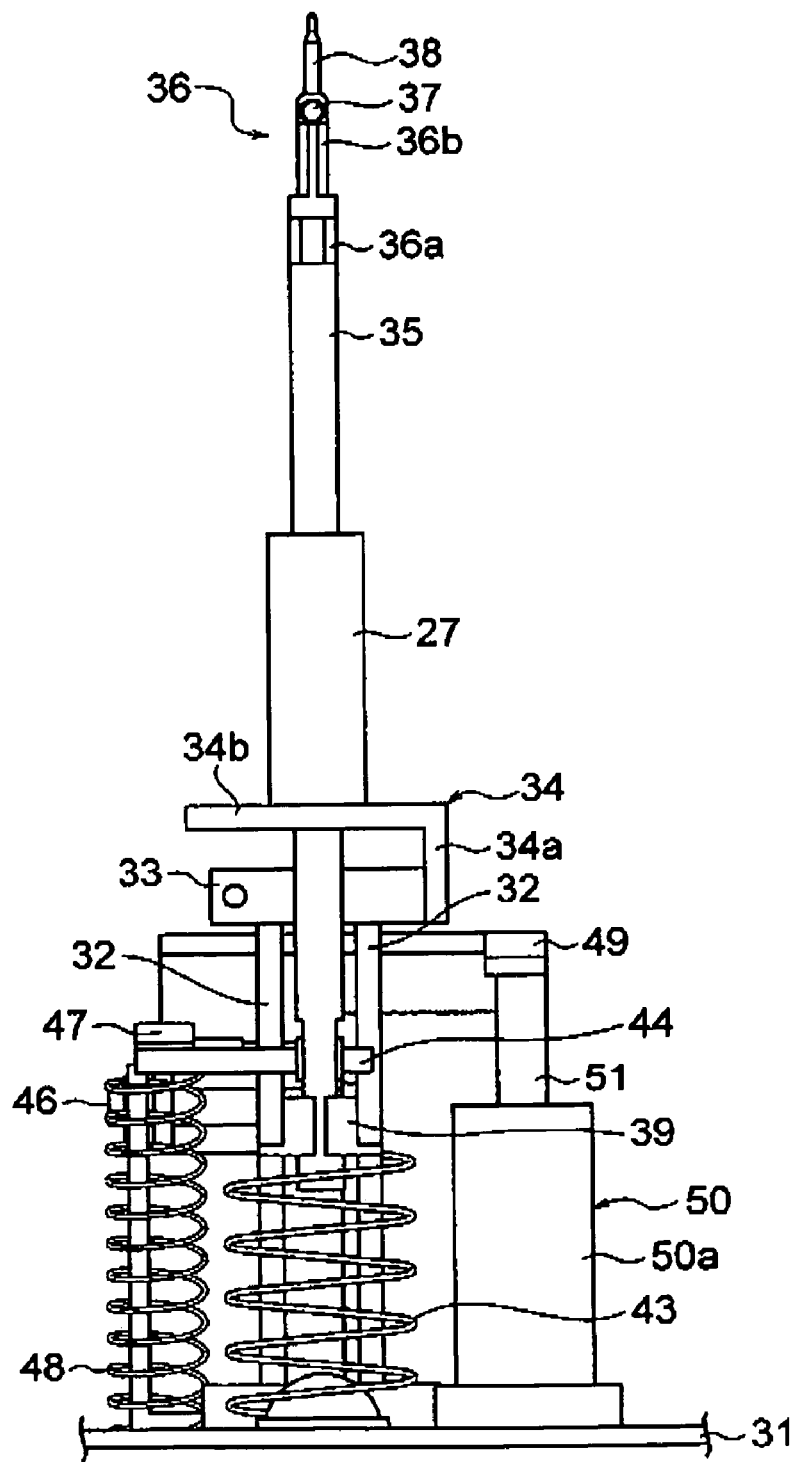
FIG. 14 is a right side view of FIG. 13.

As illustrated in FIGS. 6 to 8, a bracket 39 is provided below the measuring element shaft 35 and is fixed in a lower end portion of the measuring element shaft 35. As illustrated in FIG. 13, between the bracket 39 and the guide supporting member 34, a linear scale 40 (position detector) for detecting a height of the measuring element 36 is interposed.

This linear scale 40 has a stick-shape main scale 41, and a detection head for position information 42 which moves along the main scale 41 and reads position information of the main scale 41.

The detection head for position information 42 is fixed to the connecting member 33, and a lower end portion of the main scale 41 is fixed to the bracket 39 and the main scale 41 is arranged parallel to the measuring element shaft 35 along a vertical direction.

An upper end portion of the main scale 41 is not fixed, and this upper edge portion is inserted into holes provided in the connecting member 33 and the horizontal plate 34b of the guide supporting member 34, and the main scale 41 is capable of up-and-down motion freely.

In this linear scale 40, a movement amount of the main scale 41 is detected by the detection head for position information 42, so that a movement amount in the vertical direction of the measuring element 36 fixed to the main scale 41 in the vertical direction via the bracket 39 is detected. A magnetic type or an optical type linear scale which is the same as the linear scale 24 as described above is also adopted in this linear scale 40.

In addition, as illustrated in FIGS. 6 to 8, between the bracket 39 and the horizontal plate 31, a coil spring 43 is interposed and always urges the measuring element shaft 35 upward.

In the vicinity of a joining part with the bracket 39 of the measuring element shaft 35, an engaging pin 44 is inserted perpendicularly into the measuring element shaft 35 and is fixed.

As illustrated in FIG. 6, on the horizontal plate 31, a bracket 45 which is formed in a U-shape is fixed, and the bracket 45 has facing plates 45a, 45a. In upper portions of the facing plates 45a, 45a, both end portions of a supporting shaft 46 are rotatably held.

A pressing lever 47 and an elevation position regulating lever 49 are fixed to this supporting shaft 46, and these pressing lever 47 and the elevation position regulating lever 49 extend in the same direction to the supporting shaft 46.

Therefore, the pressing lever 47 and the elevation position regulating lever 49 take the supporting shaft 46 as a rotational axis and are rotatable to the bracket 45 fixed on the horizontal plate 31.

Additionally, between the pressing lever 47 and the horizontal plate 31, a coil spring 48 is interposed, and an elastic force in a compressing direction of this coil spring 48 is set to be larger than an elastic force in an extending direction of the coil spring 4 so that the coil spring 48 always adds a force in a pulling-down direction to the pressing lever 47. The pressing lever 47 abuts on an upper portion of the engaging pin 44 from above, and thereby an elevation of the measuring element shaft 35 by the coil spring 43 is regulated.

Below the elevation position regulating lever 49, a linear actuator 50 is provided. The linear actuator 50 has a motor part 50a of a body of the actuator fixed on the horizontal plate 31 and a shaft 51 which projects upward from the motor 50a and is provided parallel to the measuring element shaft 35.

A pulse motor is used for the linear actuator 50. By rotating the shaft 51 of the linear actuator 50 in a normal rotation, the shaft 51 moves upward. By rotating the shaft 51 of the linear actuator 50 in a reverse rotation, the shaft 51 moves downward. The motor part 50a is capable of driving by a control of a controlling-calculating circuit 52 which is described later. Since the upper end portion of the shaft 51 of the linear actuator 50 which moves up and down abuts on the elevation position regulating lever 49 from below, when the shaft 51 is elevated, the pressing lever 47 is elevated with an elevation of the shaft 51, and regulating of the elevation of the measuring element shaft 35 by the pressing lever 47 is released.

Thus, an up-and-down movement mechanism of the measuring element 36 is structured by (be coil spring 43, the supporting shaft 46, the pressing lever 47, the coil spring 48, the elevation position regulating lever 49, the linear actuator 50 and the like.

Figure 10A:
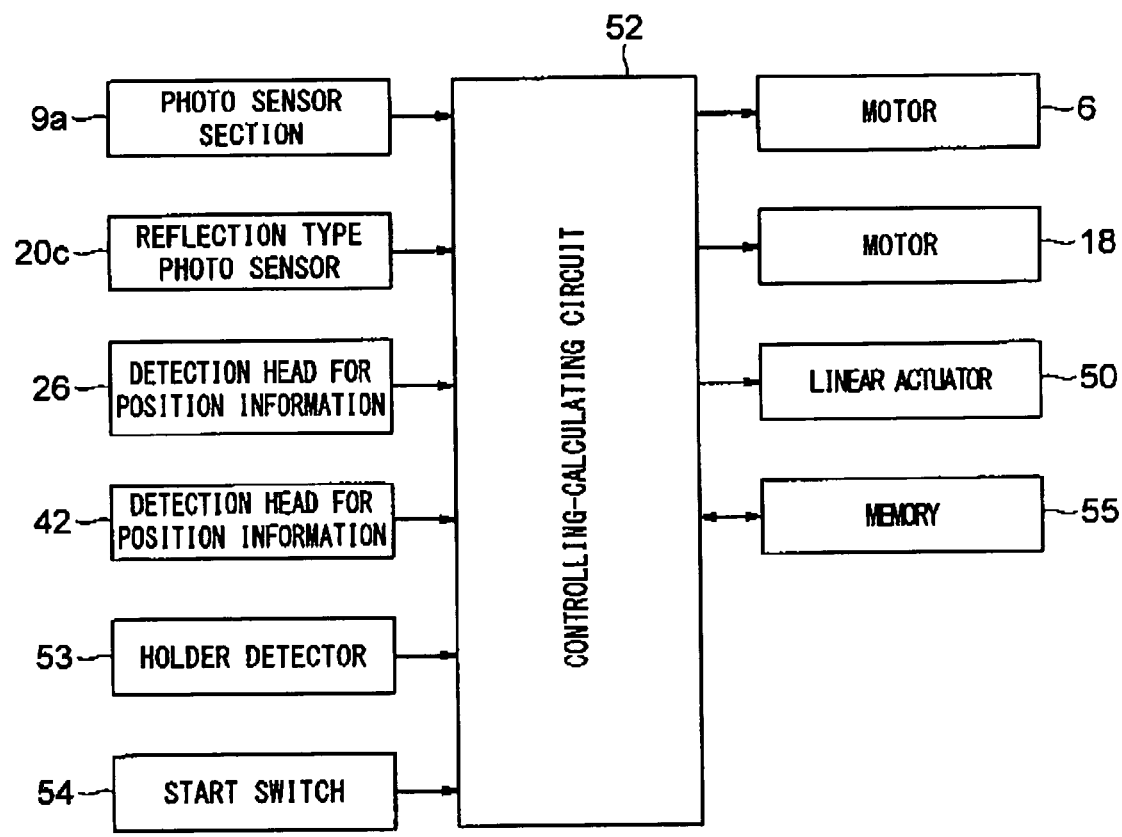
FIG. 10A is a block diagram of a controller of the shape measuring apparatus for eyeglasses illustrated in FIG. 1.
Figure 11:
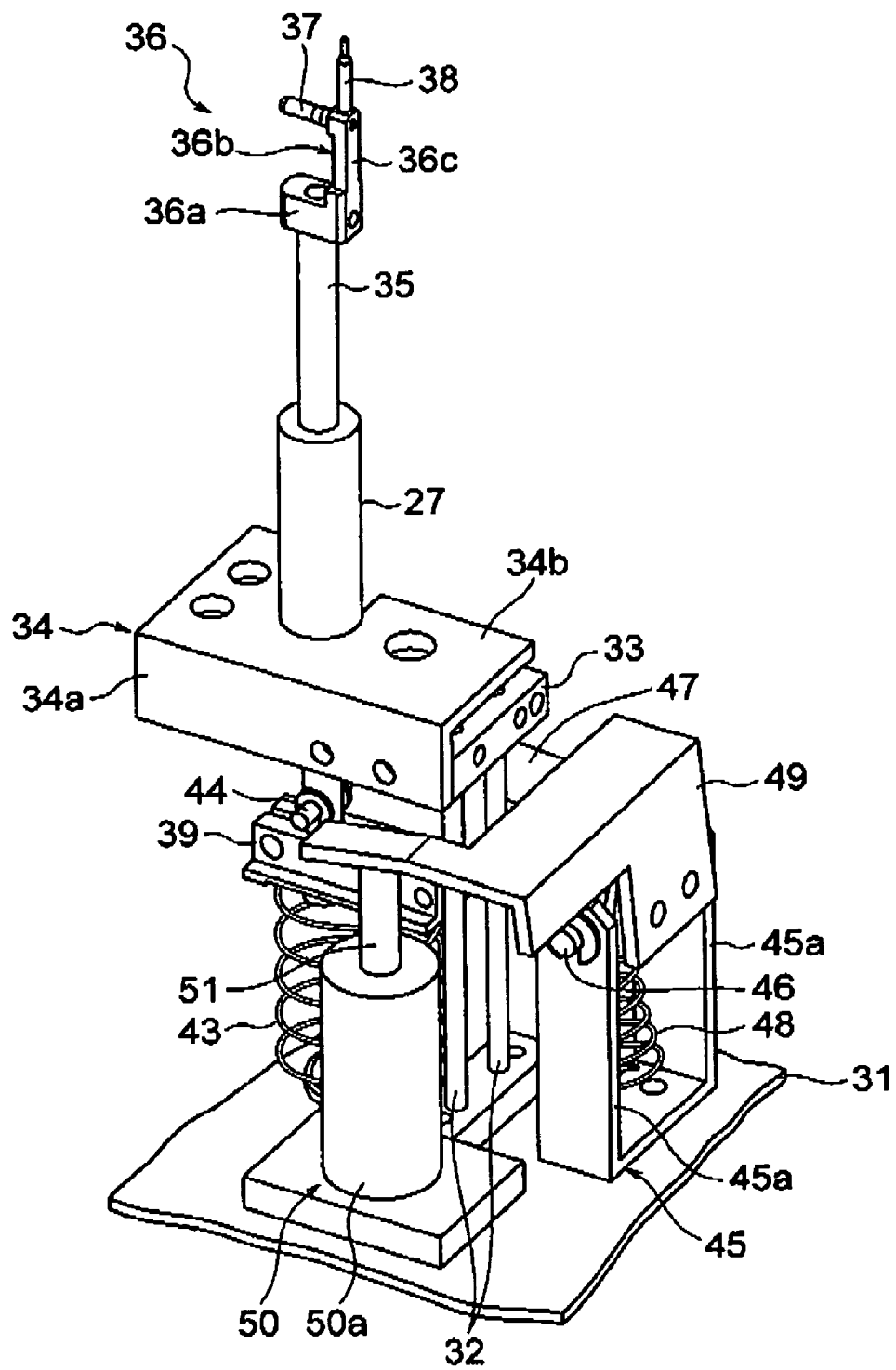
FIG. 11 is a perspective view explaining a function of the moving-up-and-down mechanism of the measuring element of FIG. 6.

In FIG. 10A, a numeral 52 is a controlling-calculating circuit (controlling-calculating section).

A detection signal which indicates a rotation reference position from the photo sensor 9a, a detection signal which indicates a slide reference position from the reflection type photo sensor 20c, a detection signal which indicates a radial coordinate position from the detection head for position information 26 of the linear scale 24, and a detection signal which indicates a height position from the detection head for position information 42 of the linear scale 40 are transmitted to the controlling-calculating circuit (controlling-calculating section) 52.

The controlling-calculating circuit (controlling-calculating section) 52 performs a drive control of motors 6, 18, and the linear actuator 50.

As illustrated in FIG. 1, on one of side plates of the slide frames 3, 3, a holder detector 53 is provided.

The holder detector 53 detects if a lens holder attaches to the slide frames 3, 3, which is described later, or not.

A micro switch or the like is used for the holder detector 53.

As illustrated in FIG. 10A, a detection signal from the holder detector 53 which indicates a mounting of the lens holder is transmitted to the controlling-calculating circuit 52.

Additionally, in FIG. 10A, a numeral 54 is a start switch for starting a measurement, and a numeral 55 is a memory. The start switch 54 and the memory 55 are connected to the controlling-calculating circuit 52.

(Function)

Hereinafter, a function of the shape measuring apparatus for eyeglasses will be explained.

(I) Measurement of an Inner Circumferential Contour Shape of a Lens Frame

Before a shape measurement of a lens frame of eyeglasses or a shape measurement of a lens such as a demo-lens or the like is started by the shape measuring apparatus for eyeglasses, as illustrated in FIGS. 6 to 8, the shaft 51 of the linear actuator 50 is at the lowest position.

In a case where the shaft 51 is at the lowest position, the measuring element shaft 35 is pressed down by the pressing lever 47.

Therefore, before the measurement is started by the shape measuring apparatus for eyeglasses, the measuring element 36 is at the lowest position.

As illustrated in FIG. 7, in a case where a shape measurement of a lens frame LF (RF) of an eyeglass frame MF is performed, for example, by the same method as Japanese patent publication number H10-328992 discloses, right and left lens frames LF (RF) of the eyeglass frame MF are sandwiched by the slide frames 3, 3 and are held by four pairs of the holding bars 3b1, 3b2. The eyeglass frame MF having the right and left lens frames LF (RF) is arranged between the slide frames 3, 3 of FIG. 1 (the eyeglass frame MF is not illustrated in FIG. 1), and the lens frames LF (RF) are sandwiched between the holding bars 3b1, 3b2 as illustrated in FIG. 7.

Before the measurement begins, the lens frames LF (RF) held between the holding bars 3b1, 3b2 are set to be placed higher than the measuring element for the lens frame 37.

That is, the measuring element for the lens frame 37 is placed at a height of a default position (A) which is lower than the lens frames LF (RF).

In addition, the measuring element 36 is placed at approximately a center of a default position (i) in front view of one of the lens frames LF, RF.

In a state before beginning of the measurement, it is set to become a state where the linear scale 24 is detecting a slide reference position of the slider 15 at the same time as a state where the rotation reference position detector described above is detecting a rotation reference position of the rotating base 9.

Additionally, if the lens frames are curved-shape, the holding bars 3b1, 3b2 hold a part which is at the lowest position of the lens frames.

The shape measuring apparatus for eyeglasses of the embodiment of the present invention is configured to start a measurement of a groove position from a groove portion Ym which is at the lowest position of the lens frames LF (RF) in this lens frame holder 3b.

This starting position of the lens frame measurement is taken as a starting position of a shape measurement B.

In a state where the measuring element 36 is at the default position (i), when the start switch is 54 turned on, the controlling-calculating circuit 52 rotates the shaft 51 of the linear actuator 50 in the normal rotation, and from a position illustrated in FIGS. 6 to 8 to a position illustrated in FIGS. 11 to 14, elevates the shaft 51 by only a predetermined distance.

In this case, the shaft 51 lifts up a free end portion of the elevation position regulating lever 49 by only a predetermined distance against the elastic force of the coil spring 48, and integrally turns the elevation position regulating lever 49 with the supporting shaft 46.

With the movement described above, the pressing lever 47 also integrally turns with the supporting shaft 46, and the free end portion is elevated by only a predetermined distance.

By the elevation of the free end portion of the pressing lever 47, the engaging pin 44 follows the free end portion of the pressing lever 47 and is elevated by the elastic force of the coil spring 43, so that the measuring element 36 is elevated by only a predetermined distance.

The elevated distance of the measuring element 36, as illustrated in FIG. 7, is set to be a distance L in which a tip of the measuring element for the lens frame 37 is elevated from the default position (A) to a height (B) of the starting position of the shape measurement B described above.

Next, the controlling-calculating circuit 52 performs a drive control of the motor 18, and the pulley 19 is rotated, so that the slider 15 is moved along the guide rail 14 by the wire belt 20 of FIGS. 2 and 5B.

Figure 12:
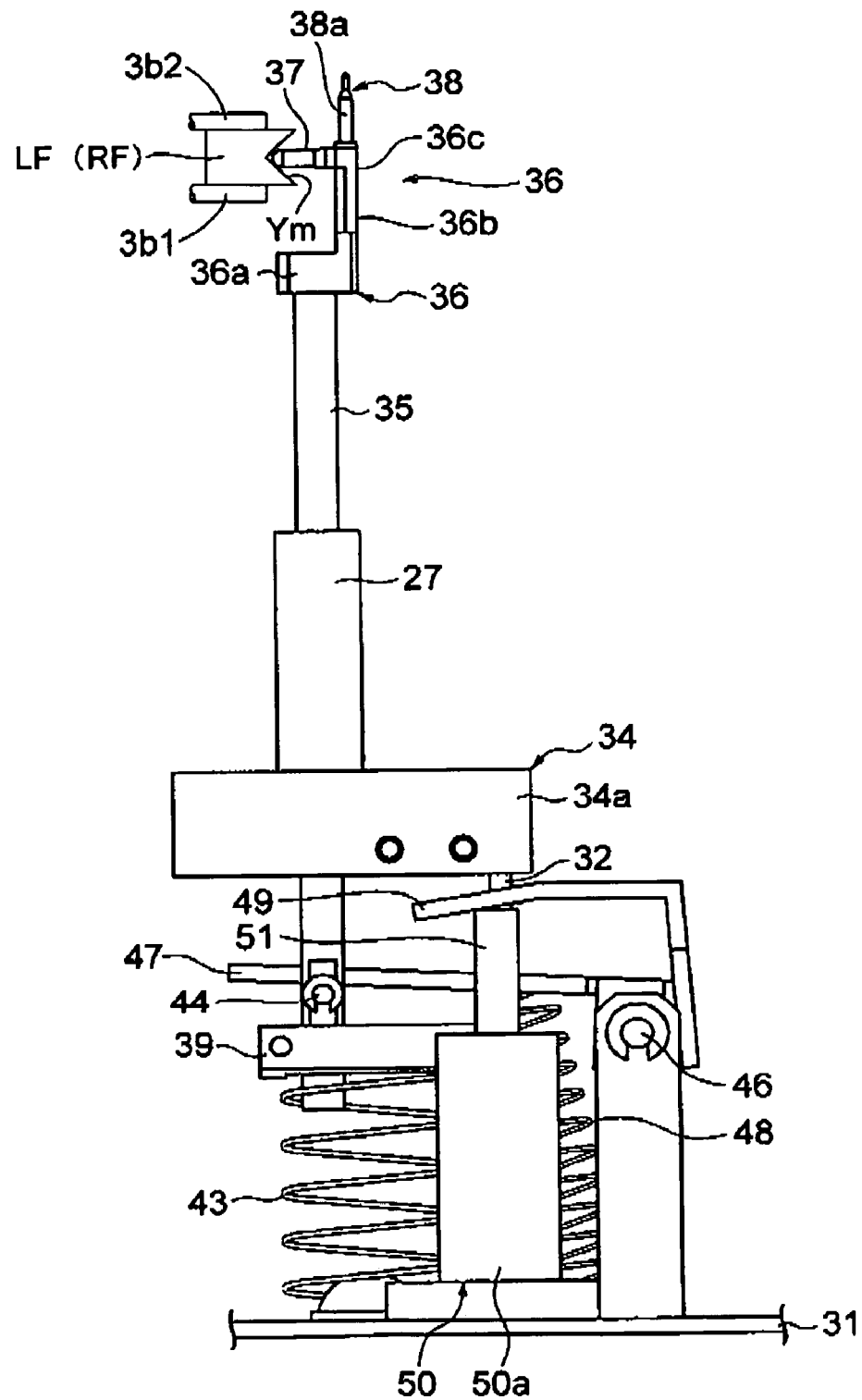
FIG. 12 is an explanatory view of a measurement of the lens frame by the moving-up-and-down mechanism of FIG. 11.

In this case, the slider 15 moves in the direction of an arrow A1 of FIG. 7. By the movement of the slider 15, the tip of the measuring element for the lens frame 37, as illustrated in FIG. 12, abuts on the groove portion Ym at the starting position of the shape measurement B.

As described later, in a case where the tip of the measuring element for the lens frame 37 traces along the groove portion Ym when measuring, the tip of the measuring element for the lens frame 37 is always pressed by the groove portion Ym by an action of the elastic force of the coil spring 23 And in this state, the motor 18 is stopped by the controlling-calculating circuit 52.

When the tip of the measuring element for the lens frame 37 abuts on the groove portion Ym, a load which the motor 18 receives increases, and an electric current flowing into the motor 18 increases, therefore, by detecting this change of the electric current, the controlling-calculating circuit 52 detects that the tip of the measuring element for the lens frame 37 abuts on the groove Ym so that the motor 18 is stopped.

Figure 15:
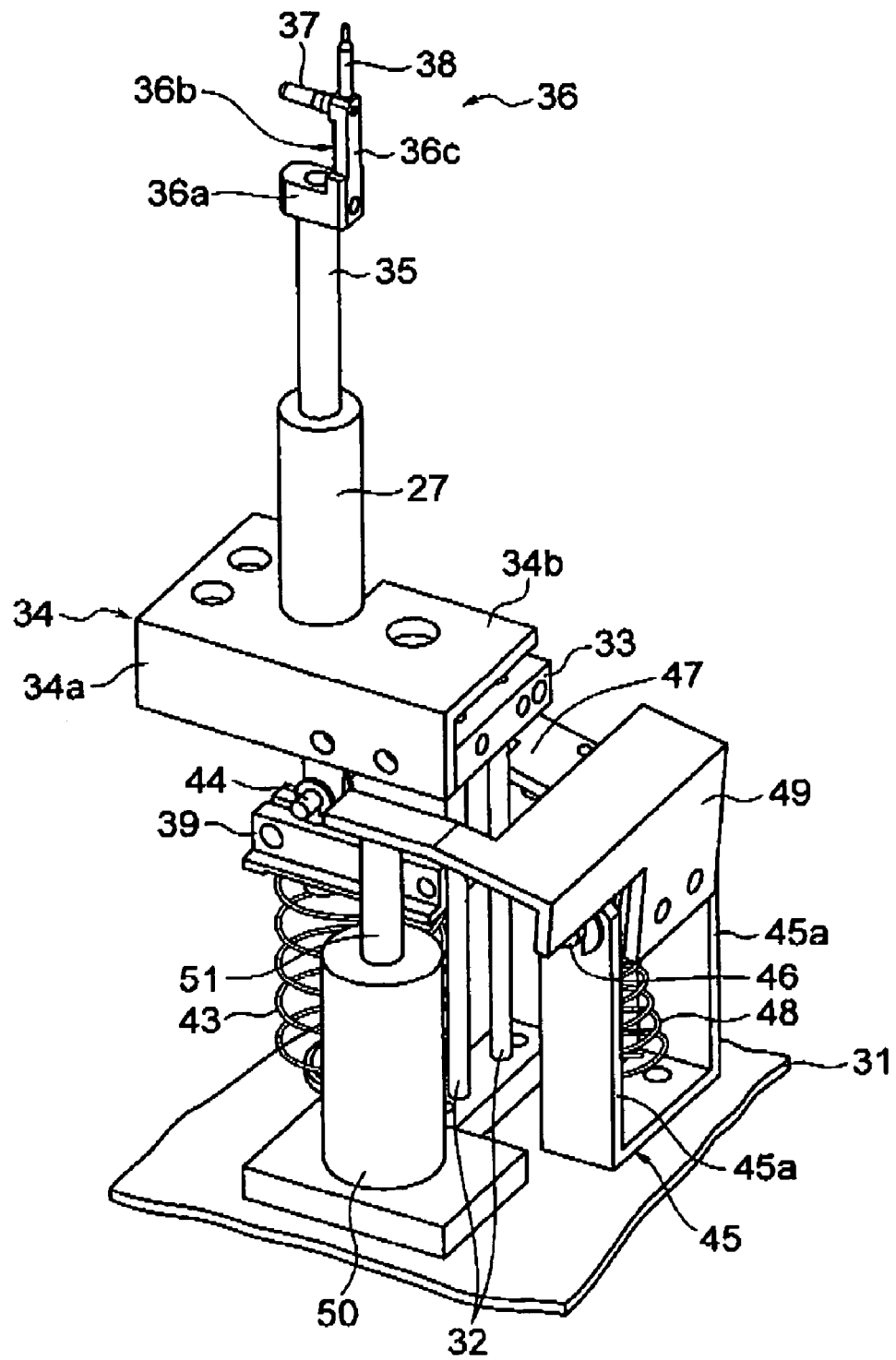
FIG. 15 is a perspective view explaining a function of the moving-up-and-down mechanism of the measuring element of FIG. 6.
Figure 16:
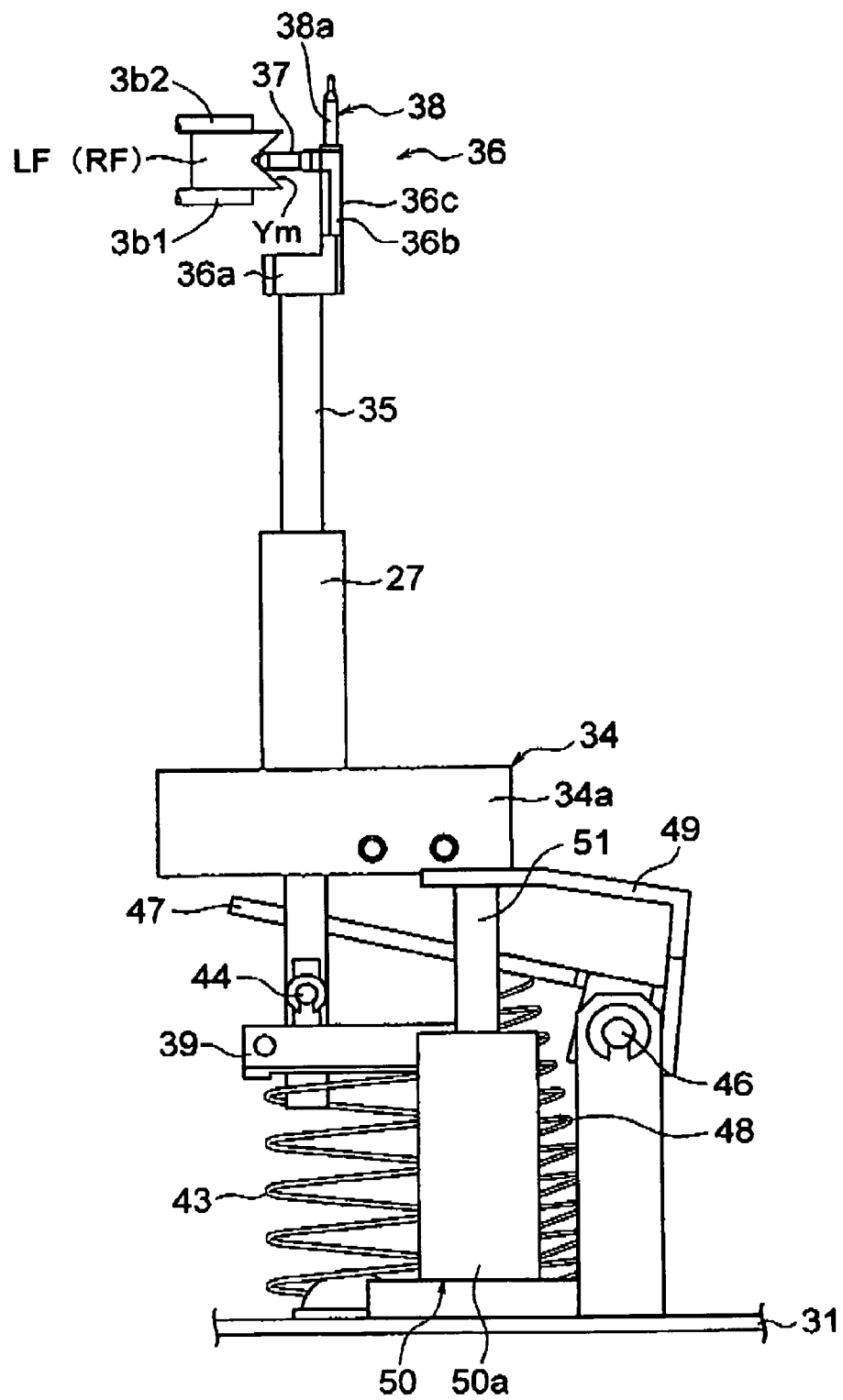
FIG. 16 is an explanatory view of a measurement of the lens frame by the moving-up-and-down mechanism of FIG. 15.
Figure 17:
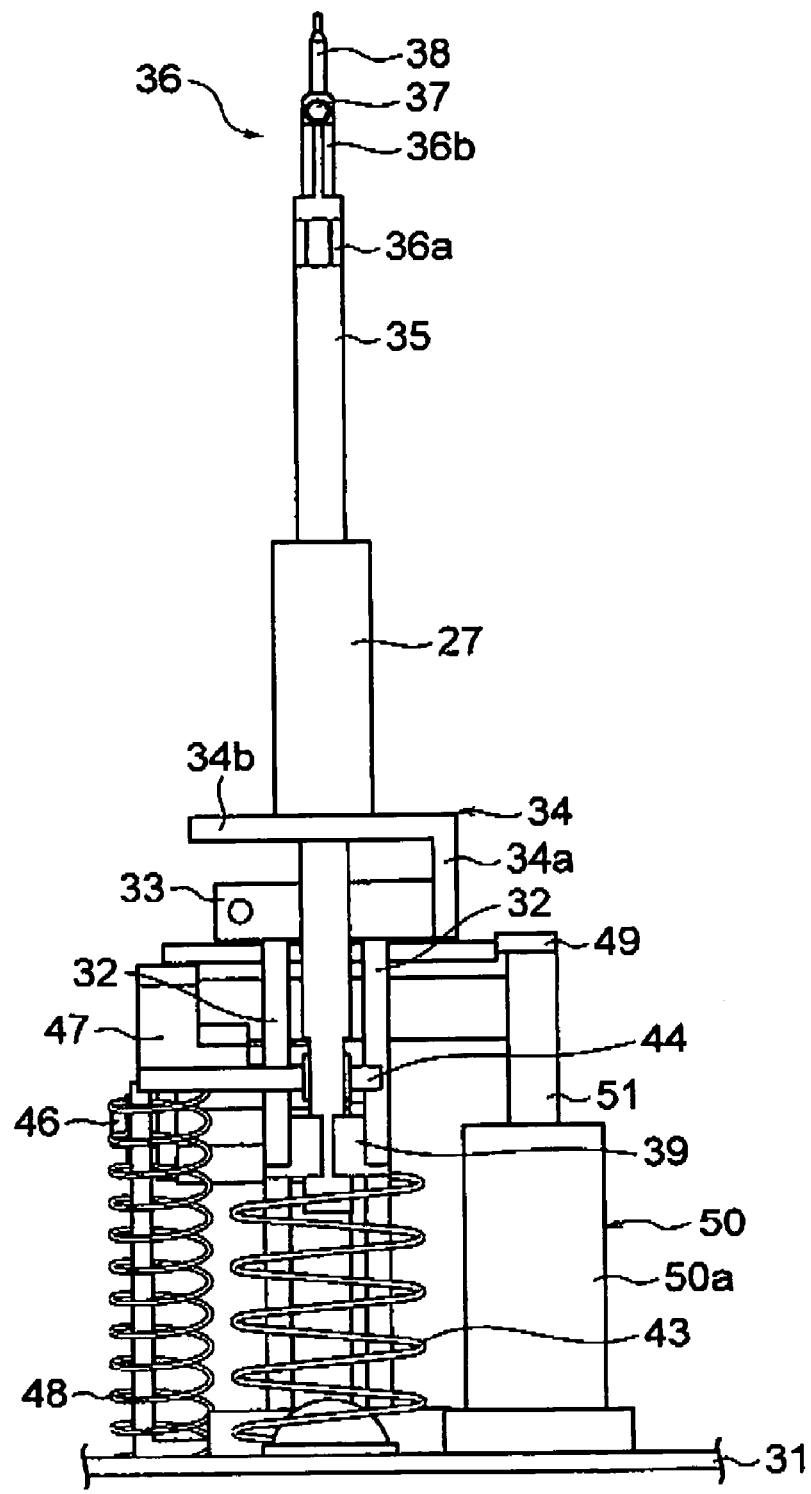
FIG. 17 is a left side view of FIG. 16.

Next, the controlling-calculating circuit 52 further rotates the shaft 51 of the linear actuator 50 in the normal rotation and elevates the shaft 51 by only a predetermined distance from a position illustrated in FIGS. 11 to 14 to a position illustrated in FIGS. 15 to 17.

In this case, the shaft 51 lifts up the free end portion of the elevation position regulating lever 49 by only a predetermined distance against the elastic force of the coil spring 48, and integrally turns the elevation position regulating lever 49 with the supporting shaft 46.

With this movement described above, the pressing lever 47 also integrally turns with the supporting shaft 46, and the free end portion is elevated by only a predetermined distance.

By the elevation of the free end portion of the pressing lever 47, the pressing lever 47 moves away from the engaging pin 44 by only a predetermined distance. Therefore, the tip of the measuring element for the lens frame 37 traces along the groove portion Ym, and accordingly the measuring element shaft 35 is capable of an up-and-down motion.

Next, if the controlling-calculating circuit 52 performs a drive control of the motor 6 and the rotating shaft 6a of the motor 6 is rotated in the normal rotation, a rotation of the rotating shaft 6a is transmitted to the gear 5 via the pinion 7 and the belt 8, so that the rotating base 9 which is integrally provided with the gear 5 on the gear 5 rotates around a rotating shaft of the gear 5 (see FIG. 5A).

When the controlling-calculating circuit 52 performs a drive control of the slider 15 such that the tip of the measuring element for the lens frame 37 always presses the groove portion Ym, and rotates a rotated part at an upper portion of the measuring mechanism 1d the tip of the measuring element for the lens frame 37 moves up and down along the groove Ym and traces the groove Ym.

In this case, the slider 15 is moved integrally with the measuring element for the lens frame 37 along the guide rail 14, therefore a movement amount from the origin position of the slider 15 becomes the same as the movement amount of the tip of the measuring element for the lens frame 37.

This movement amount is calculated by the controlling-calculating circuit 52 based on a signal outputted from the detection head for position information 26 of the linear scale 24.

Since a length from a position of a center axis of the measuring element shaft 35 to the tip of the measuring element for the lens frame 37 is known, by setting this length to the shape measuring apparatus for eyeglasses beforehand, this length is added to the movement amount from the origin position of the slider 15 (the rotational center of the rotating base 9) detected by the detection head for position information 26, so that a radial coordinate $\rho i$ from the rotational center of the rotating base 9 to the tip of the measuring element for the lens frame 37 is calculated by the controlling-calculating circuit 52.

Additionally, if a rotational angle of the rotating base 9 which is measured from the reference position of the rotation described above is taken as a rotational angle $\theta i$, this rotational angle $\theta i$ is calculated based on the number of driving pulses of the motor 6 (information of a driving state of the driver) which rotates and drives the rotating base 9.

With rotating the rotating base 9, the radial coordinate $\rho i$ corresponding to the rotational angle $\theta i$ is measured, so that an inner circumferential contour shape of the groove portion Ym of the lens frame LF (RF) (this shape is approximately a shape of the lens frame LF (RF)) is obtained in a two-dimensional polar coordinate system.

In the shape measuring apparatus for eyeglasses of the embodiment of the present invention, a group of coordinate values ($\rho i$, $\theta i$) expressed in the polar coordinate system is taken as information of the inner circumferential contour shape of the lens frame.

By the way, in a case where the lens frame LF (RF) is curved in the vertical direction, when the tip of the measuring element for the lens frame 37 traces along the groove portion Ym, a displacement amount in the vertical direction by this curve in the vertical direction is obtained as the movement amount in the vertical direction of the measuring element for the lens frame 37.

In particular, this movement amount in the vertical direction, in a case where the measuring element for the lens frame 37 traces, is calculated by the controlling-calculating circuit 52 based on a signal outputted by the detection head for position information 42 of the linear scale 40.

In the shape measuring apparatus for eyeglasses of the embodiment of the present invention, the displacement amount of the measuring element for the lens frame 37 in the vertical direction measured from the origin position, that is, a position (height) in the vertical direction is taken as a position Zi.

Therefore, information of the inner circumferential contour shape of the groove portion Ym of the lens frame LF (RF), that is, information of the contour shape of the groove portion Ym of the lens frame LF (RF) is finally obtained as a group of three-dimensional coordinate values (coordinate values of cylindrical polar coordinates), ($\rho i$, $\theta i$, Zi).

This obtained three-dimensional information of the inner circumferential contour shape of the lens frame (ρi, θi, Zi) is stored in the memory 55 by the controlling-calculating circuit 52.

In the shape measuring apparatus for eyeglasses according to the embodiment, in a case of a measurement of the inner circumferential contour shape, a drive control of a motor 409 is performed, so that a driving roller 410 illustrated in FIG. 1E is rotated normally or reversely and a belt 408 wound around the driving roller 410 is moved in the right direction or in the left direction in FIG. 1E. And thereby, as illustrated in FIG. 2, the slide frames 3, 3 entirely are slidable in a direction indicated by the arrow D, centering on the virtual, rotational axis 402 (center of the curvature of a guide rail 403).

In addition, in the shape measuring apparatus for eyeglasses according to the embodiment, for example, even if in a case where an inner circumferential contour shape of the lens frame of eyeglass frame which exceeds a base curve of 8 is measured, in a state where the eyeglass frame is held by the slide frames 3, 3 by the lens frame holding mechanism 1b, the curvature center of the eyeglass frame is set to be a position close to a virtual rotational axis 402. Moreover, a drive control of the slide frames 3, 3 entirely is performed such that a part of the eyeglass frame which is traced is held to be in approximately a horizontal state, therefore the tip of the measuring element for the lens frame 37 is precisely engaged with the groove portion Ym, and an accurate shape of the lens frame of eyeglasses is measured.

In addition, the tip of the measuring element for the lens frame 37 traces a deepest part of the groove portion Ym, therefore it prevents the tip of the measuring element for the lens frame 37 from slipping from the groove Ym. And the tip of the measuring element for the lens frame 37 always traces the deepest part of the groove portion Ym, so that the inner circumferential contour shape of lens frame is precisely measured, and thereby a measurement of a distance between centers of each lens frame of the eyeglass frame, that is, a measurement of a frame PD is precisely performed.

Figure 17A:
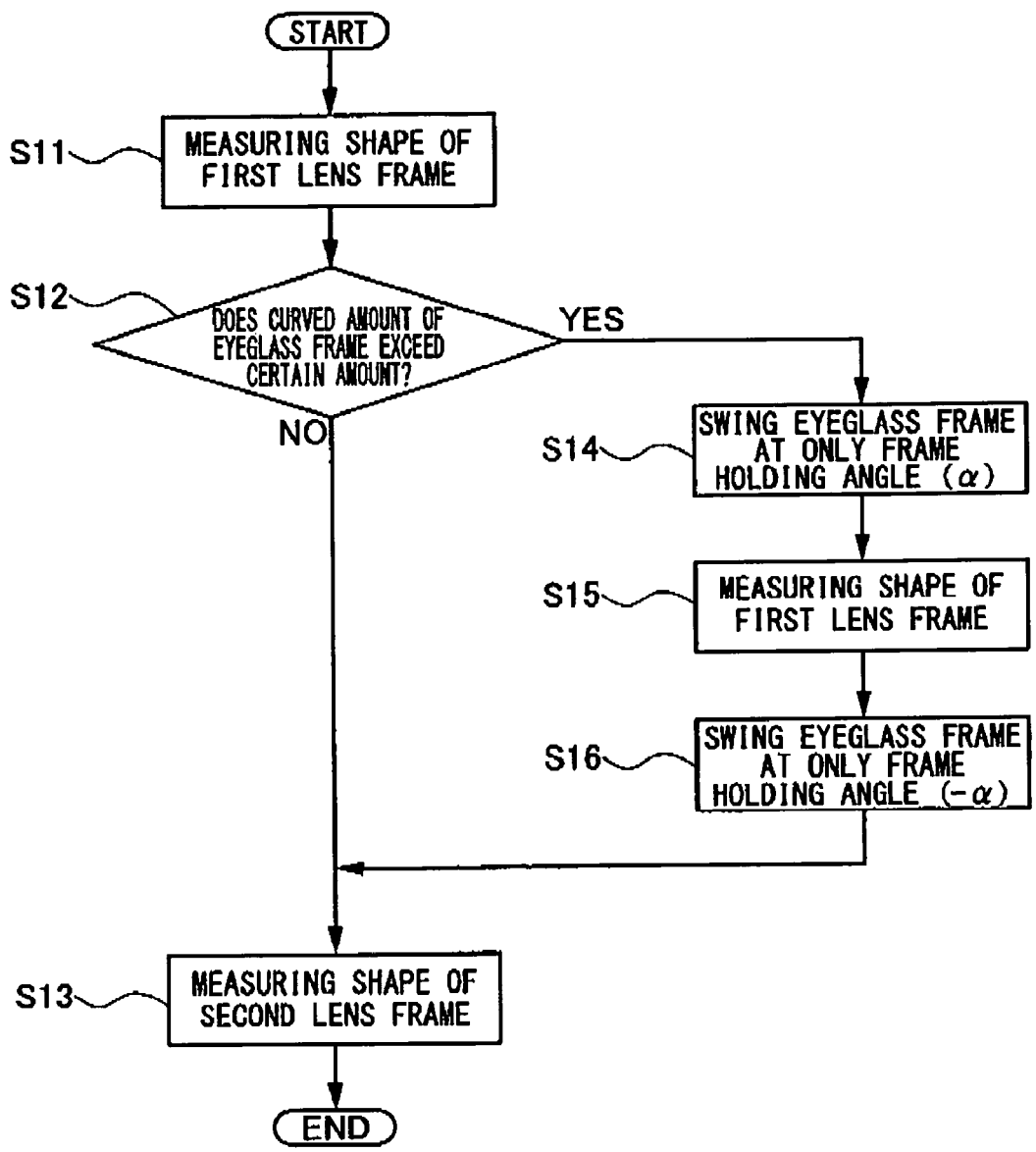
FIG. 17A is a flow chart illustrating an operation in a case where an inner circumferential contour shape of each lens frame of an eyeglass frame is measured.

FIG. 17A is an explanatory flow chart of a control in a case where the slide frames 3, 3 entirely are swung in the direction of an arrow D.

Figure 17B:
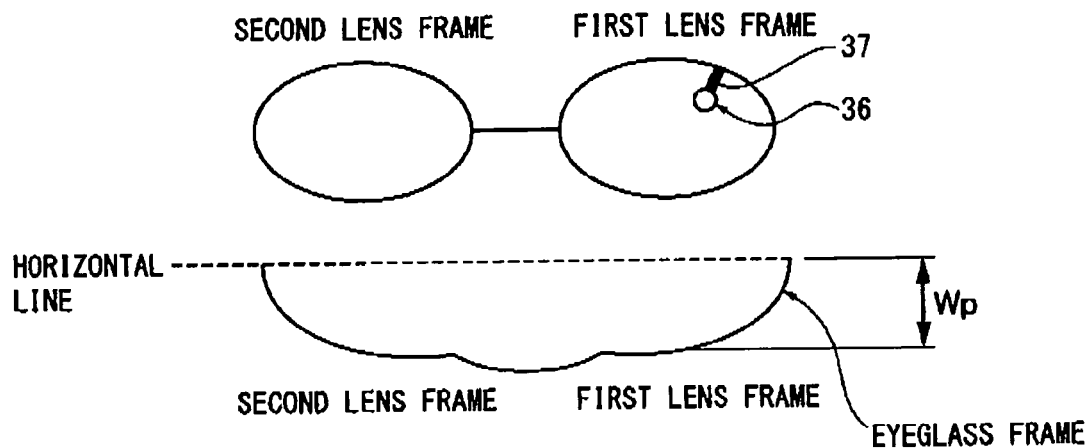
FIG. 17B specifically illustrates a movement by an operation of FIG. 17A and illustrates a manner where a first lens frame is measured in a case where the eyeglass frame is in a horizontal state.
Figure 17C:
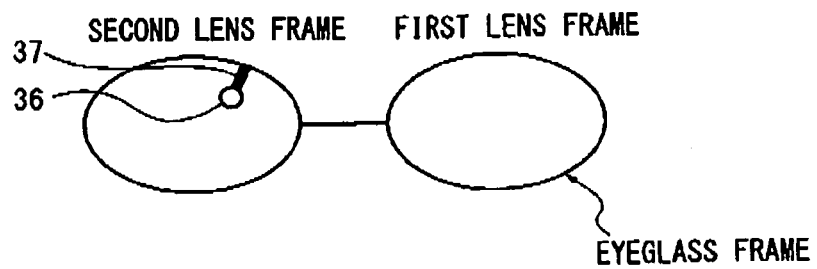
FIG. 17C specifically illustrates a movement by an operation of FIG. 17A and illustrates a manner where a second lens frame is measured where the eyeglass frame is in a horizontal state.

FIGS. 17B and 17C are specifically explanatory views of the movement of the shape measurement apparatus for eyeglasses by the control illustrated in FIG. 17A.

A following control is performed by the controlling-calculating circuit 52 (see FIG. 10A) as a controlling-calculating section.

Firstly, in a step S11, the controlling-calculating circuit 52 controls a holder swing mechanism S comprising, the guide rail 403, the supporting rollers 406, 407, the belt 408, the motor 409, the driving roller 410 and the like, and the slide frames 3, 3 which hold the eyeglass frame are in a horizontal state (see FIG. 17B), and a shape measurement of a first lens frame of the eyeglass frame is performed.

In a step S12, the controlling-calculating circuit 52 judges if a curve amount Wp of the eyeglass frame exceeds a certain value or not.

In a case where the curve amount Wp of the eyeglass frame does not exceed the certain value, an operation of a step S13 is performed, and in a case where the curve amount Wp of the eyeglass frame exceeds the certain value, an operation of a step S14 is performed.

In the step S13, the controlling-calculating circuit 52 performs a shape measurement of a second lens frame of the eyeglass frame, while maintaining the slide frames 3, 3 in the horizontal state (see FIG. 17C).

Figure 17D:
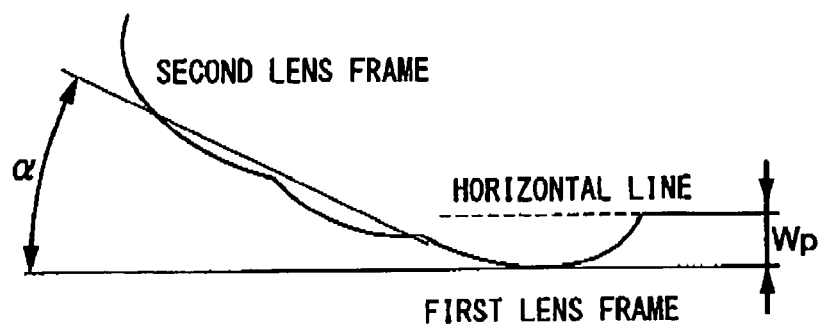
FIG. 17D illustrates a sequel movement of FIG. 17B and illustrates a manner where the eyeglass frame is swung at only a frame holding angle ($\alpha$).

In the step S14, the controlling-calculating circuit 52 controls the holder swing mechanism S, and the slide frames 3, 3 are swung in one direction (see FIG. 17D). This swing angle is set to be an amount which negates the curve amount Wp of the eyeglass frame (this is taken as a frame holding angle (α)).

Figure 17E:
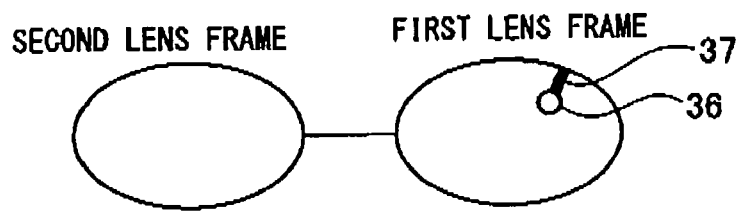
FIG. 17E illustrates a sequel movement of FIG. 17B and illustrates a manner where the first lens frame is measured.

And in a step S15, the shape measurement of the first lens frame in a state of being swung is performed again (see FIG. 17E). The swing angle this time is stored in the memory 55 (see FIG. 10A).

Figure 17F:
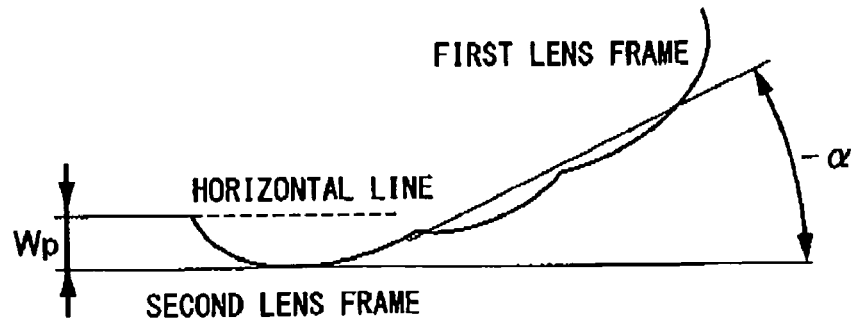
FIG. 17F illustrates a sequel movement of FIG. 17 and illustrates a manner where the eyeglass frame is swung at only a frame holding angle ($-\alpha$).

Next, in a step S16, the controlling-calculating circuit 52 controls the holder swing mechanism S and the slide frames 3, 3 are swung in an opposite direction to the one direction described above in order to perform the shape measurement of the second lens frame of the eyeglass frame (see FIG. 17F).

In this case, the controlling-calculating circuit 52 swings the slide frames 3, 3 based on the swing angle stored in the memory 55.

That is, the controlling-calculating circuit 52 swings the slide frames 3, 3 at only the frame holding angle (−α) so that the second lens frame is in the horizontal state. And the operation of the step S13 is performed. That is, the shape measurement of the second lens frame is performed in this state.

As described above, the frame holding angle (α) is stored in the memory 55, and based on the stored result, the slide frames 3, 3 are swung at only the frame holding angle (−α), and thereby the inner circumferential contour shape measurement of the first lens frame and the inner circumferential contour shape measurement of the second lens frame are performed in which each lens frame is approximately in the horizontal state. Therefore, in a case of the shape measurement of the lens frame, an angle deviation of the tip of the measuring element for the lens frame 37 and the groove portion Ym can be small, and thereby a measurement error can be reduced.

(II) Contour Shape Measurement of a Lens for Eyeglasses such as a Demo Lens or the Like In the shape measuring apparatus for eyeglasses according to the embodiment, not only the inner circumferential contour shape of the lens frame of the eyeglass frame but also the contour shape of the lens for eyeglasses are measured.

(II-a) Setting of the Lens for the Eyeglass such as the Demo Lens or the Like

Figure 23A:
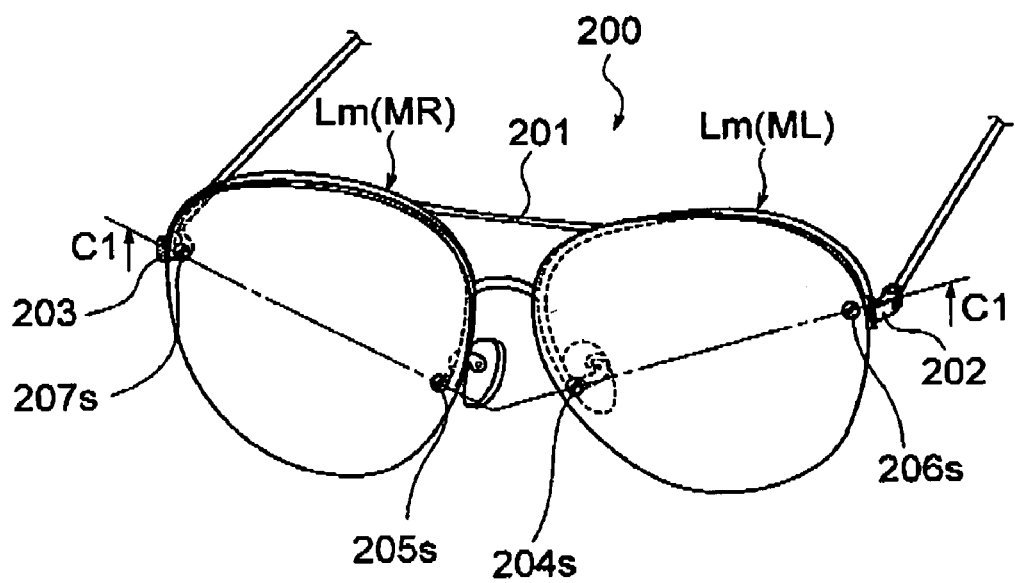
FIG. 23A is a perspective view of an example of 2-point lens frame eyeglasses.
Figure 23B:
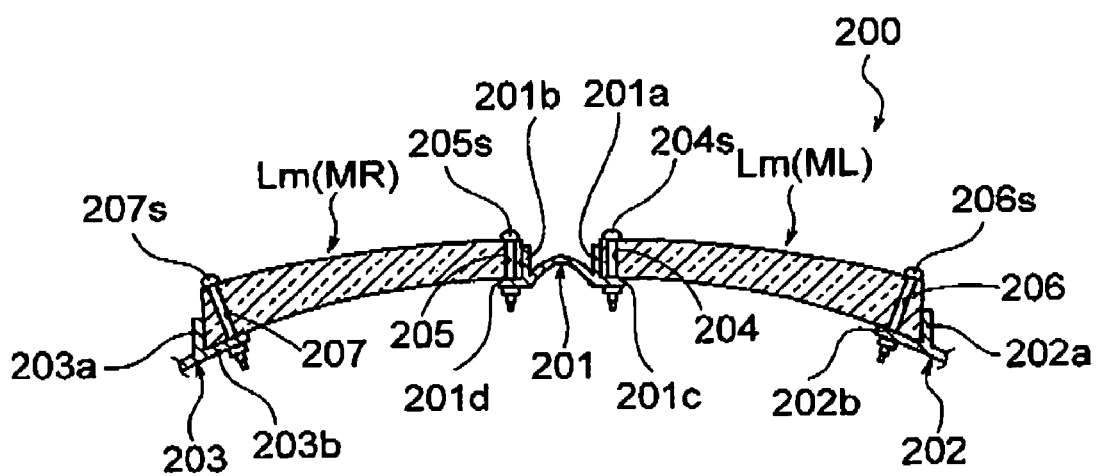
FIG. 23B is a cross-sectional view of FIG. 23A taken along a line C1-C1.

In a case where the shape measurement of right and left lenses Lm (MR), Lm (ML) of a two-point frame eyeglass 200 as illustrated in FIGS. 23A and 23B (demo lenses for the eyeglass) is performed, for example, it is possible to use a lens holder disclosed in Japanese patent publication number H10-328992 or H08-294855.

To hold a lens such as the demo lens or the like by the lens holder disclosed in Japanese patent publication number H10-328992, it is possible to adopt a suction pad and a suction pad holding mechanism disclosed in Japanese patent publication number H08-294855.

Since a mechanism of this lens holder is not a subject of the present invention, details will not be explained.

The lens such as the demo lens or the like is held by the lens holder described above, and the lens holder is held between the slide frames 3, 3. The side plates of the lens holder disclosed in Japanese patent publication number H10-328992 are sandwiched between the holding bars 3b1 and 3b2 described above, or a flange provided at a side portion of the lens holder disclosed in Japanese patent publication number H08-294855 is sandwiched between the holding bars 3b1 and 3b2 described above. In this case, the lens held by the lens holder faces its convex surface downward.

In the two-point frame eyeglass 200 illustrated in FIG. 23A, a bridge 201 is mounted between the right and left lenses Lm (MR), Lm (ML) (a space on a nose side), and attachments for temples 202, 203 are respectively mounted in an opposite side (ear side) of the right and left lenses Lm (MR), Lm (ML).

This bridge 201, as illustrated in FIG. 23B, has side plate portions 201a, 201b and fixing plate portions 201c, 201d. The side plate portions 201a, 201b abut on the nose side of circumferential surface of the lenses Lm(MR), Lm(ML). The fixing plate portions 201c, 201d abut on a back surface of the lenses Lm(MR), Lm(ML).

The attachment for the temple 202, as illustrated in FIG. 23B, has a side plate portion 202a and a fixing plate portion 202b. The side plate portion 202a abuts on an ear side of the circumferential surface of the lenses Lm(MR), Lm (ML). The fixing plate portion 202b abuts on the back surface of the lenses Lm (MR), Lm (ML).

The attachment for the temple 203 has a side plate portion 203a and a fixing plate portion 203b. The side plate portion 203a abuts on an ear side of the circumferential surface of the lenses Lm(MR), Lm (ML). The fixing plate portion 203b abuts on the back surface of the lenses Lm (MR), Lm (ML).

And as illustrated in FIG. 23B, the mounting holes 204, 205 are formed in end portions on the nose side (end portions facing each other), and the mounting holes 206, 207 are formed in end portions on the ear side.

A left fixing plate portion 201c of the bridge 201 is fixed to the lens Lm (ML) by a screw 204s inserted into the mounting hole 204, and a right fixing plate portion 201d of the bridge 201 is fixed to the lens Lm (MR) by a screw 205s inserted into the mounting hole 205.

In addition, the fixing plate portion 202b of the attachment for the temple 202 is fixed to the lens Lm (ML) by a screw 206s inserted into the mounting hole 206, and the fixing plate portion 203b of the attachment for the temple 203 is fixed to the lens Lm (MR) by a screw 207s inserted into the mounting hole 207.

Hereinafter, the lenses Lm (ML), LM(MR) will be explained simply as the lens Lm.

(II-b) Abutting Movement 1 of the Measuring Element 36 on the Lens

When the lens holder described above (not illustrated) is attached to the slide frames 3, 3, an attachment of the lens holder to the slide frames 3, 3 is detected by a holder detector 53 provided in one of the slide frames 3, 3 and the holder detector 53 outputs a signal to the controlling-calculating circuit 52.

When the controlling-calculating circuit 52 receives the signal transmitted from the holder detector 53, the controlling-calculating circuit 52 moves the slider 15 from the origin position along the guide rail 14 in a projection direction of the measuring element for the lens frame 37 and places the measuring element 36 outside of the circumference of the lens held by the lens holder described above.

Next, the controlling-calculating circuit 52 elevates the shaft 51 of the linear actuator 50 the same as described above, so that the measuring element for the lens frame 37 is elevated from the default position (A) in FIG, 7 to the height (B).

With this movement, the measuring element 36 is also elevated and a back surface 36c of an upright portion 36b of the measuring element 36 is elevated to a height corresponding to the circumference of the lens held by the lens holder.

Figure 18:
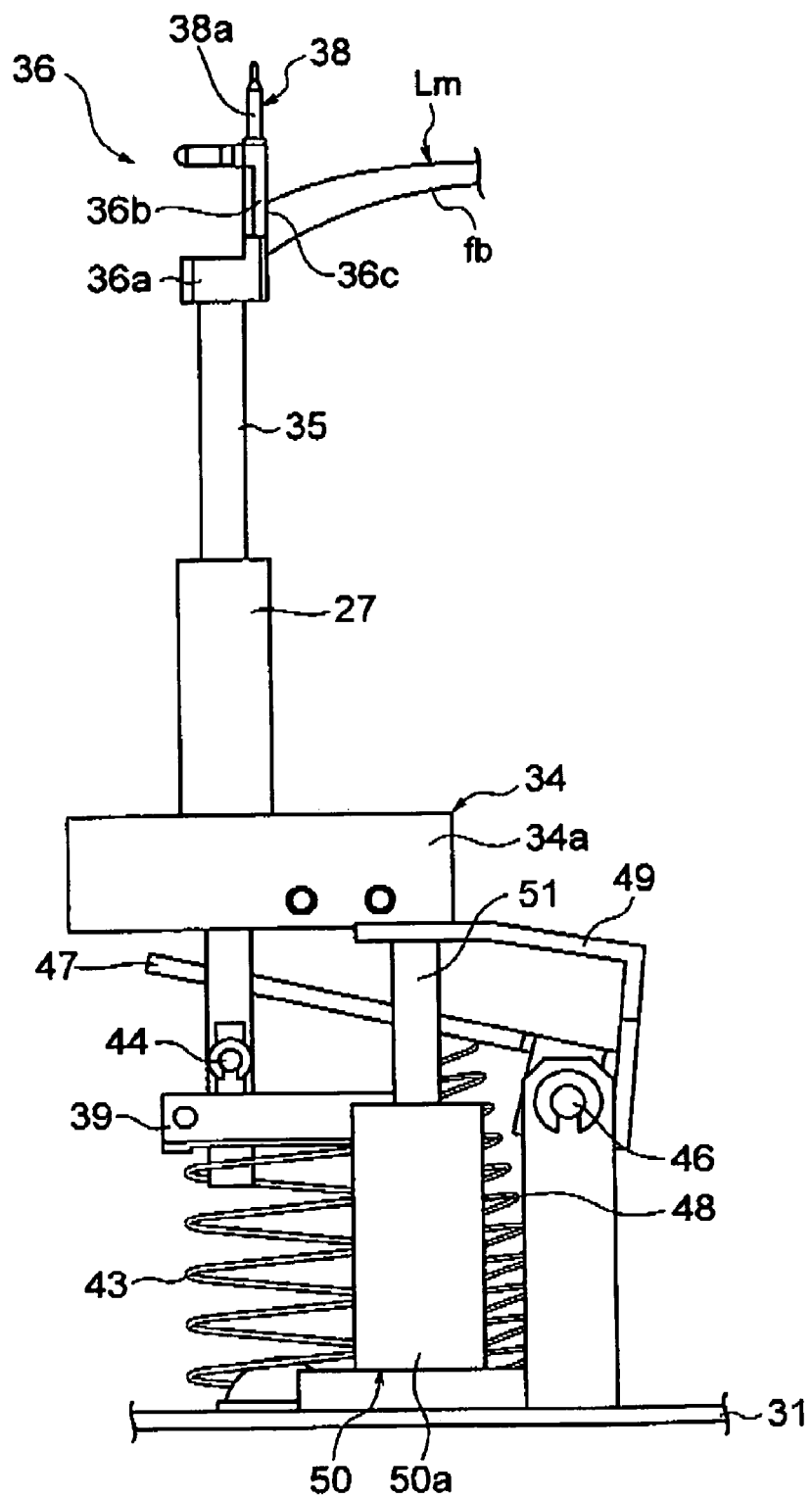
FIG. 18 is a movement explanatory view of a moving-up-and-down mechanism of FIG. 2.

The controlling-calculating circuit 52 performs a drive control of the motor 18, so that the slider 15 is moved to a position where the back surface 36c of the measuring element 36 abuts on a circumferential surface of the lens Lm held by the lens holder, as illustrated in FIG. 18.

The control described above is performed based on data of shapes of standard lenses calculated by experiments performed beforehand and the like.

(II-c) Abutting Movement 2 of the Measuring Element 36 on the Lens

A method in which the measuring element 36 abuts on the circumferential surface of the lens Lm may be a method other than the method described above.

For example, firstly, when the shaft 51 of the linear actuator 50 is elevated, the shaft 51 lifts up a free end portion of the elevation position regulating lever 49 from a position in FIG. 7 to a position in FIGS. 15 to 17, and turns integrally the elevation position regulating lever 49 with the supporting shaft 46.

With this movement, this pressing lever 47 turns integrally with the supporting shaft 46, and the free end portion of the pressing lever 47 is elevated by a predetermined distance.

By the elevation of the free end portion of the pressing lever 47, the engaging pin 44 follows the free end portion of the pressing lever 47 and is elevated by the elastic force of the coil spring 43. Therefore, the measuring element shaft 35 is elevated by only a predetermined distance, the measuring element 36 is elevated, and the measuring element for the lens 38 of the measuring element 36 abuts on the surface of the lens Lm.

Next, the motor 18 is driven and controlled, the slider 15 is moved along the guide rail 14 at a predetermined speed, the measuring element 36 is moved along the surface of the lens Lm to a circumference portion side, and the measuring element 36 is moved to a position which is greatly diverged from the circumference of the surface of the lens Lm.

In this case, the measuring element for the lens 38 is diverged from the circumference of the surface of the lens Lm and elevated by the elastic force of the coil spring 43, and accordingly the measuring element 36 entirely is elevated.

However, the elastic force of the coil spring 43 is weak and an elevation speed of the measuring element 36 is small. Therefore, a movement speed of the measuring element 36 in a direction along the guide rail 14 is set to be relatively small, so that it is possible to prevent a portion other than the measuring element for the lens 38 of the measuring element 36 from hitting the lens Lm.

A position where the measuring element 36 is diverged from the surface of the lens Lm, that is, a diverging position, is detected from a drastic increase of the movement distance in the vertical direction of the measuring element 36 measured by the linear scale 40.

In addition, a position in the horizontal direction where the measuring element 36 is at this diverging position is obtained by a signal from the linear scale 24.

Therefore, the position where the measuring element 36 is diverged from the surface of the lens Lm is obtained as data of three-dimensional coordinates by a detection signal from the linear scales 24, 40 at the diverging position.

And the controlling-calculating circuit 52 performs a drive control of the linear actuator 50 based on the data of three-dimensional coordinates at this diverging position, so that a height of the free end portion of the elevation position regulating lever 49 is adjusted, a height of the free end portion of the pressing lever 47 is adjusted, and a height of the measuring element 36 is adjusted to correspond to a height of the circumference of the lens Lm held by the lens holder.

Next, the controlling-calculating circuit 52 performs a drive control of the motor 18 to transmit a rotation of the rotating shaft 18a of the motor 18 to the slider 15 by the wire belt 20, and controls the slider 15 to move along the guide rail 14 such that as illustrated in FIG. 18 the measuring element 36 moves until abutting on the circumferential surface of the lens Lm held by the lens holder (not illustrated).

And as illustrated in FIG. 18, the measuring element 36 abuts on the circumferential surface of the lens Lm.

(II-d) Contour Shape Measurement of the Lens Lm

Next, the controlling-calculating circuit 52 performs a drive control of the motor 6 to rotate normally the rotating shaft 6a of the motor 6. A rotation of the rotating shaft 6a is transmitted to the gear 5 via the pinion 7 and the belt 8, therefore the rotating base 9 provided integrally with the gear 5 on the gear 5 rotates around a rotating shaft of the gear 5.

When the controlling-calculating circuit 52 performs a drive control of the slider 15 such that the back surface 36c of the measuring element 36 always presses the circumference of the lens and the rotated part at an upper portion of the measuring mechanism 1d is rotated, the back surface 36c of the measuring element 36 moves along the circumference of the lens and traces the circumference of the lens.

In this case, the slider 15 is moved integrally with the measuring element 36 along the guide rail 14, therefore a movement amount from a reference position of the slider 15 is the same as a movement amount of the back surface 36c of the measuring element 36.

This movement amount is calculated by the controlling-calculating circuit 52 based on a signal outputted from the detection head for position information 26 of the linear scale 24.

Additionally, since a length from a center axis of the measuring element shaft 35 to the back surface 36c of the measuring element 36 is known, this length is set to the shape measuring apparatus for eyeglasses beforehand, and thereby a radial coordinate ρi from a rotational center of the rotating base 9 to the back surface 36c of the measuring element 36 is calculated by the controlling-calculating circuit 25 by adding this length to the movement amount from the reference position (the rotational center of the rotating base 9) of the slider 15 detected by the detection head for position information 26.

Therefore, a rotational angle θi measured from the reference position of the rotation is calculated based on the number of driving pulses of the motor 6 which rotates and drives the rotating base 9, and the radial coordinate ρi corresponding to the rotational angle θi is obtained, and thereby the contour shape of the lens Lm is obtained in a polar coordinate system.

In the shape measuring apparatus for eyeglasses of the embodiment of the present invention, a group of coordinate values expressed in the polar coordinate system (ρi, θi) is taken as information of the contour shape of the lens (ρi, θi).

[Detection of a Notch in the Circumference Portion of the Lens]

Figure 30A:
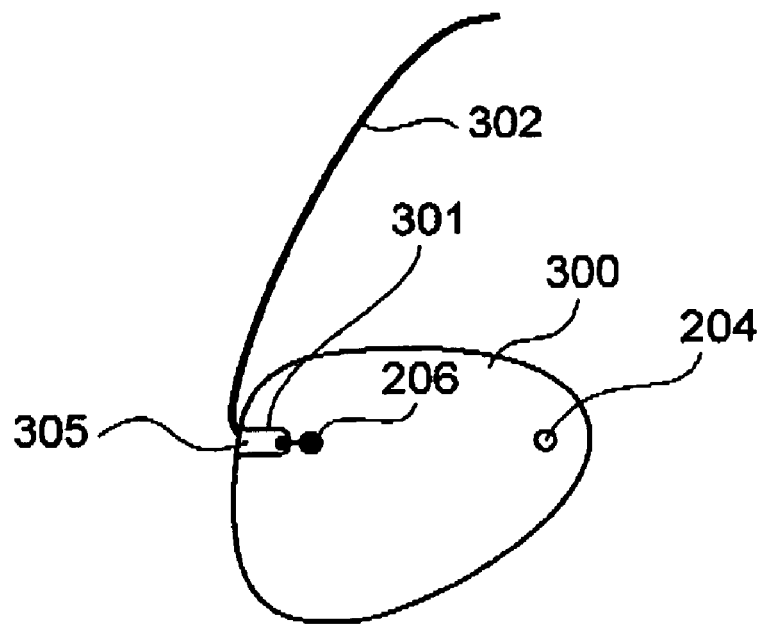
FIG. 30A is an explanatory view of a variant example.

As illustrated in FIG. 30A, there is such a two-point frame that a notch 301 (see FIG. 30B) is provided in the circumference of the lens 300 and an attachment 305 for a temple 302 engages with this notch 301 and the temple 302 is mounted.

Figure 30B:
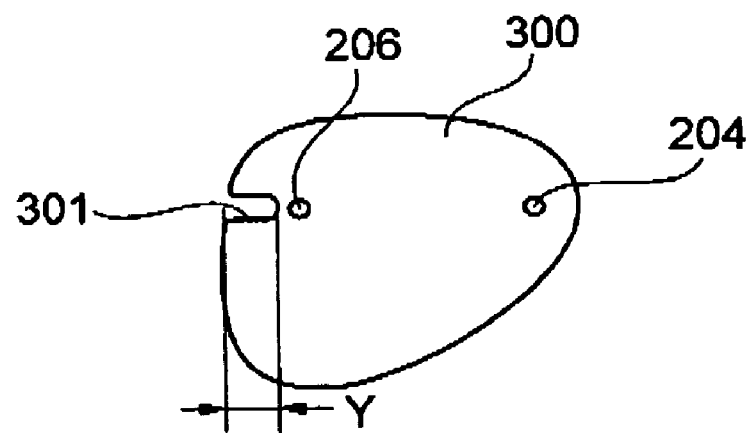
FIG. 30B is an explanatory view of a variant example.

In FIGS. 30A and 30B, a numeral 206 denotes a mounting hole for the attachment 305, and a numeral 204 denotes a mounting hole for the bridge 201 described above.

When the contour shape of the lens having the notch 301 described above is measured, information of a concave shape is measured at a part corresponding to the notch 301 of contour shape data of the lens.

Generally, the notch 301 described above is placed at an upper half of the lens. Therefore, concave-and-convex information by a simple measurement error and the information of the concave shape at the part corresponding to the notch 301 are distinguished by approximate information regarding an existence position of the notch 301 described above, so that a position of the notch 301 is detected from this concave position.

And next, after the notch 301 is detected, a depth of the notch 301 is measured. This depth is taken as a depth Y (see FIG. 30B).

The depth Y of the notch 301 is measured by tracing an inner circumference of the notch 301 by the measuring element for the lens in which a tip is sharp.

The depth of the notch 301 may be inputted by an external inputting section without performing the measurement.

(III) Measurement of a Curvature of the Surface of the Lens Lm

In the contour shape measurement of the lens Lm described in (II-d), only information of a two-dimensional contour shape of the lens (ρi, θi) is obtained.

Figure 19:
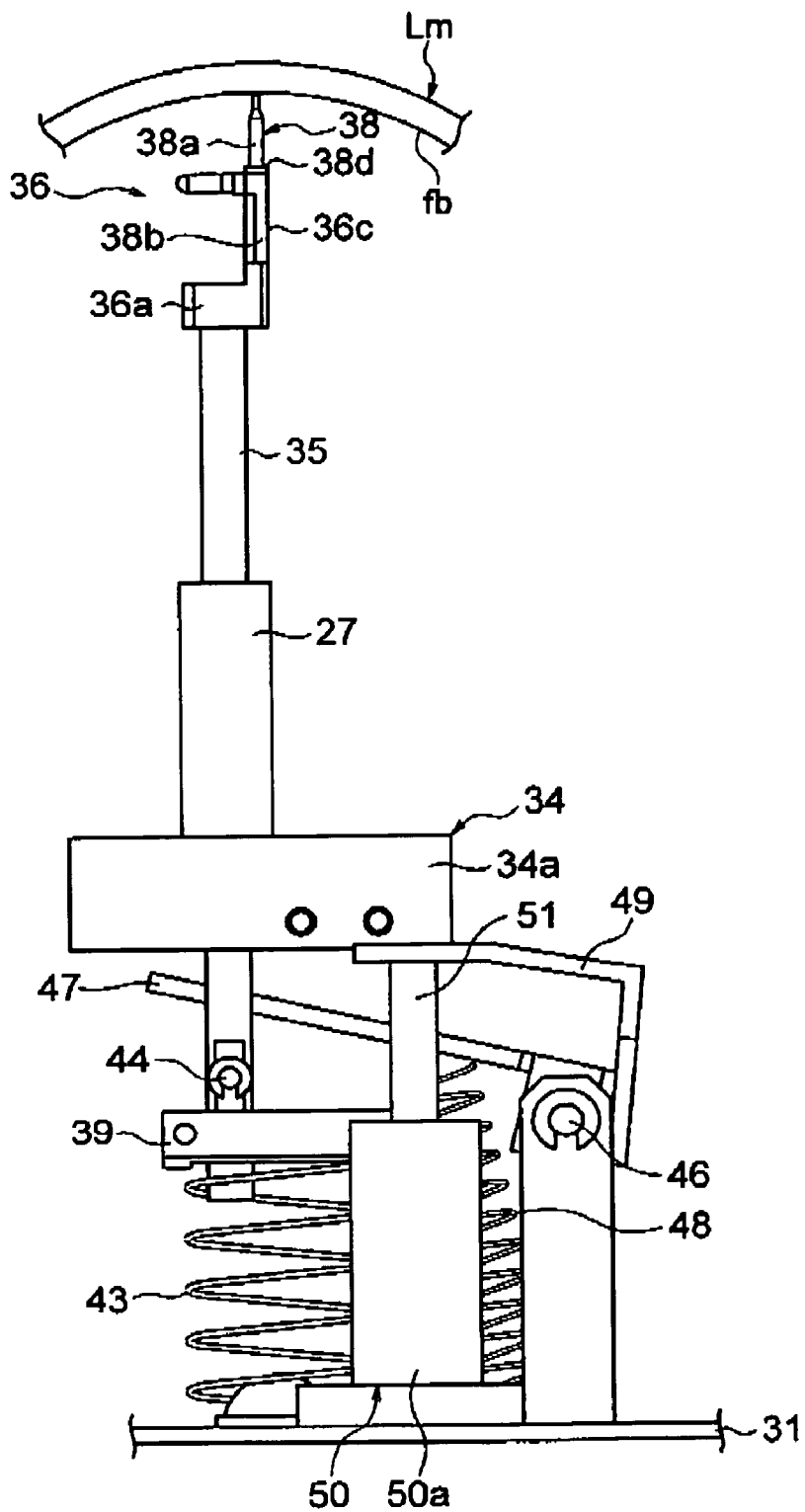
FIG. 19 is a movement explanatory view of the moving-up-and-down mechanism of FIG. 2.

And as illustrated in FIG. 19, a curvature of a surface fb of the lens Lm is measured by tracing the surface fb of the lens Lm by a tip of the measuring element 38, and a position Zbi in the vertical direction of the circumference of the lens Lm in the contour position of the lens (ρi, θi) is theoretically obtained from this measured curvature and the information of the two-dimensional contour shape of the lens (ρi, θi), and thereby the contour shape of the lens Lm is obtained as a group of three-dimensional coordinate values, (ρi, θi, Zbi) (coordinate values of cylindrical polar coordinates).

In the shape measuring apparatus for eyeglasses of the embodiment of the present invention, this group of the coordinate values expressed in a polar coordinate system (ρi, θi, Zbi) is taken as information of the contour shape of the lens.

A length of the circumference of the lens Lm as a demo lens is also theoretically calculated based on this information of the three-dimensional contour shape of the lens (ρi, θi, Zbi).

Hereinafter, a procedure of obtaining the curvature of the surface of the lens Lm will be explained.

A following control is performed by the controlling-calculating circuit 52 (see FIG. 10A) as a controlling-calculating section based on a main program stored in the memory 55.

Here, the lens Lm is held by the lens holder (not illustrated) via the suction pad.

Figure 20:
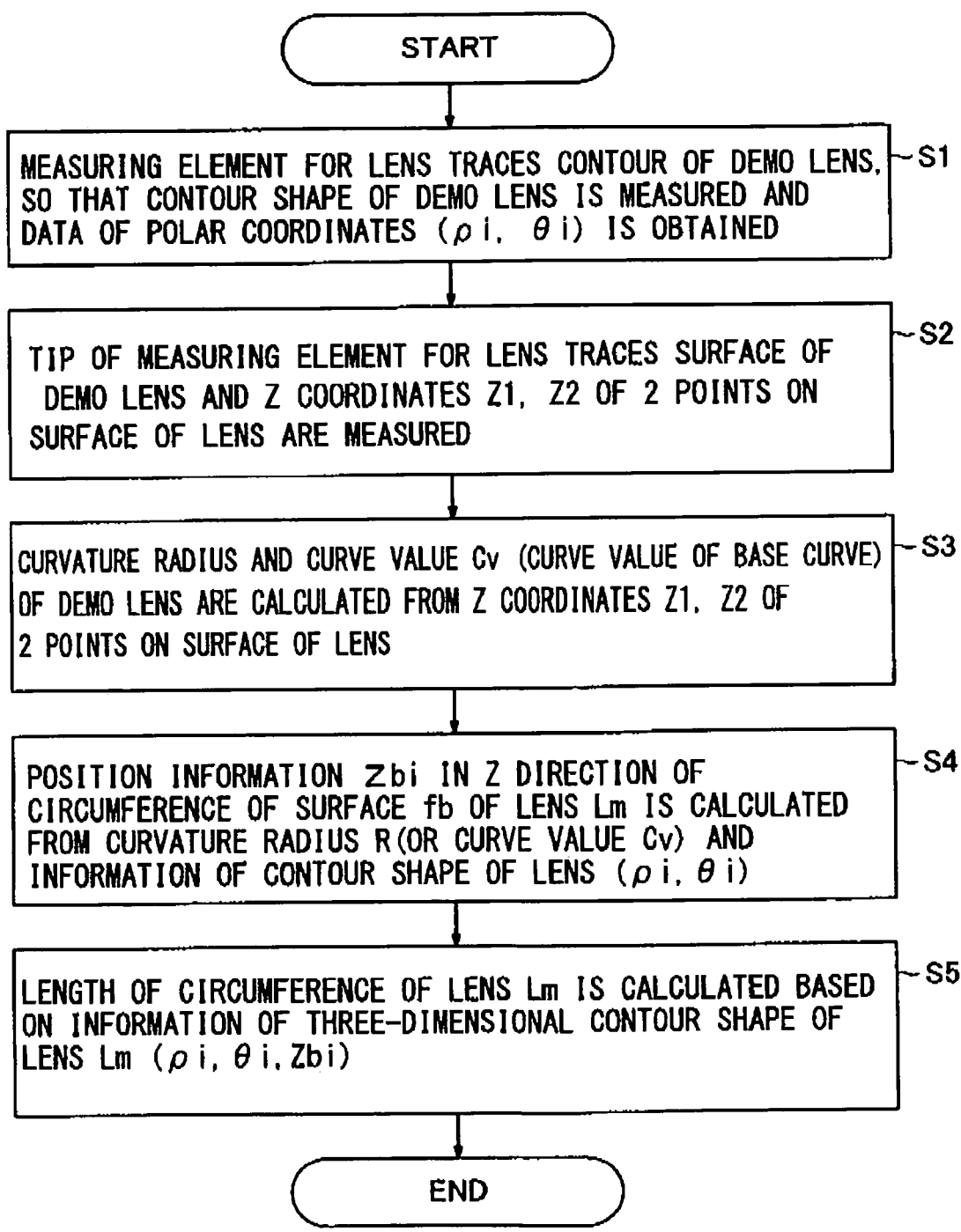
FIG. 20 is a flow chart for obtaining contour shape information and a length of a circumference of a lens by the shape measuring apparatus for eyeglasses of FIGS. 1 to 5.

As illustrated in FIG. 20, firstly, in a step S1, the controlling-calculating circuit 52 obtains the information of the two-dimensional shape of the lens (ρi, θi) by the same procedure as the contour shape measurement of the lens Lm described above, and an operation moves to a step S2.

In the step S2, the controlling-calculating circuit 52 measures the curvature of the surface fb of the lens Lm illustrated in FIG. 19.

Firstly, for this preparation, the same as an abutting movement of the measuring element 36 on a lens of the lens frame, the controlling-calculating circuit 52 elevates the shaft 51 of the linear actuator 50, so that a top end of the measuring element 38 is abutted on the surface fb of the lens Lm held by the lens holder described above by the elastic force of the coil spring 43.

By the way, the lens Lm is held by the suction pad and this suction pad is detachable from the lens holder described above.

The suction pad by which the lens Lm is held is mounted to the lens holder, so that the lens Lm is held by the lens holder.

And in a state where the lens holder is held between the slide frames 3, 3, a center axis (optical axis) of the lens corresponds to a center axis (axis O in FIG. 7) of the measuring element 38 when the slider 15 is at the reference position.

The position of the axis O is taken as an origin P0 in a radial direction of the lens Lm (this is taken as an X direction) at a curvature measurement of the surface of the lens Lm.

Additionally, as illustrated in FIG. 7, when the measuring element for the lens frame 37 is descended at the default position (A), the measuring element 38 is at the lowest position, and a position of the top end (tip) of the measuring element 38 at this time is taken as a default position (C).

Figure 21A:
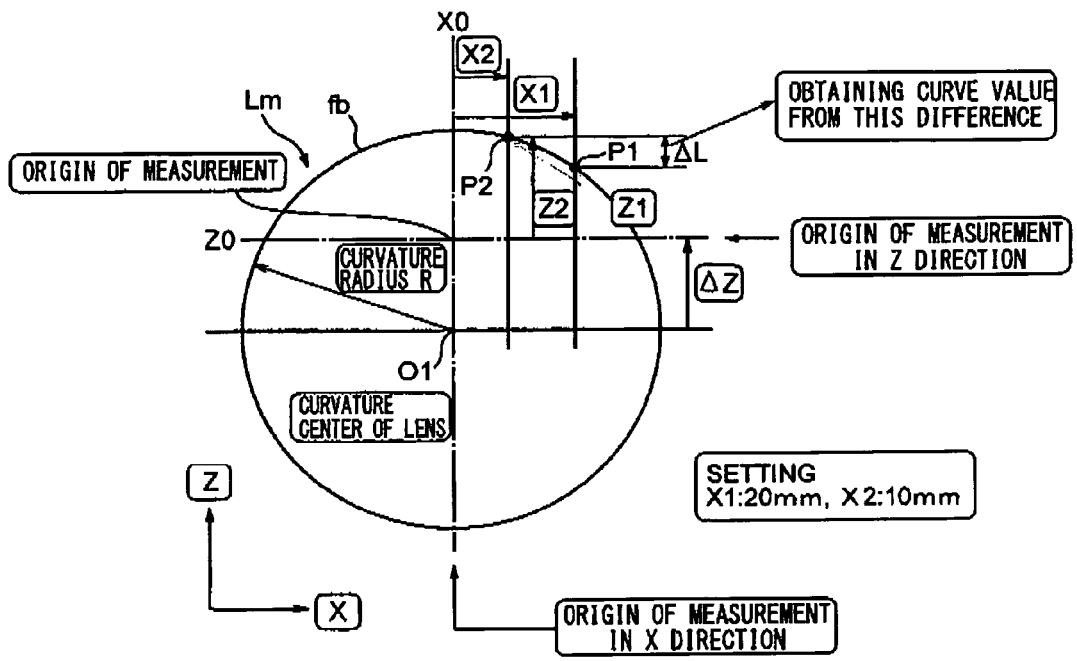
FIG. 21A is an explanatory view regarding a curvature measurement of a lens by the shape measuring apparatus for eyeglasses of FIGS. 1 to 5.
Figure 21B:
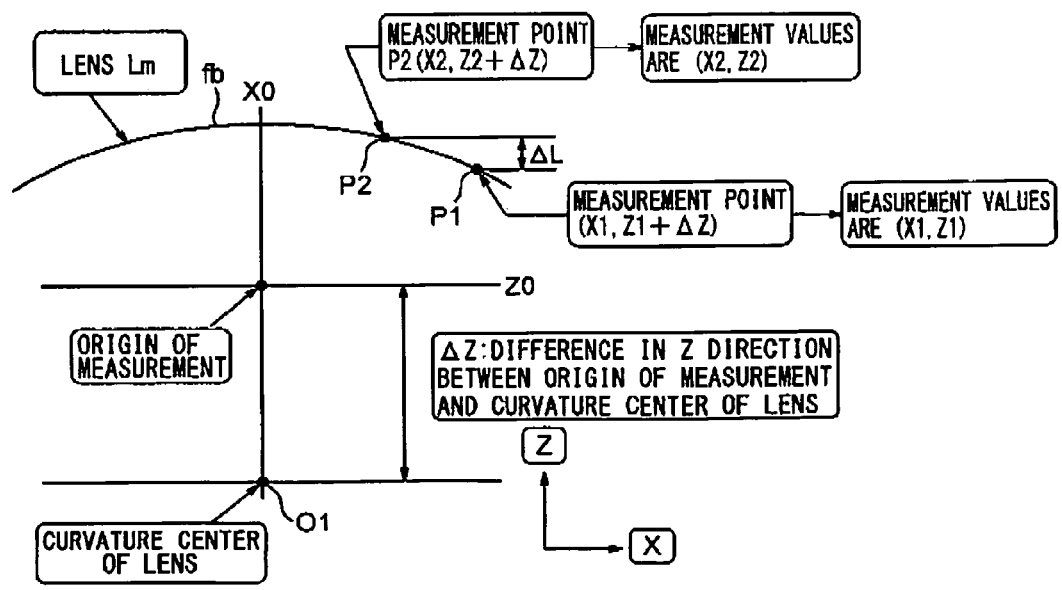
FIG. 21B is a partially enlarged view of FIG. 21A.

This default position (C) is taken as an origin Z0 in a Z direction (vertical direction) of the measurement in FIGS. 21A and 21B.

The controlling-calculating circuit 52 performs a drive control of the motor 18 to move the slider 15 along the guide rail 14 by the wire belt 20 which moves with this motor 18, so that the surface of the lens Lm is traced in the X direction by the tip of the measuring element 38, and the tip of the measuring element 38 is moved to measurement points P2, P1 on the surface of the lens Lm one after another.

The measurement point P2 is a position where only a distance X2 is moved from the origin X0, and the measurement point P1 is a position where only a distance X1(X1>X2) is moved from the origin X0. A movement distance in the X direction, (ΔX=)X1−X2, is set to be a predetermined value (5 mm) which is described later.

The controlling-calculating circuit 52, in a case of a movement of the measuring element 38, calculates and obtains positions Z2, Z1 in the Z direction of the tip of the measuring element 38 when positions in the X direction of the tip of the measuring element 38 abutting on the surface fb of the lens Lm become positions X2, X1 respectively based on a detection signal from the linear scale 40, and the operation moves to a step S3.

In the step S3, the controlling-calculating circuit 52, obtains a curvature radius of the surface fb of the lens Lm and a curve value (base curve) from information of coordinate values of the measurement points P2, P1 obtained from the measurement described above.

By the way, when a distance from the origin Z0 in the Z direction to a curvature center O1 of the surface fb of the lens Lm is taken as a distance ΔZ, a height measured from a height at the curvature center O1 to a height at the measurement point P2 is Z2+ΔZ, and a height measured from the height at the curvature center O1 to a height at the measurement point P1 is Z1+ΔZ.

Therefore, in a rectangular coordinate system where the curvature center O1 of the lens Lm is taken as an origin, coordinates of the measurement point P2 arc (X2, Z2+ΔZ), and coordinates of the measurement point P1 are (X1, Z1+ΔZ).

And the controlling-calculating circuit 52 performs a calculation to obtain a curvature from the coordinates of the measurement point P2 (X2, Z2+ΔZ) and the coordinates of the measurement point P1 (X1, Z1+ΔZ).

A curvature radius of the lens Lm is taken as a curvature radius R, and if a surface of the lens Lm is on a spherical surface of the radius R, an equation of a circle included in a cross-section where the spherical surface of this radius R is cut by an X-Z plane (where the curvature center O1 of the lens Lm is taken as an origin.) is $$X^2+Z^2=R^2.$$

An equation of a circle where the measurement point P1 satisfies $$(X1)^2+(Z1+\Delta Z)^2=R^2. \quad (1)$$

and an equation of a circle where the measurement point P2 satisfies $$(X2)^2+(Z2+\Delta Z)^2=R^2. \quad (2)$$

In these equations, (1)-(2) is expressed by $$(X1)^2-(X2)^2+(Z1+\Delta Z)^2-(Z2+\Delta Z)^2=0.$$

When the above equation is expanded, it is expressed by $$(X1)^2-(X2)^2+(Z1)^2+2(Z1)\cdot\Delta Z+\Delta Z^2-(Z2)^2-2(Z2)\cdot\Delta Z-\Delta Z^2=0,$$

and then expressed by $$(X1)^2-(X2)^2+(Z1)^2+2(Z1)\cdot\Delta Z-(Z2)^2-2(Z2)\cdot\Delta Z=0.$$

And when the above equation is simplified by combining ΔZ, it is expressed by $$[2(Z1)-2(Z2)]\Delta Z=(X2)^2-(X1)^2+(Z2)^2-(Z1)^2.$$

ΔZ is obtained by use of the above equation.

$$\Delta Z = \frac{(X2)^2 - (X1)^2 + (Z2)^2 - (Z1)^2}{Z[(Z1) - (Z2)]} \quad \text{[Number 1]}$$

ΔZ obtained by the above formula [Number 1] is substituted for the equation (1) or (2), so that the curvature radius R is calculated from the measurement values of Z1, Z2.

Figure 22A:
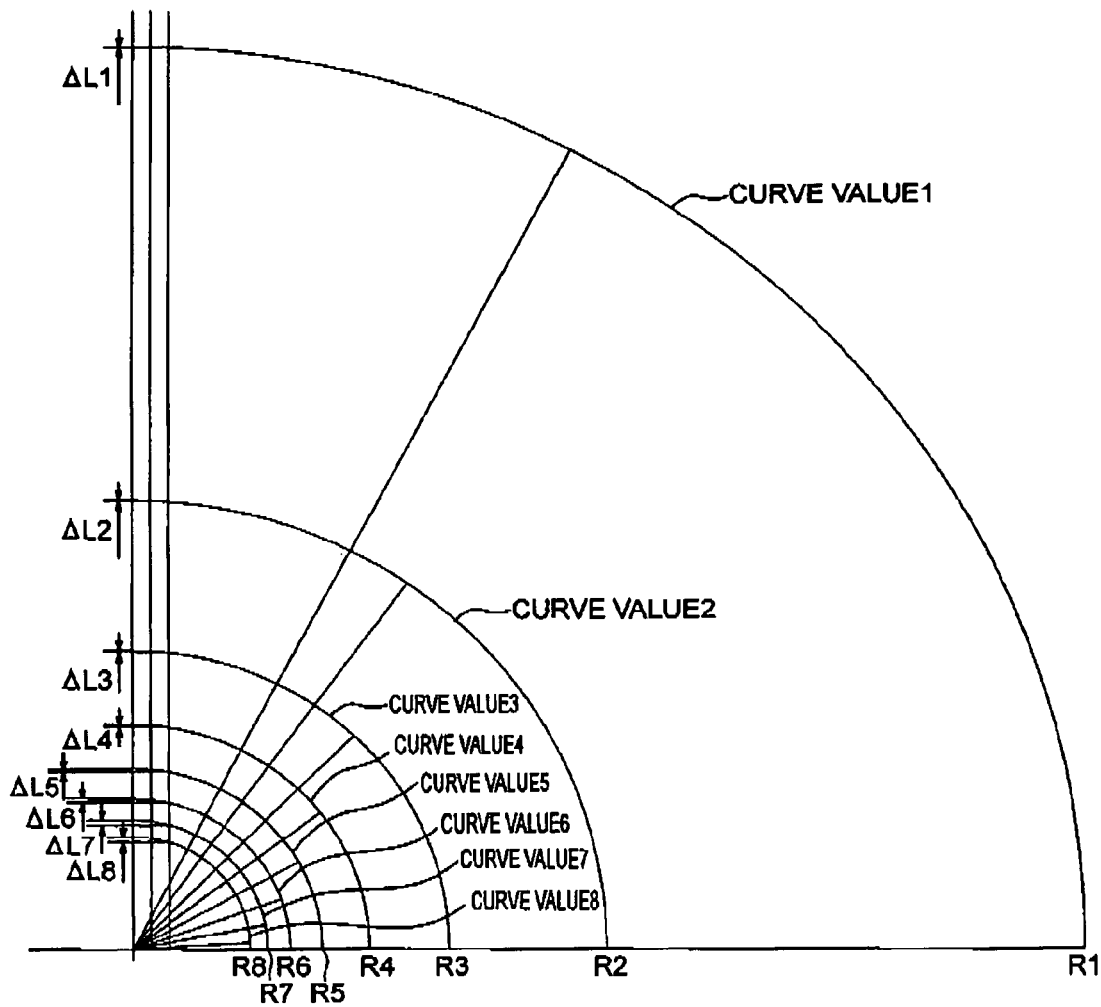
FIG. 22A is an explanatory view of a curve value (base curve) of a lens for eyeglasses.
Figure 22B:
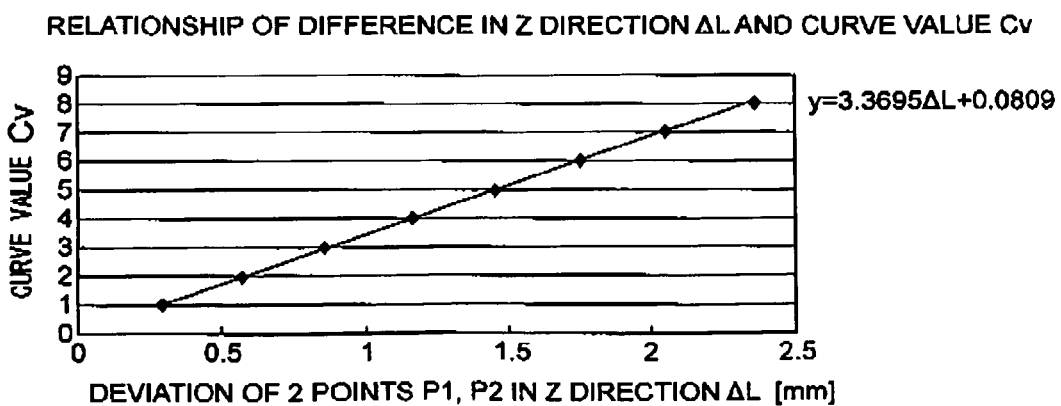
FIG. 22B is a characteristic line which illustrates a relationship of the curve value of FIG. 22A and a difference of Z coordinates between 2 measurement points on a surface of a lens.

By the way, the base curve of the lens for eyeglasses is set to be in a range of a base curve of 1 to a base curve of 8 as illustrated in FIGS. 22A and 22B.

Curvature radiuses corresponding to the base curve of 1 to the base curve of 8 are described in [Table 1].

TABLE 1

| Curve value (Base curve) | Curvature radius (mm) | Deviation in the Z direction | Base curve obtained by an approximate curve | Difference from a theoretical value |
|---|---|---|---|---|
| 1 | R1: 523 | ΔL1: 0.287 | 1.0479465 | 0.0479465 |
| 2 | R2: 261.5 | ΔL2: 0.575 | 2.0183625 | 0.0183625 |
| 3 | R3: 174.3333 | ΔL3: 0.854 | 2.958453 | −0.041547 |
| 4 | R4: 130.75 | ΔL4: 1.156 | 3.976042 | −0.023958 |
| 5 | R5: 104.6 | ΔL5: 1.451 | 4.9700445 | −0.0299555 |
| 6 | R6: 87.16667 | ΔL6: 1.75 | 5.977525 | −0.022475 |
| 7 | R7: 74.71429 | ΔL7: 2.054 | 7.001853 | 0.001853 |
| 8 | R8: 53.75 | ΔL8: 2.365 | 8.0497675 | 0.0497675 |

And when X1, X2 described above are respectively taken as X1=10 mm, X2=5 mm, as illustrated in Table 1, deviations ΔL1 to ΔL8 (ΔL in FIGS. 21A and 21B; ΔL=Z2−Z1) in the Z direction of the measurement points P1, P2 corresponding to the base curve of 1 to the base curve of 8 are obtained.

In other words, for example, in a case where the deviation in the Z direction of the measurement points P1, P2 is approximately 0.287, which is equivalent to ΔL1, a curvature radius of the lens Lm as a demo lens is judged to be 523 mm of R1 corresponding to a base curve of 1.

In addition, a deviation ΔL in the Z direction of the measurement points P1, P2 and a curve value (base curve) Cv are expressed in a linear approximation, and the equation is $$Cv=3.3695\times\Delta L+0.0809.$$

That is, a relationship of the base curve Cv and the deviation ΔL in the Z direction is linearly proportional as illustrated in FIG. 22B.

When a curvature radius of the surface fb of the lens Lm and a base curve are obtained, an operation will move to a step S4.

In the step S4, assuming that the surface of the lens Lm is on the spherical surface of the radius R, the controlling-calculating circuit 52 obtains position information Zbi in the Z direction of the circumference of the surface fb of the lens Lm from the curvature radius (or the base curve Cv) obtained based on the deviation ΔL (ΔL1 to ΔL8) in the Z direction and the contour shape information of the lens (ρi, θi), and an operation will move to a step S5.

In a step S5, the controlling-calculating circuit 52 obtains three-dimensional contour shape information of the lens (ρi, θi, Zbi) from the two-dimensional contour shape information of the lens (ρi, θi) and the position information Zbi in the Z direction of the circumference of the surface fb of the lens Lm obtained in the step S4, and a length of the circumference of the lens Lm based on this three-dimensional contour shape information of the lens Lm (ρi, θi, Zbi) is calculated, and then it is finished.

The obtained three-dimensional contour shape information of the lens (ρi, θi, Zbi) is stored in a memory 55 by the controlling-calculating circuit 52.

(IV) Position Measurement of a Mounting Hole of the Lens Lm

The shape measuring apparatus for eyeglasses according to the present embodiment performs not only the measurements of the inner circumferential contour shape of the lens frame of eyeglasses and the contour shape of the lens for eyeglasses but also a measurement of a position of the mounting hole of the lens.

The measured three-dimensional contour shape information of the lens (ρi, θi, Zbi) in (II), (III) described above is, for example, taken as contour shape information of a lens Lm (ML) in FIG. 23B.

The lens Lm (ML) in FIG. 23B has mounting holes 204, 206 and the lens Lm (MR) in FIG. 23B has mounting holes 205, 207.

Figure 24A:
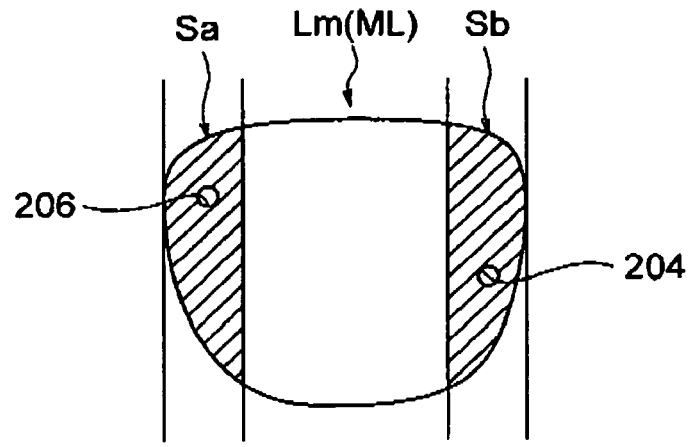
FIG. 24A is an explanatory view of an example of a position detecting area of a mounting hole of the lens.

In the shape measuring apparatus for eyeglasses of the present information, the controlling-calculating circuit 52 sets search areas Sa, Sb for the mounting hole to be inside a contour of the lens Lm (MR), as illustrated in FIG. 24, based on this three-dimensional contour shape information (ρi, θi, Zbi).

And the controlling-calculating circuit 52 moves the measuring element for the lens 38 in the search areas for the mounting hole Sa, Sb and detects the mounting holes 206, 204.

By the way, in a case where the measuring element for the lens 38 is moved in the search areas for the mounting hole Sa, Sb, if the measuring element for the lens 38 comes outside of the lens Lm and the tip of the measuring element for the lens 38 is displaced from the lens Lm, it may take a time to return an abutting state of the measuring element for the lens 38 and the lens Lm to the state as they were.

Therefore, in order that the measuring element for the lens 38 is not displaced from the lens Lm, the search areas for mounting hole Sa, Sb are set to be in a predetermined area inside an outer circumference of the lens Lm (for example, 1 mm inside) based on the three-dimensional contour shape information of the lens (ρi, θi, Zbi).

The measure of 1 mm is an example, and is not limited to 1 mm. That is, it is preferable that the measuring element for the lens 38 be not displaced from the lens Lm and detects the mounting hole.

Figure 24B:
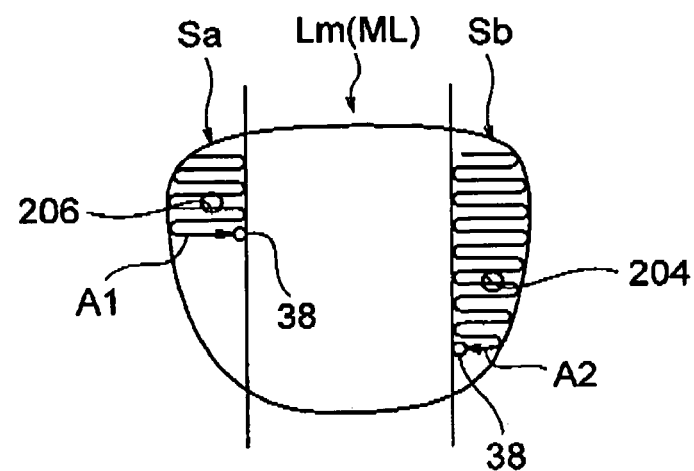
FIG. 24B is a function explanatory view of a position detection of the mounting hole.

Next, in a state where the measuring element for the lens 38 abuts on the surface of the lens Lm, based on the three-dimensional contour shape information of the lens (ρi, θi, Zbi), the controlling-calculating circuit 52 scans (moves) in a zigzag the lens measuring element for the lens 38 in the search areas for mounting bole Sa, Sb as illustrated by arrows A1, A2 in FIG. 24B and detects mounting holes 206, 204.

In an example illustrated in FIG. 24B, the measuring element for the lens 38 is moved in a zigzag from an upper portion to a lower portion of the lens Lm.

Figure 24C:
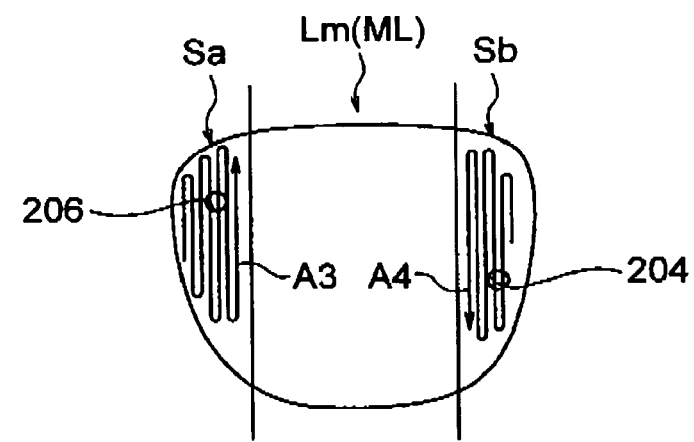
FIG. 24C is a function explanatory view of the position detection of the mounting hole.

As illustrated by arrows A3, A4 in FIG. 24C, the measuring element for the lens 38 may be moved in a zigzag from both right and left ends to inside of the lens Lm.

A mechanism (not illustrated) which slides the base 2 entirely by a pulse motor (not illustrated) is provided, and a drive of the rotating base 9 by the motor 6 and a drive of the pulse motor arc controlled by the controlling-calculating circuit 52, so that a zigzag movement in the horizontal direction of the measuring element for the lens 38 as described above is performed.

In the shape measuring apparatus for the lens of the embodiment of the present invention, a (zigzag) movement pattern of the measuring element for lens 38 is given by a group of coordinate values (ρi', θi) as function data of the rotational angle θi of the rotation of the rotating base 9 by the motor 6 and a slide movement amount by the pulse motor, that is, a radial coordinate ρ'.

The zigzag movement of the measuring element for the lens 38 may be performed by controlling a drive of the rotating base 9 by the motor 6 and a drive of the slider 15 by the motor 18 by the controlling-calculating circuit 52.

The measuring element for the lens 38 is moved and the linear scale 40 traces a vertical movement of the measuring element 36, so that a position (height) Zi' in the vertical direction of the measuring element for the lens 38 is obtained.

That is, in the shape measuring apparatus for eyeglasses of the embodiment of the present invention, the three-dimensional position information of the measuring element for the lens 38 when the measuring element for the lens 38 is moved in a zigzag as described above is obtained as a group of coordinate values (ρi', θi, Zi') expressed in the polar coordinate system.

Figure 25A:
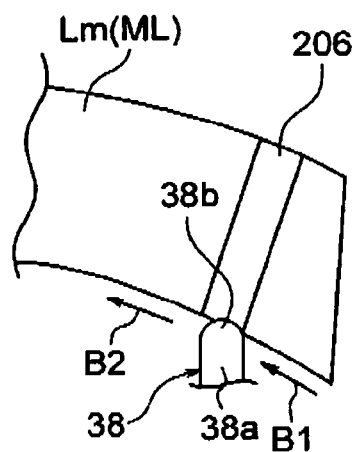
FIG. 25A is a partial cross-sectional view explaining a detection of the mounting hole provided in the lens.
Figure 25B:
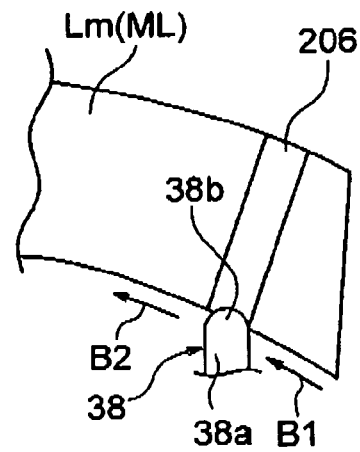
FIG. 25B is a partial cross-sectional view explaining the detection of the mounting hole provided in the lens.
Figure 25C:
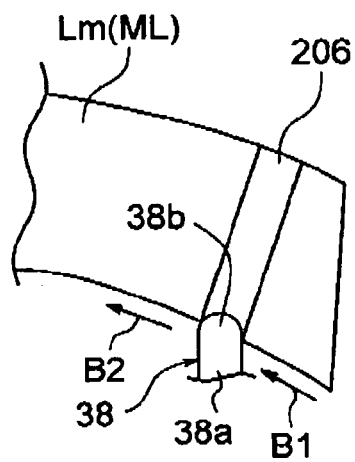
FIG. 25C is a partial cross-sectional view explaining the detection of the mounting hole provided in the lens.

Thus, in a case where the measuring element for the lens 38 is moved in the vicinity of the mounting hole 206, for example, as illustrated by arrows B1, B2 in FIGS. 25A to 25C, the measuring element for the lens 38 moves smoothly upward along the surface of the lens Lm around passing the mounting hole 206, however the measuring element for the lens 38 is elevated steeply in the vicinity of a position where the mounting hole 206 is formed.

Figure 25D:
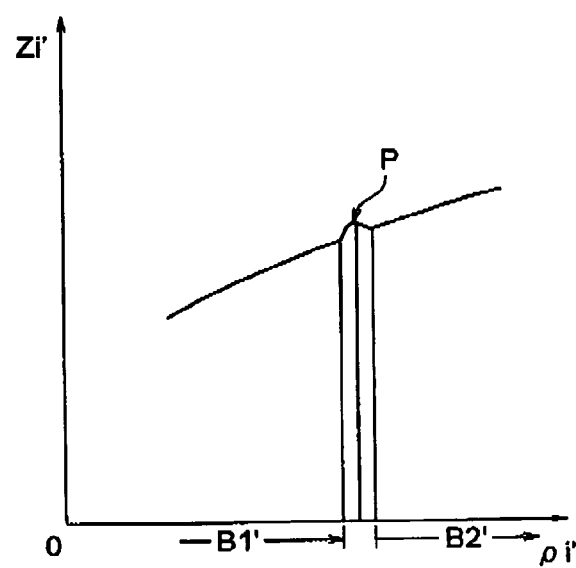
FIG. 25D is an explanatory view explaining the detection of the mounting hole of FIGS. 25A to 25C.

At this time, a position Zi' of the measuring element for the lens 38 is obtained as a Zi'-ρi' curve as illustrated in FIG. 25D from a detection signal of the linear scale 40.

In the Zi'-ρi' curve of FIG. 25D, at a position where the measuring element for the lens 38 moves toward the mounting hole 206 illustrated by the arrow B1 in FIGS. 25A to 25C, the position Zi' of the measuring element for the lens 38 changes smoothly upward as illustrated by the arrow B1', and when the tip of the measuring element for the lens 38 enters the mounting hole 206 at a position P, the position Zi' of the measuring element for the lens 38 changes greatly.

And at a position where the measuring element for the lens 38 moves away from the mounting bole 206 illustrated by the arrow B2 in FIGS. 25A to 25C, the position Zi' changes smoothly upward again as illustrated by the arrow B2'.

Thus, from three-dimensional position information (ρi', θi, Zi') when the measuring element for the lens 38 moves in a zigzag, a position where a height position of the measuring element for the lens 38 changes greatly is detected and the detected data is stored in the memory 55 as data for a mounting hole (position data for opening a hole).

The measurements of the mounting holes 204, 205, 207 are performed the same as the above.

VARIANT EXAMPLE 1

The above embodiment has a structure such that the bridge 201, as illustrated in FIG. 23B, has the fixing plate portions 201c, 201d which abut on the back surface of the lenses Lm (ML), Lm (MR), and the attachments for temples 202, 203, as illustrated in FIG. 23B, respectively have the fixing plate portions 202b, 203b which abut on the back surface of the lenses Lm (ML), Lm (MR), however the structure is not limited to the above embodiment.

Figure 26A:
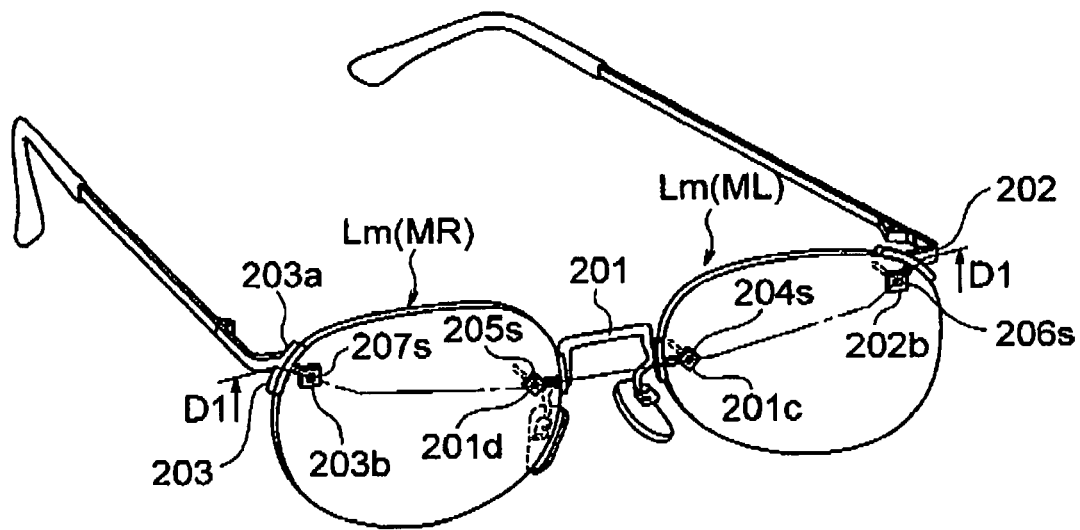
FIG. 26A is a perspective view illustrating another example of 2-point lens frame eyeglasses.
Figure 26B:
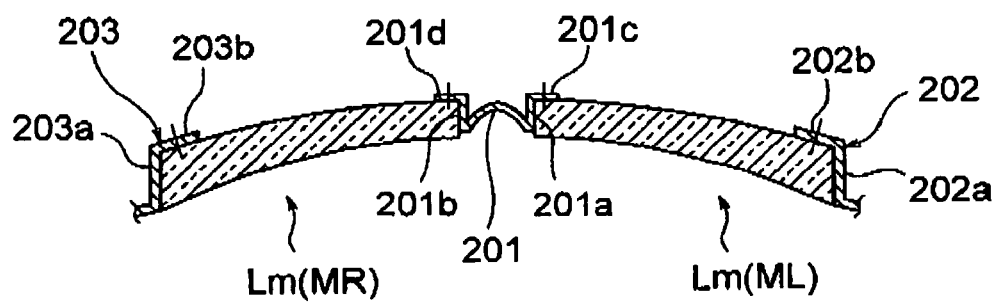
FIG. 26B is a cross-sectional view of FIG. 26A taken along a line D1-D1.

For example, the variant example 1, as illustrated in FIGS. 26A and 26B, may have a structure such that the bridge 201 has fixing plate portions 201c, 201d which abut on a front surface of the lenses Lm (ML), Lm (MR), and the attachments for temples 202, 203 respectively have fixing plate portions 202b, 203b which abut on the front surface of the lenses Lm (ML), Lm (MR).

In this case, a curvature of the front surface and a length of the circumference of the lenses Lm (ML), Lm (MR) are measured in the same manner as the back surface of the lens Lm as described above, and positions of the mounting holes 204 to 206 are measured.

In FIGS. 26A and 26B, portions which are the same or approximately the same portions in FIGS. 23A and 23B are denoted by the numerals used in the FIGS. 23A and 23B, and will not be explained.

VARIANT EXAMPLE 2

In the above embodiment, the search areas for mounting holes Sa, Sb which extend vertically in the right and left portions of the lens Lm are set, however the search areas are not limited to the above embodiment.

Figure 27:
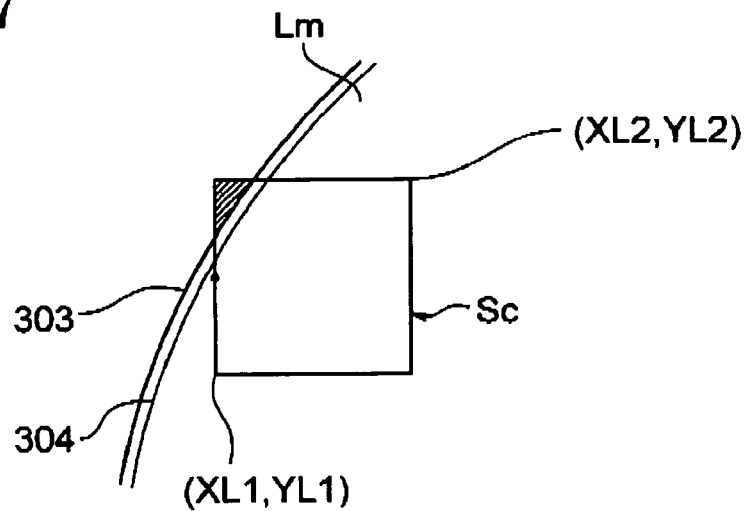
FIG. 27 is an explanatory view illustrating another example of the position detection area of the mounting hole of the lens and the lens frame.

For example, as illustrated in FIG. 27, based on the contour shape information of the lens ($\rho i$, $\theta i$, $Zbi$), an allowance line 304 for the measurement inside a predetermined amount (for example, 1 mm inside) from an outer circumferential surface of the lens Lm is set, and a search area for mounting holes Sc of a predetermined area (for example, 10 mm×10 mm) is set beforehand.

Figure 28:
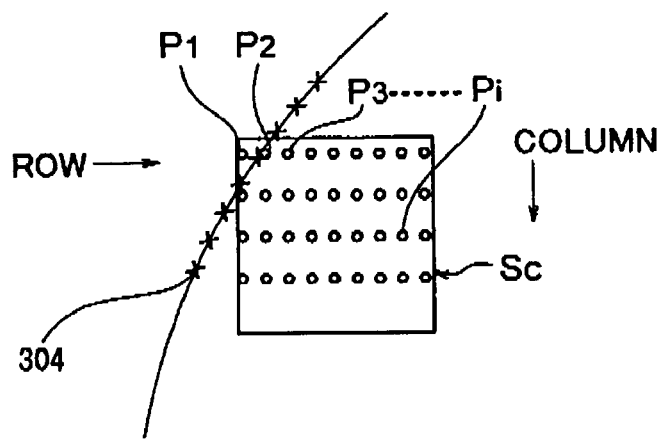
FIG. 28 is an explanatory view illustrating an example of a position of the position detection in the position detection area of the mounting hole of the lens of FIG. 27.

As illustrated in FIG. 28, a number of measurement points pi (for example, 200 measurement points in a vertical and horizontal arrangement) in the search area for mounting holes Sc described above are provided, a shape of the surface of the lens Lm in the vicinity of each of the 200 measurement points pi in the vertical and horizontal arrangement is traced by the measuring element for the lens 38, so that a position of the mounting hole is obtained from a place where the measuring element for the lens 38 is displaced upward greatly in the search area for mounting holes Sc.

The obtained position for the mounting hole ($\rho i'$, $\theta i$, $Zi'$) is stored as the three-dimensional position information in the memory 55, and is taken as data of the mounting hole (position data for opening a hole).

Positions in which the mounting holes 204 to 207 and the like are provided to the shape of the lens Lm as a typical example are positions which are closer to an upper side of right and left end portions of the lens Lm, or positions which are closer to the center portion in the vertical direction of the right and left end portions of the lens Lm.

Therefore, a switch for selecting a detection position in right and left upper end portions, or a center portion in the vertical direction or the like of the lens Lm is provided, and based on the selected detection position by this switch and the contour shape information ($\rho i$, $\theta i$, $Zbi$) of the lens, the search area for the mounting hole Sc may be set.

VARIANT EXAMPLE 3

Figure 29:
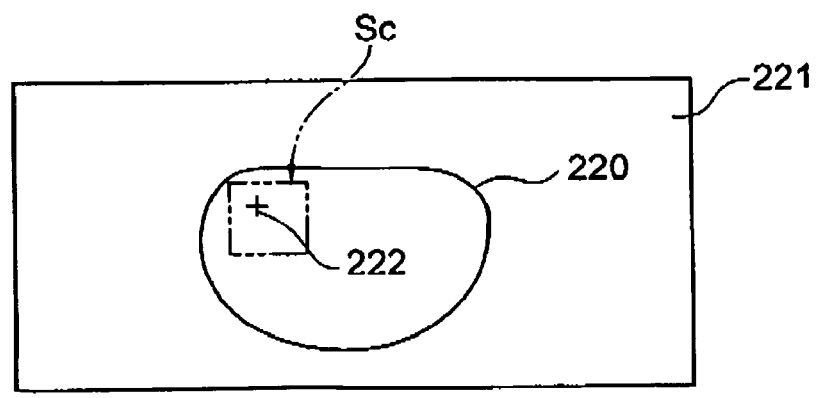
FIG. 29 is an explanatory view of a liquid crystal display used by setting the position detection area of a mounting hole of the lens.

As illustrated in FIG. 29, based on the contour shape information ($\rho i$, $\theta i$, $Zbi$) of the lens Lm, a shape 220 of the lens Lm is displayed on a touch-panel type liquid crystal display monitor 221 and approximate positions of the mounting holes 204-207 and so on are indicated by a touch-panel of the liquid crystal display monitor 221, so that the indicated position, for example, the indicated position is indicated by a cross mark 222, and an area which is in the vicinity centering on this indicated position may be set as the search area for mounting holes Sc.

VARIANT EXAMPLE 4

Figure 31A:
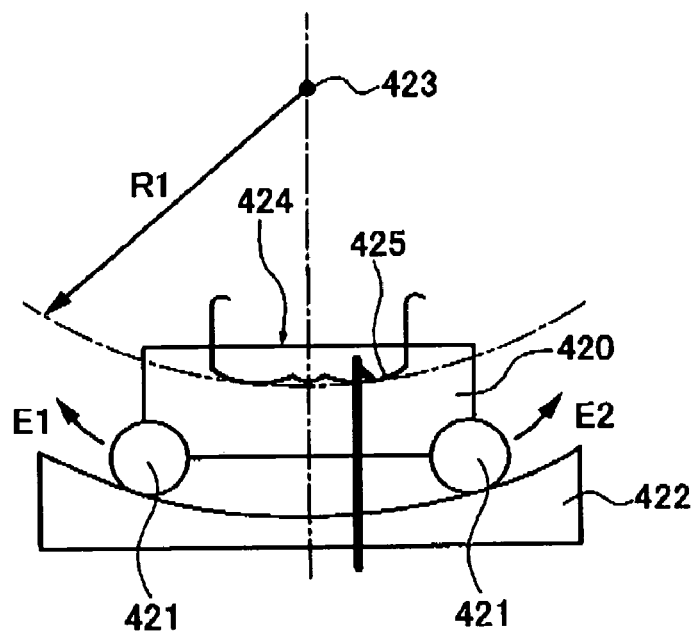
FIG. 31A is a view which illustrates that a frame holder is provided with a plurality of rollers and the frame holder is swung by a rolling movement of the rollers on a guide rail, and illustrates a case where a top surface of the guide rail is concave-shape.
Figure 31B:
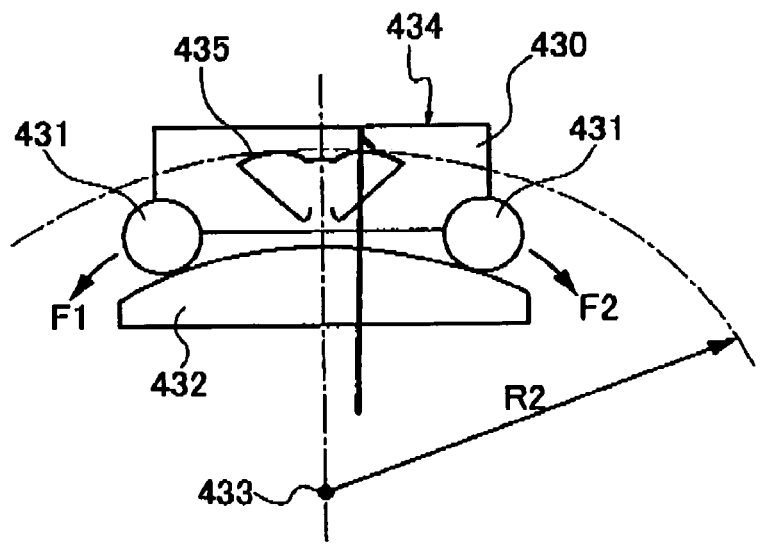
FIG. 31B is a view which illustrates that a frame holder is provided with a plurality of rollers and the frame holder is swung by a rolling movement of the rollers on a guide rail, and illustrates a case where a top surface of the guide rail is convex-shape.
Figure 2:
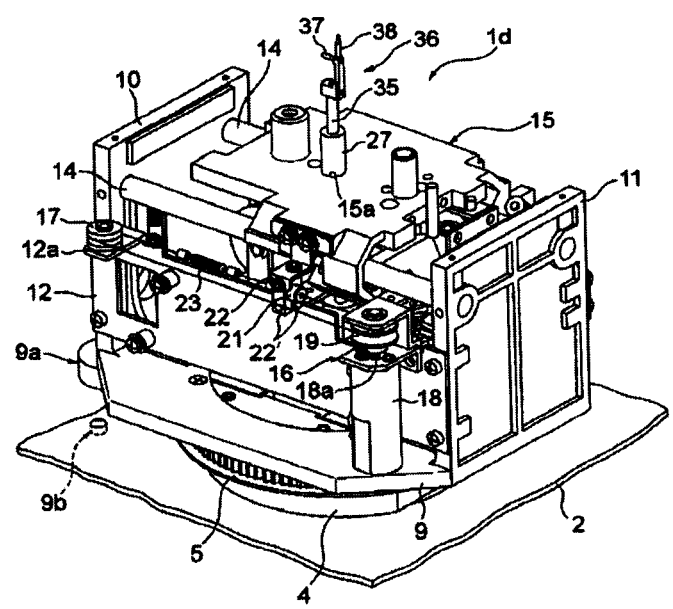
Figure 19:
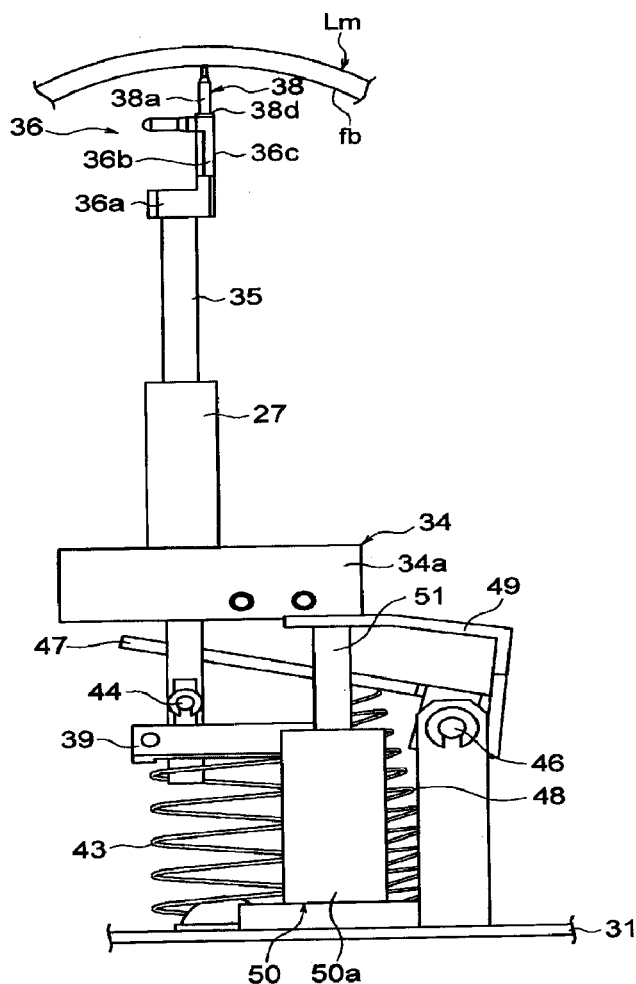

FIGS. 31A and 31B are examples where a plurality of rollers are provided in a frame holder and these rollers are rolled on a guide rail, so that the frame holder is swung.

In a variant example illustrated in FIG. 31A, a plurality of rollers 421 are provided in a frame holder 420 and theses rollers 421 are rolled right and left on a guide rail 422 where a top surface is a concave-shape.

The top surface of the guide rail 422 is formed in a cylinder-side-surface-like shape, and the frame holder 420 is swung in directions of arrows E1 and E2 centering around a virtual axis 423 which is in a position separated from a main body of a measuring apparatus (above the main body of the measuring apparatus).

A numeral 424 is a measuring element which performs a shape measurement of an eyeglass frame 425 of eyeglasses.

The eyeglass frame 425 is set in the frame holder 420 and is held at a distance R1 from the virtual axis 423.

In FIG. 31B, a plurality of rollers 431 are provided in a frame holder 430, and these rollers 431 are rolled right and left on a guide rail 432 where a top surface is a convex-shape.

The top surface of the guide rail 432 is formed in a cylinder-side-surface-like shape, and the frame holder 430 is swung in directions of arrows F1, F2 centering on a virtual rotational axis 433 which is in a position separated from the main body of the measuring apparatus (above the main body of the measuring apparatus).

A numeral 434 is a measuring element which performs a shape measurement of an eyeglass frame 435 of eyeglasses.

The eyeglass frame 435 is set in the frame holder 430 and is held at a distance R1 from the virtual rotational axis 433.

The flow chart illustrated in FIG. 17 is applicable to a case of the FIG. 31B.

Function and Effect of the Embodiment

As described above, the shape measuring apparatus for eyeglasses of the embodiment of the present invention, comprises a lens holder (not illustrated) which is provided in the main body of the measuring apparatus 1, a measuring element 36 which measures a circumferential shape of a lens Lm held by the lens holder, movement sections (motors 6, 18) which move the measuring element 36 along an outer circumferential surface of the lens Lm, a linear scale 24 which detects a position in a radial coordinate direction of the measuring element 36, a linear scale 40 which detects a position in a vertical direction of the linear scale 24, and a controlling-calculating circuit 52 which obtains contour shape data of a circumferential surface of the lens Lm as three-dimensional information based on a detection signal from the linear scales 24, 40.

Additionally, the shape measuring apparatus for eyeglasses of the embodiment of the present invention controls the motors 6, 18 and a tip of a measuring element abuts on the surface of the lens Lm and moves, so that a relationship of a contour shape of the circumference of the lens Lm and a hole position based on a detection signal of the linear scale 40 is detected.

According to this structure, a position of a mounting hole where an attachment of a 2-point eyeglass frame is mounted on a lens is easily and precisely measured.

The shape measuring apparatus for eyeglasses of the embodiment of the present invention detects a notch position of the lens having the notch in the circumference by the measurement of the circumferential shape of the lens.

According to this structure, a notch is provided in a circumference of a lens and this notch is used for mounting of the attachment of the 2-point eyeglass frame.

In addition, a measuring element for the lens 38 which detects a mounting hole for the lens and a measuring element for a lens frame 37 of the shape measuring apparatus for eyeglasses of the embodiment of the present invention may be structured by different members.

By using the above structure, a fabrication of the measuring element 36 becomes easy.

According to the embodiment of the present invention, a holder which is inclined to approximately 40 degrees at most is provided as a holder which holds an eyeglass frame, so that a shape of the eyeglass which exceeds a base curve of 8 is easily and precisely measured.

Additionally, the shape measuring apparatus for eyeglasses of the embodiment of the present invention accurately obtains a specific inclination angle of the holder and respectively measures inner circumferential contour shapes of lens frames in a state where each lens frame of right and left is approximately parallel to a sliding direction of the measuring element, so that accurate inner circumferential contour shapes are obtained, and thereby an accurate distance between geometric centers of each lens frame is obtained from these inner circumferential contour shapes.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A shape measuring apparatus for eyeglasses which measures a contour shape of an eyeglass element, comprising:
    a holder which holds the eyeglass element;
    a holder swing mechanism which swings the holder around a virtual rotational axis which is set outside of the shape measuring apparatus for eyeglasses;
    a measuring element which traces a surface of the eyeglass element;
    a driver which drives the measuring element;
    a position detector which detects a position of the measuring element; and
    a controlling-calculating section which controls the driver and obtains and processes position information of the measuring element by the position detector, wherein, in a state of holding the eyeglass element by the holder, the controlling-calculating section controls the driver to slide the measuring element on the surface of the eyeglass element, so that the measuring element traces a three-dimensional shape of the eyeglass element and the three-dimensional shape of eyeglass element is obtained based on information of a driving state of the driver and the position information of the measuring element by the position detector.

2. The shape measuring apparatus for eyeglasses according to claim 1, wherein the eyeglass element is a pair of lens frames comprising an eyeglass frame, and the measuring element traces respectively each groove portion which is formed inside of each lens frame, so that an inner circumferential contour shape of each lens frame is measured.

3. The shape measuring apparatus for eyeglasses according to claim 2, wherein the eyeglass frame is highly-curved, and in a state where the eyeglass frame is held by the holder, a curvature center of a curve of the eyeglass frame is set to be a position which is close to the virtual rotational axis.

4. The shape measuring apparatus for eyeglasses according to claim 2, wherein the holder swing mechanism includes: a rail member which is fixed to the holder and is an arc-shape centering on the virtual rotational axis; and at least a pair of rollers which is arranged to sandwich the rail member from above and below, is capable of swinging the holder centering on the virtual rotational axis.

5. The shape measuring apparatus for eyeglasses according to claim 2, wherein the controlling-calculating section, in a state where the holder is swung such that one lens frame of the pair of lens frames is in approximately a horizontal state, rotates the measuring element around an axis set in the apparatus which extends in a vertical direction and a groove portion of the one lens frame is traced by the measuring element.

6. The shape measuring apparatus for eyeglasses according to claim 5, wherein in a case where a curved amount of the one lens frame of the pair of lens frames measured by the measuring element does not exceed a certain amount, after measuring an inner circumferential contour shape of the one lens frame, while maintaining the holder in a horizontal state, the controlling-calculating section measures a shape of another lens frame of the pair of lens frames, and in a case where the curved amount of one lens frame measured by the measuring element exceeds the certain amount, the controlling-calculating section sets to be a frame holding angle which is an angle capable of negating the curved amount of the one lens frame, and measures the shape of the one lens frame after swinging the holder at only the frame holding angle.

7. The shape measuring apparatus for eyeglasses according to claim 6, wherein in the case where the curved amount of the one lens frame measured by the measuring element exceeds the certain amount after measuring the shape of the one lens frame, the controlling-calculating section measures a shape of the other lens frame of the pair of lens frames, in a state where the holder is swung at the same angle as the frame holding angle in an opposite direction.

8. The shape measuring apparatus for eyeglasses according to claim 1, wherein the eyeglass element is a lens for eyeglasses.

9. The shape measuring apparatus for eyeglasses according to claim 8, wherein the measuring element traces a circumference of the lens for eyeglasses held by the holder, so that a two-dimensional contour shape of the circumference of the lens for eyeglasses is measured.

10. The shape measuring apparatus for eyeglasses according to claim 8, wherein the measuring element measures positions of at least two points on a surface of the lens for eyeglasses held by the holder, so that a curvature radius of the lens for eyeglasses is calculated.

11. The shape measuring apparatus for eyeglasses according to claim 10, wherein a three-dimensional contour shape of the lens for eyeglasses is calculated by information of the measured curvature radius of the lens for eyeglasses and information of the two-dimensional contour shape of the circumference measured by tracing the circumference of the lens for eyeglasses by the measuring element.

12. The shape measuring apparatus for eyeglasses according to claim 11, wherein a length of the circumference of the lens for eyeglasses is calculated by information of the calculated three-dimensional contour shape of the lens for eyeglasses.

13. The shape measuring apparatus for eyeglasses according to claim 8, wherein a curve value of the lens for eyeglasses is calculated by measuring positions of at least two points on a surface of the lens for eyeglasses held by the holder by the measuring element.

14. The shape measuring apparatus for eyeglasses according to claim 8, wherein a position of a mounting hole for the eyeglass element is measured by tracing a surface of the lens for eyeglasses held by the holder by the measuring element.

* * * * *

UNITED STATES PATENT AND TRADEMARK OFFICE
CERTIFICATE OF CORRECTION

PATENT NO. : 7,721,452 B2
APPLICATION NO. : 12/382960
DATED : May 25, 2010
INVENTOR(S) : Toshihiro Koyama Page 1 of 5

It is certified that error appears in the above-identified patent and that said Letters Patent is hereby corrected as shown below:

In the Drawings

On drawing sheet 5 of 37, Fig. 1D is replaced by Fig. 1D as represented below:

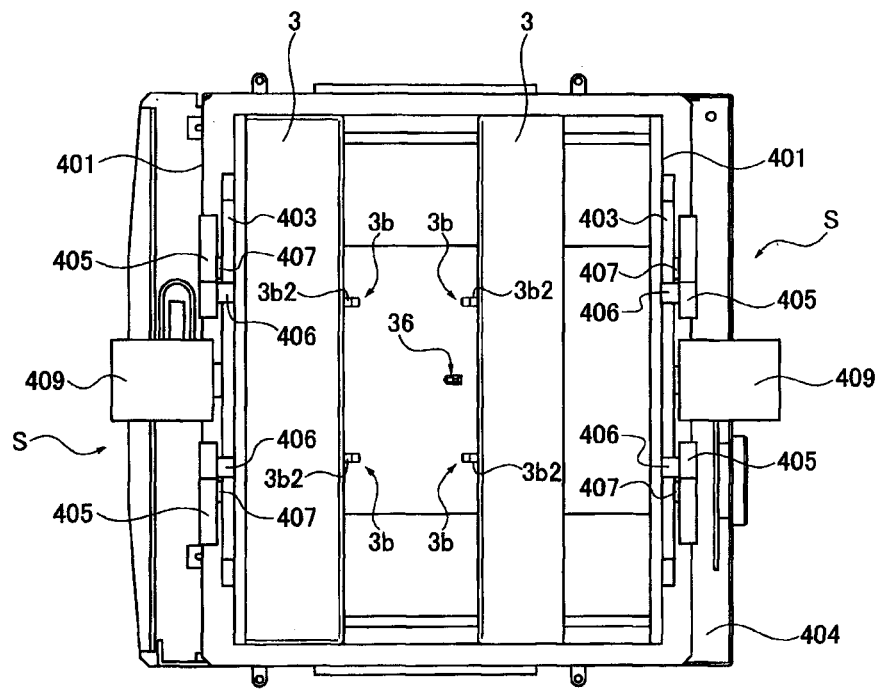

FIG.1D

Signed and Sealed this
Fifteenth Day of October, 2013

Teresa Stanek Rea
*Deputy Director of the United States Patent and Trademark Office*

On drawing sheet 6 of 37, Fig. 2 is replaced by Fig. 2 as represented below:

On drawing sheet 27 of 37, Fig. 19 is replaced by Fig. 19 as represented below:

CERTIFICATE OF CORRECTION (continued)
U.S. Pat. No. 7,721,452 B2

On drawing sheet 37 of 37, Fig. 31A is replaced by Fig. 31A as represented below:

FIG.31A

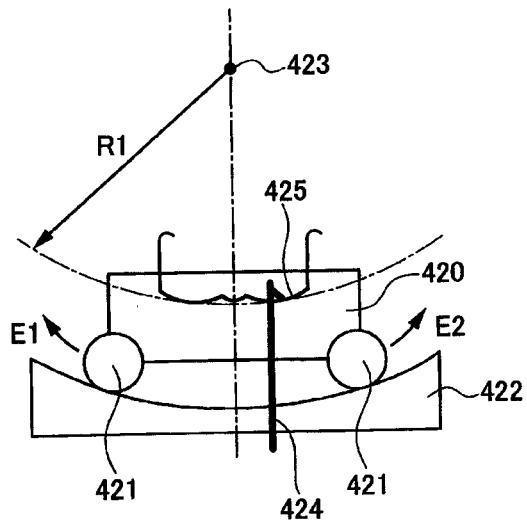

On drawing sheet 37 of 37, Fig. 31B is replaced by Fig. 31B as represented below:

FIG.31B

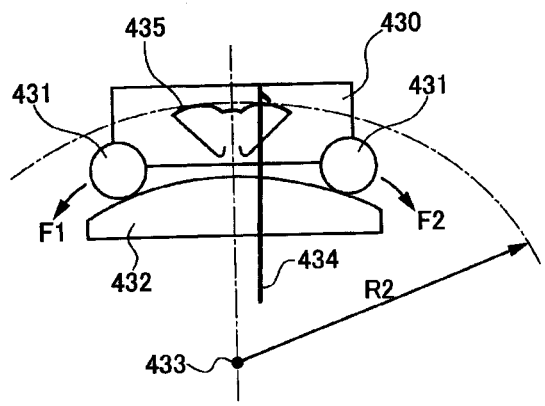

In the Specifications

In column 5, line 63, "capable or relatively" should read --capable of relatively--.

In column 8, line 22, "porting plate part, 12*a*" should read --porting plate part 12*a*--.

CERTIFICATE OF CORRECTION (continued)

In column 11, line 39, "by (be coil spring" should read --by the coil spring--.

In column 15, line 13, "on the virtual, rotational" should read --on the virtual rotational--.

In column 21, line 49, "point P2 arc" should read --point P2 are--.

In column 22, line 5, "equations, (1)-(2) is" should read --equations, (1)–(2) is--.

In column 22, line 10, the formula " $(X1)^2-(X2)^2+(Z1)^2+2(Z1)\cdot\Delta Z+\Delta Z^2-(Z2)^2-2(Z2)\cdot\Delta Z-\Delta Z^2=0$ " should appear on one line as shown
-- $(X1)^2-(X2)^2+(Z1)^2+2(Z1)\cdot\Delta Z+\Delta Z^2-(Z2)^2-2(Z2)\cdot\Delta Z-\Delta Z^2=0,$ --.

In column 22, line 23, the formula " $\Delta Z = \frac{(X2)^2-(X1)^2+(Z2)^2-(Z1)^2}{2[(Z1)-(Z2)]}$ " should read
-- $\Delta Z = \frac{(X2)^2-(X1)^2+(Z2)^2-(Z1)^2}{2[(Z1)-(Z2)]}$ --.

In column 24, line 17, "pulse motor arc controlled" should read --pulse motor are controlled--.